US012492861B2

(12) United States Patent
Son

(10) Patent No.: US 12,492,861 B2
(45) Date of Patent: Dec. 9, 2025

(54) REFRIGERATOR

(71) Applicant: LG ELECTRONICS INC., Seoul (KR)

(72) Inventor: Younghun Son, Seoul (KR)

(73) Assignee: LG Electronics Inc., Seoul (KR)

( * ) Notice: Subject to any disclaimer, the term of this patent is extended or adjusted under 35 U.S.C. 154(b) by 357 days.

(21) Appl. No.: 18/136,053

(22) Filed: Apr. 18, 2023

(65) Prior Publication Data

US 2023/0341178 A1 Oct. 26, 2023

(30) Foreign Application Priority Data

Apr. 22, 2022 (KR) ........................ 10-2022-0050014

(51) Int. Cl.
*F25D 29/00* (2006.01)
*E05F 15/75* (2015.01)
*F25D 17/06* (2006.01)

(52) U.S. Cl.
CPC ............ *F25D 29/003* (2013.01); *E05F 15/75* (2015.01); *F25D 17/062* (2013.01); *F25D 29/005* (2013.01); *E05Y 2900/31* (2013.01)

(58) Field of Classification Search
CPC ....... F25D 2317/0415; F25D 2317/041; F25D 2317/0417; F25D 29/005; F25D 2317/0665; F25D 17/08; E05F 15/75
See application file for complete search history.

(56) References Cited

U.S. PATENT DOCUMENTS

2006/0107597 A1* 5/2006 Jin .......................... E05F 15/63 49/149
2016/0327332 A1* 11/2016 Kim ...................... F25D 29/005
2017/0191728 A1* 7/2017 Seo ....................... F25D 17/042
2017/0234609 A1 8/2017 Park
2019/0226757 A1 7/2019 Park
2020/0173718 A1 6/2020 Park
2021/0055042 A1* 2/2021 Chung .................... F25D 11/02
2021/0207877 A1 7/2021 Yeom

FOREIGN PATENT DOCUMENTS

JP 2005-257248 A 9/2005
JP 2007-093039 A 4/2007
KR 10-0603733 7/2006
KR 10-2006-0106405 10/2006
WO WO 2014/208585 A1 12/2014

OTHER PUBLICATIONS

Partial Search Report in European Appln. No. 23164579.7, mailed on Sep. 4, 2023, 12 pages.

* cited by examiner

*Primary Examiner* — Lionel Nouketcha
(74) *Attorney, Agent, or Firm* — Fish & Richardson P.C.

(57) ABSTRACT

A refrigerator includes a cabinet that defines a storage chamber having an open front surface, a door assembly configured to open and close the open front surface of the cabinet, and a door opening device including a push member configured to push one side surface of the door assembly and disposed in an upper portion of the cabinet, the door opening device being configured to open the door assembly automatically. The door assembly includes a touch assembly including a touch sensor, a body assembly accommodating the touch assembly, and a panel assembly including a front panel and being detachably coupled to a front surface of the body assembly. The touch sensor faces a rear surface of the panel assembly, and recognizes a touch through the front surface of the panel assembly.

26 Claims, 60 Drawing Sheets

REFRIGERATOR

CROSS-REFERENCE TO RELATED APPLICATION

This application claims priority to and the benefit of Korean Patent Application No. 10-2022-0050014, filed on Apr. 22, 2022, the disclosure of which is incorporated herein by reference in its entirety.

TECHNICAL FIELD

Disclosed herein is a refrigerator, and in particular, a refrigerator that ensures improvement in the exterior of a door assembly that is opened and closed based on a touch and ease of replacement of the door assembly.

BACKGROUND

Refrigerators generate cold air by circulating refrigerants and provide the cold air to a storage chamber, to store various types of storage targets for a long period of time and keep the storage targets fresh in the storage chamber.

A refrigerator includes a cabinet that constitutes a storage chamber, and a door that connects to the front surface of the cabinet, and opens and closes the storage chamber.

Ordinarily, a gasket can be additionally disposed on the surface where the door and the cabinet face each other, to prevent the leakage of cold air of the storage chamber.

To keep the storage chamber airtight, the gasket can be made of a compressible material and have a compressible shape, and press the door against the cabinet.

Since the adhesion of the gasket is inversely proportional to the amount of cold air leaking from the storage chamber, the adhesion of the gasket can increase to decrease the amount of cold air leaking from the storage chamber.

However, an increase in the adhesion of the gasket causes users to apply a large amount of force, to open the door.

To solve the problem, a door opening device that automatically opens the door can be applied to the refrigerator, keeping the storage chamber highly airtight, and enabling users to open the door easily with a small amount of force.

For example, a touch protrusion with a touch sensor can be formed on the door to recognize the touch of a user, and the user touches the touch protrusion to operate the door opening device.

Additionally, there is a growing demand for improvement in the exterior of a refrigerator, based on user tastes.

In particular, the aesthetic qualities of the exterior of a refrigerator are heavily dependent on the door constituting the front surface of the refrigerator. Accordingly, required is a refrigerator having a structure in which a door can be easily replaced with a door of a variety of materials, colors and design patterns and the like, based on user tastes.

At this time, users may want to change the opening direction of the door as well as the exterior design of the door.

If the door is opened clockwise, a hinge forming a rotation axis can be disposed in the left side area of the refrigerator to connect the door and the cabinet, and a touch protrusion and a door handle can be disposed respectively in the right side area of the refrigerator.

On the contrary, if the door is opened counterclockwise, a hinge forming a rotation axis can be disposed in the right side area of the refrigerator to connect the door and the cabinet, and a touch protrusion and a door handle can be disposed in the left side area of the refrigerator.

At a time of changing the opening direction of the door, the positions of various components such as a hinge, a touch protrusion, a door handle and the like may need to change, and their shapes may need to change because of the changes in their positions.

For example, when a user sees the front surface of the refrigerator, the user finds the opening direction of the door by recognizing the positions of the touch protrusion and the door handle.

To enhance user convenience and improve the exterior of a refrigerator, the positions of the touch protrusion and the door handle need to change if the opening direction of the door changes.

If the opening direction of the door changes as described above, the positions and shapes of various components constituting the door need to change, in addition to changing the position of the hinge, thereby increasing difficulty in processing and costs of producing components.

In the case of a door provided with an additional electronic component such as a touch protrusion for operating the door opening device, a change in the opening direction of the door leads to a change in the positions and shapes of more components.

SUMMARY

Technical Problems

The objective of the present disclosure is to provide a refrigerator that ensures improvement in the exterior of the front surface thereof and ease of use thereof.

Another objective of the present disclosure is to provide a refrigerator in which a constant exterior of the front surface of the refrigerator is embodied regardless of the opening direction of a door assembly.

Another objective of the present disclosure is to provide a refrigerator capable of increasing the number of commonly used parts while reducing the number of parts to be changed when the opening direction of a door assembly is changed.

Another objective of the present disclosure is to provide a refrigerator capable of increasing the number of commonly used parts while reducing the number of parts to be changed when the exterior of a door assembly is changed.

Another objective of the present disclosure is to provide a refrigerator in which a touch assembly is commonly used despite a change in the opening direction of the door assembly since the touch assembly is disposed not to interfere with a side handle even if the touch assembly is formed asymmetrically.

Another objective of the present disclosure is to provide a refrigerator in which touch recognition sensitivity remains constant even if the material for a front panel constituting the front surface of the door assembly changes.

Another objective of the present disclosure is to provide a refrigerator in which the simplification of the process of replacing a panel assembly comprising the front panel and a reduction in the replacement period are ensured.

Another objective of the present disclosure is to provide a refrigerator in which the door assembly is opened at a constant angle, with a constant amount of force, even if the opening direction of the door assembly changes.

Yet another objective of the present disclosure is to provide a refrigerator that deodorizes cold air circulating in a storage chamber and removes the germs of the cold air at the same time.

Aspects according to the present disclosure are not limited to the above ones, and other aspects and advantages that are not mentioned above can be clearly understood from the following description and can be more clearly understood from the embodiments set forth herein. Additionally, the aspects and advantages in the present disclosure can be realized via means and combinations thereof that are described in the appended claims.

Technical Solutions

In a refrigerator of one embodiment, a touch sensor recognizes a touch, based on a touch on the front surface of a panel assembly.

The refrigerator comprises a cabinet comprising a storage chamber a front surface of which is open, a door assembly opening and closing the front surface of the cabinet, and a door opening device comprising a push member pushing one side surface of the door assembly, being disposed in an upper portion of the cabinet and opening the door assembly automatically, and the door assembly comprises a touch assembly comprising a touch sensor, a body assembly accommodating the touch assembly, and a panel assembly comprising a front panel, and being detachably coupled to a front surface of the body assembly, wherein the touch sensor is disposed to face a rear surface of the panel assembly, and recognizes a touch through the front surface of the panel assembly.

In another aspect, the body assembly may comprise a pair of accommodation parts comprising a first accommodation part and a second accommodation part that accommodate the touch assembly, and the touch assembly may be accommodated in the first accommodation part or the second accommodation part.

In another aspect, the first accommodation part and the second accommodation part may be respectively disposed near one side and the other side of the body assembly, in positions in which the first accommodation part and the second accommodation part correspond to each other in a left-right direction of the body assembly.

In another aspect, the first accommodation part may comprise a harness passage part through which a wire harness passes, and a ring part which fixes the wire harness, and the wire harness may be elongated to pass through the harness passage part, in a direction of the harness passage part, in a state of being held by the ring part, and connect to the touch assembly.

In another aspect, the body assembly may further comprise a pair of side handles being inserted into the body assembly, the first accommodation part and the second accommodation part may respectively comprise a harness passage part through which a wire harness connecting to the touch assembly passes, and the harness passage part may be open in one side direction of the first accommodation part and the second accommodation part at which the side handle is not disposed.

In another aspect, the touch assembly may be coupled to the first accommodation part or the second accommodation part, in the up-down direction and in a reversed direction, at a time when the touch assembly is accommodated in the first accommodation part or the second accommodation part.

In another aspect, the body assembly may further comprise a pair of side handles being inserted into the body assembly, and the pair of side handles may not be exposed outward in a front surface direction of the door assembly, while being exposed outward in a side surface direction of the door assembly.

In another aspect, the pair of side handles may respectively be disposed near one side and the other side of the door assembly, in positions in the pair of side handles corresponds to each other in a left-right direction of the body assembly.

In another aspect, at least partial areas of the side handles are disposed to overlap with the touch assembly each other in a front-rear direction of the door assembly.

In another aspect, the refrigerator further may comprise a cover plate between the touch assembly and the front panel, the cover plate may comprise a button part being disposed to correspond to the touch sensor and protruding in a front surface direction of the front panel, and the button part may be exposed outward through a front surface hole of the front panel.

In another aspect, the front panel may be made of a conductive material.

In another aspect, the refrigerator may further comprise a conductive sheet between the cover plate and the touch sensor.

In another aspect, the front panel may comprise a touch display part being disposed to correspond to the touch sensor, and the touch sensor may not protrude further forward than the front panel.

In another aspect, the touch display part may be printed on a front surface of the front panel.

In another aspect, the front panel may be made of a non-conductive material.

In another aspect, the touch assembly may comprise a touch panel comprising the touch sensor, and a touch case comprising a touch hole that is coupled to a front surface of the touch panel and exposes the touch sensor, wherein the touch case may be coupled and fixed to the accommodation part.

In another aspect, a rear surface rib may be disposed at a rear of one side surface of the touch case and protrude in a way that extends along a left-right direction, an elastic bend part may be disposed at a rear of the other side surface of the touch case and bends in a way that extends along a front-rear direction, and the elastic bend part may have a distance from the other side surface of the touch case, which increases toward a front, and comprise a hole part which is formed in a way that a partial area of the elastic bend part penetrates.

In another aspect, the accommodation part may comprise a storage space in which the touch panel is stored, a holding jaw protruding to the storage space, an insertion space into which the elastic bend part is stored, and a protruding part protruding to the insertion space, wherein the rear surface rib may be held by the holding jaw, on a back surface of the holding jaw, and the protruding part may be inserted into the hole part, such that the touch case is fixed to the accommodation part.

In another aspect, the holding jaw and the protruding part may be disposed in the first accommodation part and the second accommodation part, respectively in an up-down direction and in a reversed direction.

In another aspect, the body assembly may comprise an upper cap deco constituting an upper portion thereof, the panel assembly may comprise an upper bracket fixing an upper side of the upper bracket to the upper cap deco, the upper cap deco may comprise a limiting rib being open in a direction of the upper bracket and formed into a camber, the upper bracket may comprise an insertion projection being formed into a projection protruding rearward, and the insertion projection may be inserted into the limiting rib, such that the panel assembly is fixed to the body assembly.

In another aspect, the refrigerator may further comprise a deco cover constituting an upper portion of the door assembly, the deco cover may comprise a crimping rib protruding downward, and the crimping rib may pressurize both side surfaces of the limiting rib.

In another aspect, the body assembly may comprise a lower cap deco constituting a lower portion thereof, the panel assembly may comprise a lower bracket fixing a lower side of the panel assembly to the lower cap deco, the lower cap deco may comprise a protruding rib being formed at a front thereof and protruding upward, the lower bracket may comprise a hook rib bending downward, and the protruding rib may be inserted into the hook rib, such that the panel assembly is fixed to the body assembly.

In another aspect, the refrigerator may further comprise a main PCB receiving a touch signal from the touch assembly and supplying an operation signal to the door opening device, the first accommodation part and the second accommodation part may respectively comprise a pair of wire harnesses electrically connecting to the touch assembly, and the pair of wire harnesses may respectively connect to the main PCB electrically.

In another aspect, the cabinet may comprise an accommodation case being disposed to overlap a central portion of the cabinet and accommodating the door opening device, and an upper duct supplying cold air to an upper surface of the storage chamber in an upper portion thereof, wherein an outlet of the upper duct may be disposed not to overlap the central portion of the cabinet.

In another aspect, the refrigerator may further comprise a cold air duct being disposed on a back surface of the cabinet, an evaporator generating cold air, a fan module supplying cold air generated by the evaporator to the cold air duct, and a grille panel being disposed on a front surface of the fan module, and the grille panel may comprise a cold air return guide part returning cold air of the storage chamber, a filter part being disposed at the cold air return guide part and comprising a photocatalytic reaction filter, and an ultraviolet irradiation part irradiating ultraviolet rays to the filter part.

In another aspect, cold air returning through the cold air return guide part may pass through the filter part, and the cold air having passed through the filter part may flow to the cold air duct.

Advantageous Effects

In a refrigerator of the present disclosure, a touch sensor of a touch assembly is disposed to face the rear surface of a panel assembly, and the front surface of the panel assembly is touched, such that the touch sensor may recognize the touch, thereby allowing a user to touch the front surface of the panel assembly without an additional protruding part for recognizing a touch on the front surface of the panel assembly.

Thus, the exteriors of the front surfaces of a door assembly and a refrigerator and ease of use of a product can improve.

In the refrigerator, the touch assembly is disposed to face the rear surface of the panel assembly, and a pair of side handles included in the door assembly is not exposed in the front surface direction of the door assembly while being is exposed outward in the side surface direction of the door assembly, such that a constant exterior of the front surface of the door assembly may be ensured regardless of the opening direction of the door assembly.

In the refrigerator, if the exterior of the door assembly is changed, the panel assembly is only changed, and a pair of accommodation parts, being included in a body assembly and accommodating the touch assembly, and the pair of side handles serving as a handle do not need to be changed, such that the number of components that need to be changed is decreased, while the number of components used in common can be increased.

In the refrigerator, even if the opening direction of the door assembly is changed, the position of the pair of accommodation parts, being included in a body assembly and accommodating the touch assembly, and the position of the pair of side handles serving as a handle do not need to be changed, such that the number of components that need to be changed is decreased, while the number of commonly used components increases.

In the refrigerator, the touch assembly coupled to one of the pair of accommodation parts of the body assembly is coupled to the accommodation part in the up-down direction or in a reverse direction, depending on the opening direction of the door assembly, such that the touch assembly may be disposed not to interfere with the side handles, even if the touch assembly is formed asymmetrically, thereby making it possible to commonly use the touch assembly.

In the refrigerator, if a front panel is made of a conductive material, a cover plate is additionally disposed between the touch assembly and the front panel, such that touch recognition sensitivity may remain constant, compared to a front panel made of a non-conductive material, thereby making it possible to change the exterior of the door assembly freely regardless of a material for the front panel.

In the refrigerator, an upper bracket and a lower bracket of the panel assembly have a fastening structure in which the upper bracket and the lower bracket are respectively attached and detached to an upper cap deco and a lower cap deco of the body assembly easily without an additional fastening member, such that the simplification of the process of replacing the panel assembly comprising the front panel, and a reduction in the replacement period may be ensured.

In the refrigerator, a rack bar of a door opening device being disposed in the upper portion of a cabinet and automatically opening the door assembly pushes the center of the door assembly, such that the door assembly may be opened at a predetermined angle, with a small amount of force, even if the opening direction of the door assembly is changed.

In the refrigerator, a filter part comprising a photocatalytic reaction filter, and an ultraviolet irradiation part irradiating ultraviolet rays are included in a grille panel comprising a cold air return guide part, and returning cold air passes through the filter part, such that the deodorization and germ removal of cold air circulating in a storage chamber may be performed at the same time.

Specific effects are described along with the above-described effects in the section of detailed description.

BRIEF DESCRIPTION OF DRAWINGS

The accompanying drawings constitute a part of the specification, illustrate one or more embodiments in the disclosure, and together with the specification, explain the disclosure, wherein.

DETAILED DESCRIPTION

Figure 1:
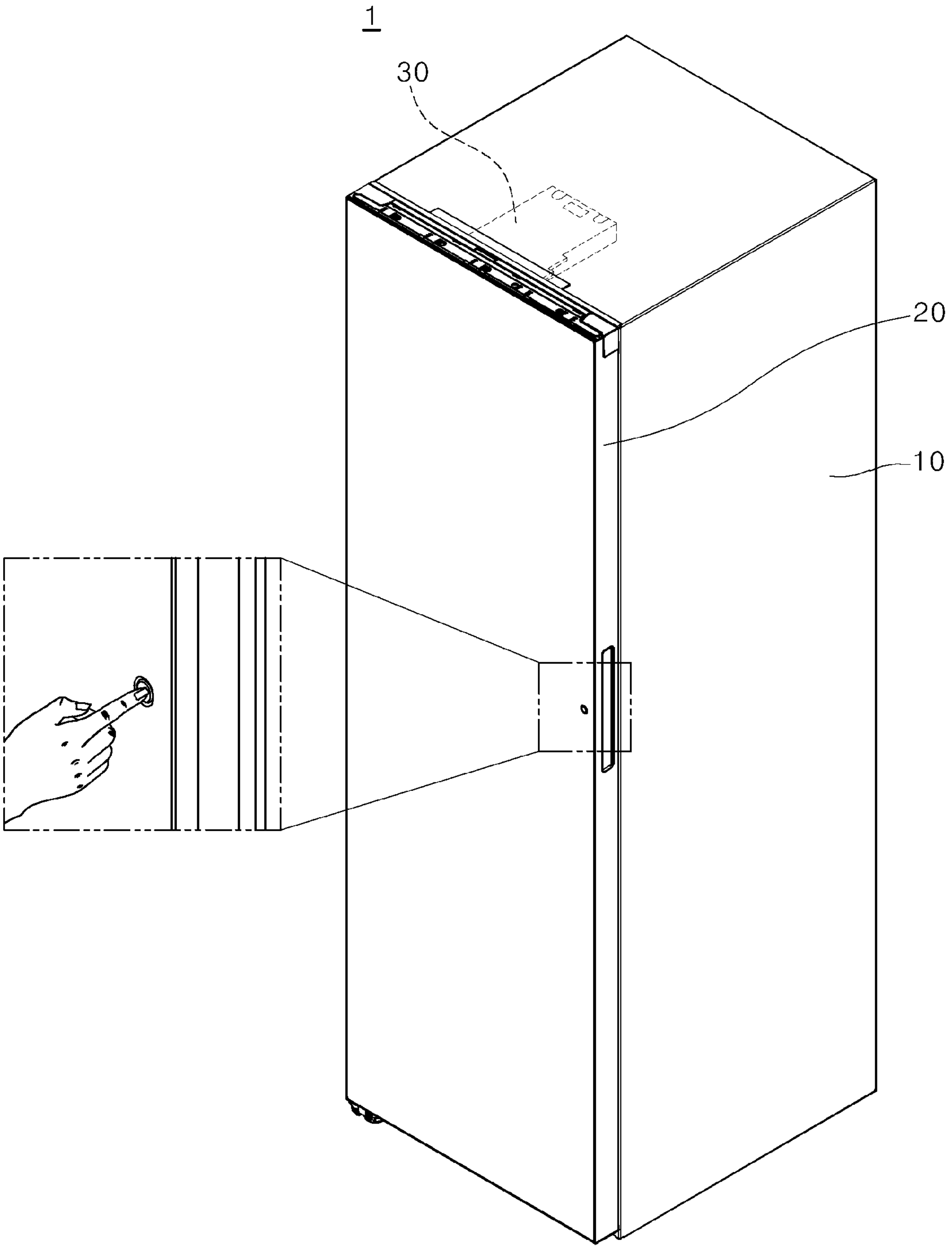
FIGS. 1 and 2 are front perspective views showing a refrigerator with a door assembly closed and open respectively.

The above-described aspects, features and advantages are specifically described hereafter with reference to the accompanying drawings such that one having ordinary skill in the art to which the present disclosure pertains can embody the technical spirit of the disclosure easily. In the disclosure, detailed description of known technologies in relation to the disclosure is omitted if it is deemed to make the gist of the disclosure unnecessarily vague. Below, preferred embodiments according to the disclosure are specifically described with reference to accompanying drawings. In the drawings, identical reference numerals can denote identical or similar components.

The terms “first”, “second” and the like are used herein only to distinguish one component from another component. Thus, the components should not be limited by the terms. Certainly, a first component can be a second component, unless stated to the contrary.

Throughout the disclosure, each component can be provided as a single one or a plurality of ones, unless explicitly stated to the contrary.

When one component is described as being “in the upper portion (or lower potion)” or “on (or under)” another component, one component can be directly on (or under) another component, and an additional component can be interposed between the two components.

When any one component is described as being “connected”, “coupled”, or “connected” to another component, any one component can be directly connected or coupled to another component, but an additional component can be “interposed” between the two components or the two components can be “connected”, “coupled”, or “connected” by an additional component.

The singular forms “a”, “an” and “the” are intended to include the plural forms as well, unless explicitly indicated otherwise. It should be further understood that the terms “comprise” or “include” and the like, set forth herein, are not interpreted as necessarily including all the stated components or steps but can be interpreted as excluding some of the stated components or steps or can be interpreted as including additional components or steps.

Throughout the disclosure, the terms “A and/or B” as used herein can denote A, B or A and B, and the terms “C to D” can denote C or greater and D or less, unless stated to the contrary.

Hereafter, a door assembly of several embodiments and a refrigerator are described.

Figure 2:
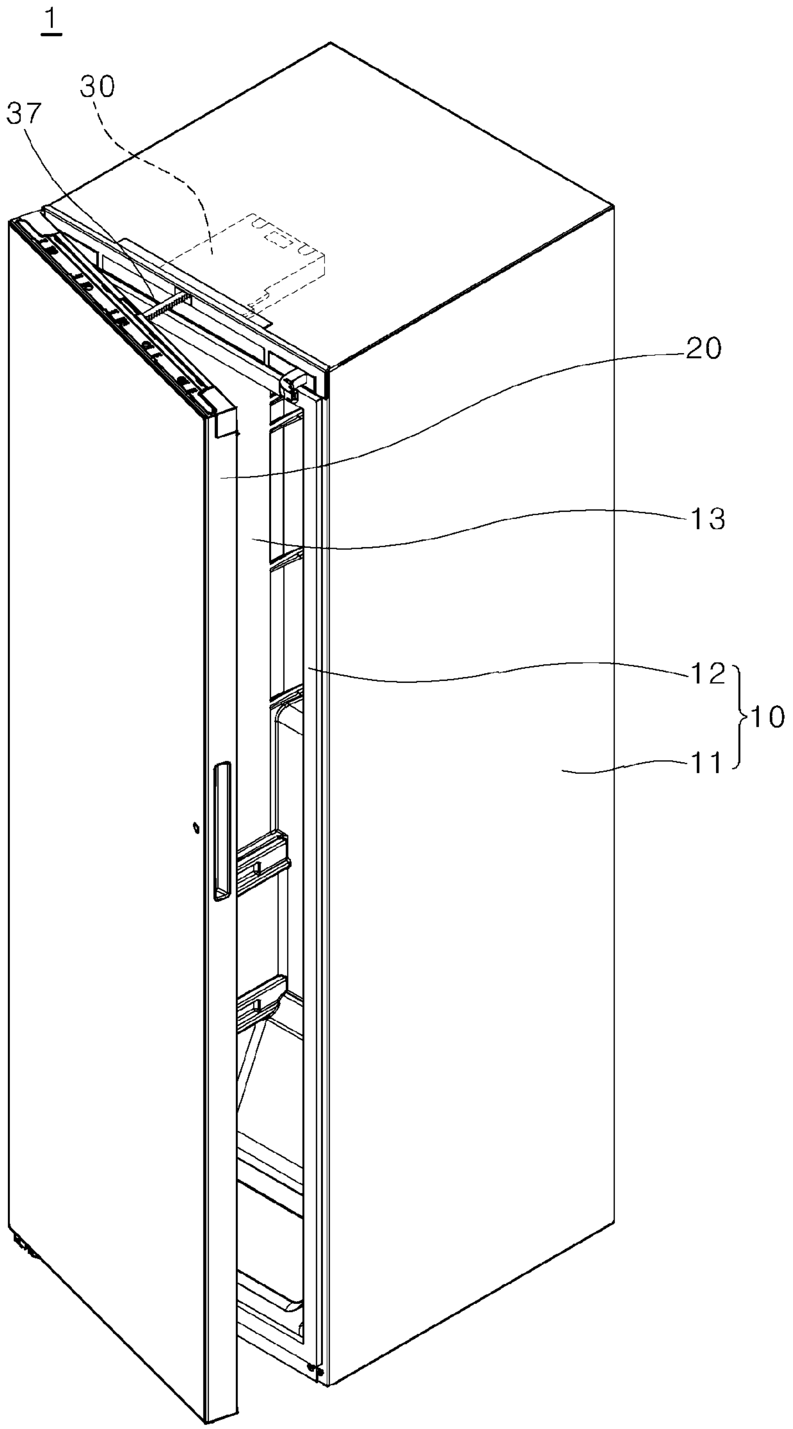

FIGS. 1 and 2 respectively are views showing a refrigerator 1 with a door assembly 20 closed and open.

The exterior of the refrigerator 1 may be formed by a cabinet 10 having a storage chamber 13 therein, and a door assembly 2 capable of opening and closing the cabinet 10's front surface that is open.

The cabinet 10 may comprise an outer case 11 forming the outer surface of the refrigerator 1, and an inner case 12 forming the inner surface of the refrigerator 1.

The outer case 11 and the inner case 12 have a space that is formed by the outer case 11 and the inner case 12 which are spaced from each other. A thermal insulator is foamed in the separation space, such that the vacant space is filled with the thermal insulator.

The storage chamber 13 may be formed into a box the front surface of which is open, and divided into one or more storage spaces.

A door opening device 30 may be disposed at the inner side of the upper portion of the cabinet 10, and automatically open the door assembly 20.

As the user touches the front surface of the door assembly 20, a rack bar 37 of the door opening device 30 is withdrawn toward the front of the refrigerator 1 and pushes the door assembly 20. Accordingly, the user can open the refrigerator 1 with a small amount of force.

Hereafter, components constituting the door assembly 20, and coupling relationships among the components are described with reference to FIGS. 3 to 42.

The door assembly 20 may comprise a touch assembly 23 comprising a touch sensor 2321, a body assembly 21 accommodating the touch assembly 23, and a panel assembly 22 detachably being coupled to the front surface of the body assembly 21.

Figure 3:
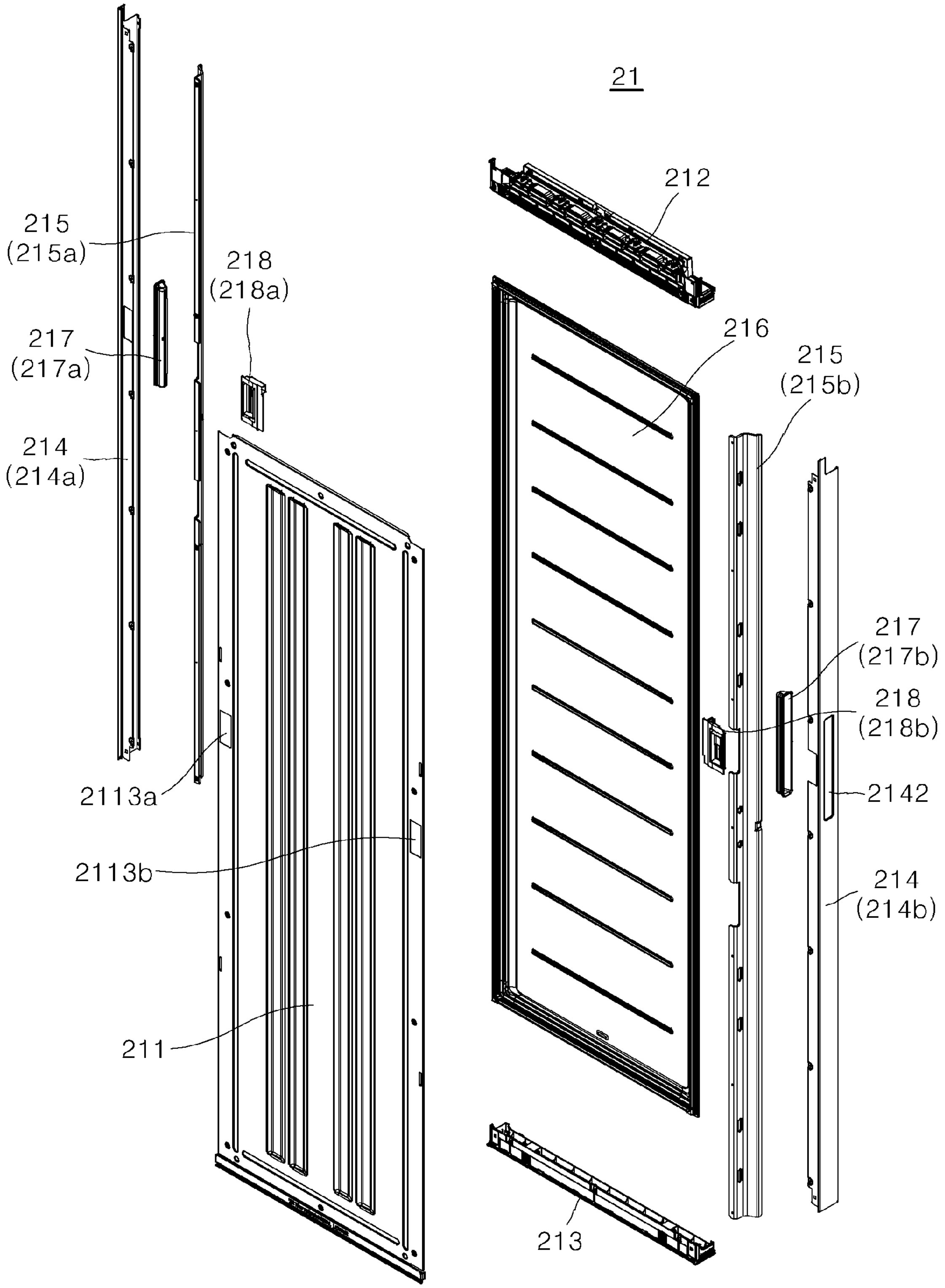
FIG. 3 is an exploded perspective view showing a body assembly.

Referring to FIG. 3, the body assembly 21 may comprise a door liner 216 constituting the rear surface thereof, a front plate 211 constituting the front surface thereof, an upper cap deco 212 constituting the upper surface thereof, a lower cap deco 213 constituting the lower surface thereof, a pair of side decos 214 constituting both sides thereof, a pair of supporters 215 being disposed on both side surfaces thereof, side handles 217 being disposed on both side surfaces thereof, and a pair of accommodation parts 218.

Additionally, a first mounting penetrating part **2113*a* and a second mounting penetrating part 2113*b* may be formed on the front plate 211**'s both side surfaces, and respectively penetrated to face the front.

Further, a first accommodation part **218*a* and a second accommodation part 218*b* may be inserted into the body assembly 21, and respectively exposed outward through the first mounting penetrating part 2113*a* and the second mounting penetrating part 2113*b***.

Each of the first side deco **214*a* and the second side deco 214*b* may have a fastening penetrating part 2142** that is penetrated to face the side.

Further, a first side handle **217*a* and a second side handle 217*b* being inserted into the body assembly 21 may respectively be exposed outward through the fastening penetrating part 2142 that is formed at the first side deco 214*a* and the second side deco 214*b***.

Furthermore, a first supporter **215*a* and a second supporter 215*b* disposed inside the body assembly 21 may respectively be formed along both side surfaces of the door assembly 20, and prevent the bend of the body assembly 21**, caused by a change in temperature.

Figure 13:
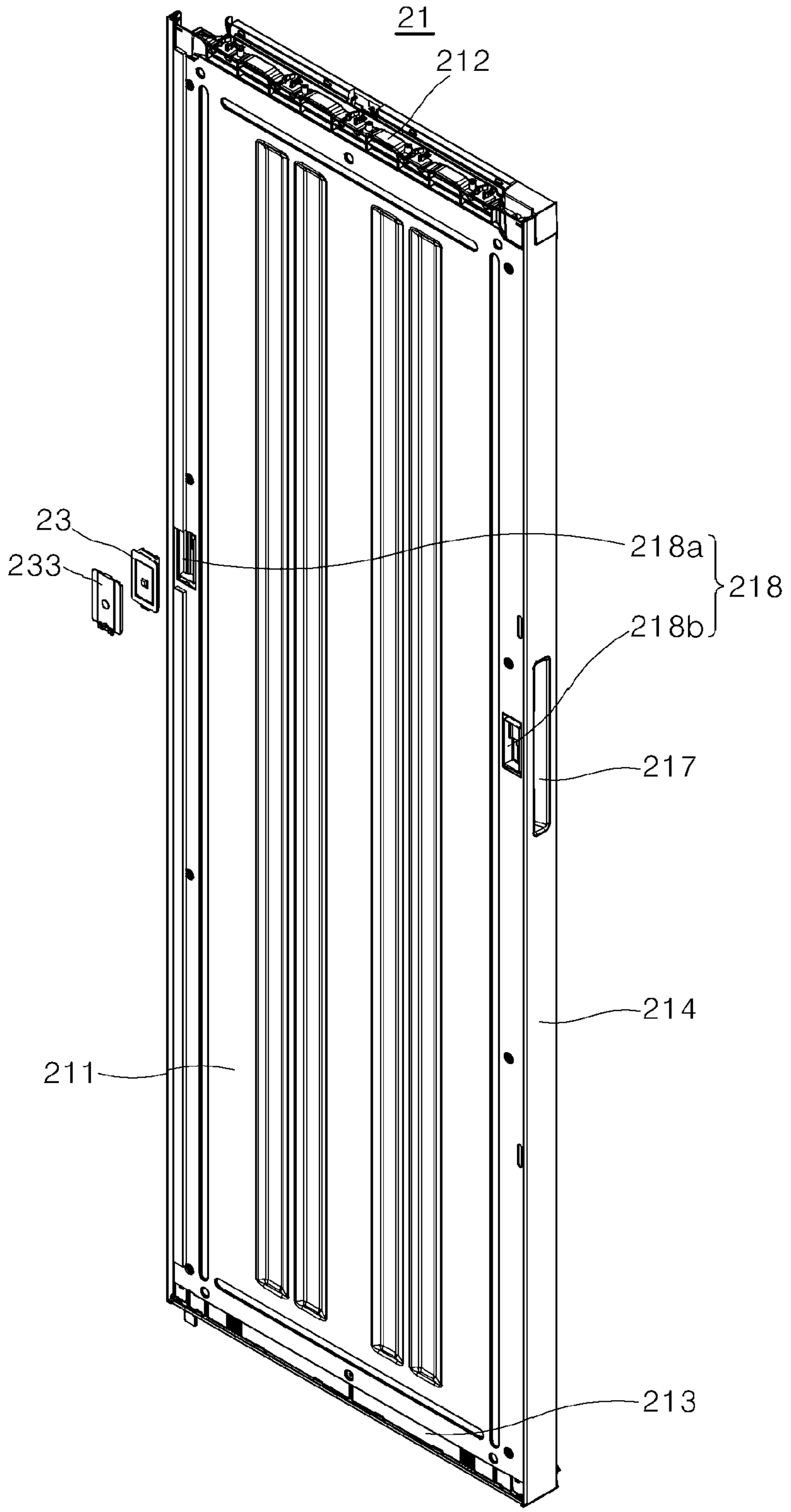
FIG. 13 is a perspective view showing a state before a touch assembly and a touch cover are coupled to a body assembly.

Referring to FIG. 13, the touch assembly 23 may be inserted into, fixed to and accommodated in one of the first accommodation part **218*a* and the second accommodation part 218*b***.

The touch assembly 23 may be inserted into the first accommodation part **218*a* or the second accommodation part 218*b*, depending on the direction in which the door assembly 20** is open.

The first accommodation part **218*a* and the second accommodation part 218*b* may be disposed symmetrically, with respect to the central portion of the body assembly 21**.

Additionally, the first side handle **217*a* and the second side handle 217*b* may be disposed symmetrically, with respect to the central portion of the body assembly 21**.

The first side handle **217*a* and the second side handle 217*b* may respectively be inserted into the body assembly 21, and may not be exposed outward in the front surface direction of the door assembly 20 while being exposed outward in the side surface direction of the door assembly 20**.

Thus, the door assembly 20 according to the present disclosure may have a constant front surface exterior regardless of the direction in which the door assembly 20 is open.

The exterior of the door assembly 20 according to the present disclosure may be changed as long as the panel assembly 22 is only changed, rather than the body assembly 21.

That is, the pair of accommodation parts 218 that is included in the body assembly 21 and accommodates the touch assembly 23, and the pair of side handles 217 that serves as a handle do not need to change. Thus, the number of components which are changed may decrease and the number of commonly used components may increase.

Further, even when the direction, in which the door assembly 20 according to the present disclosure is open, changes, the number of components which are changed may decrease and the number of commonly used components may increase since the pair of accommodation parts 218 and the pair of side handles 217 that are included in the body assembly 21 do not need to change.

The panel assembly 22 may be embodied in a different form, depending on a material for a front panel 221 constituting the front surface of the panel assembly 22.

Figure 4:
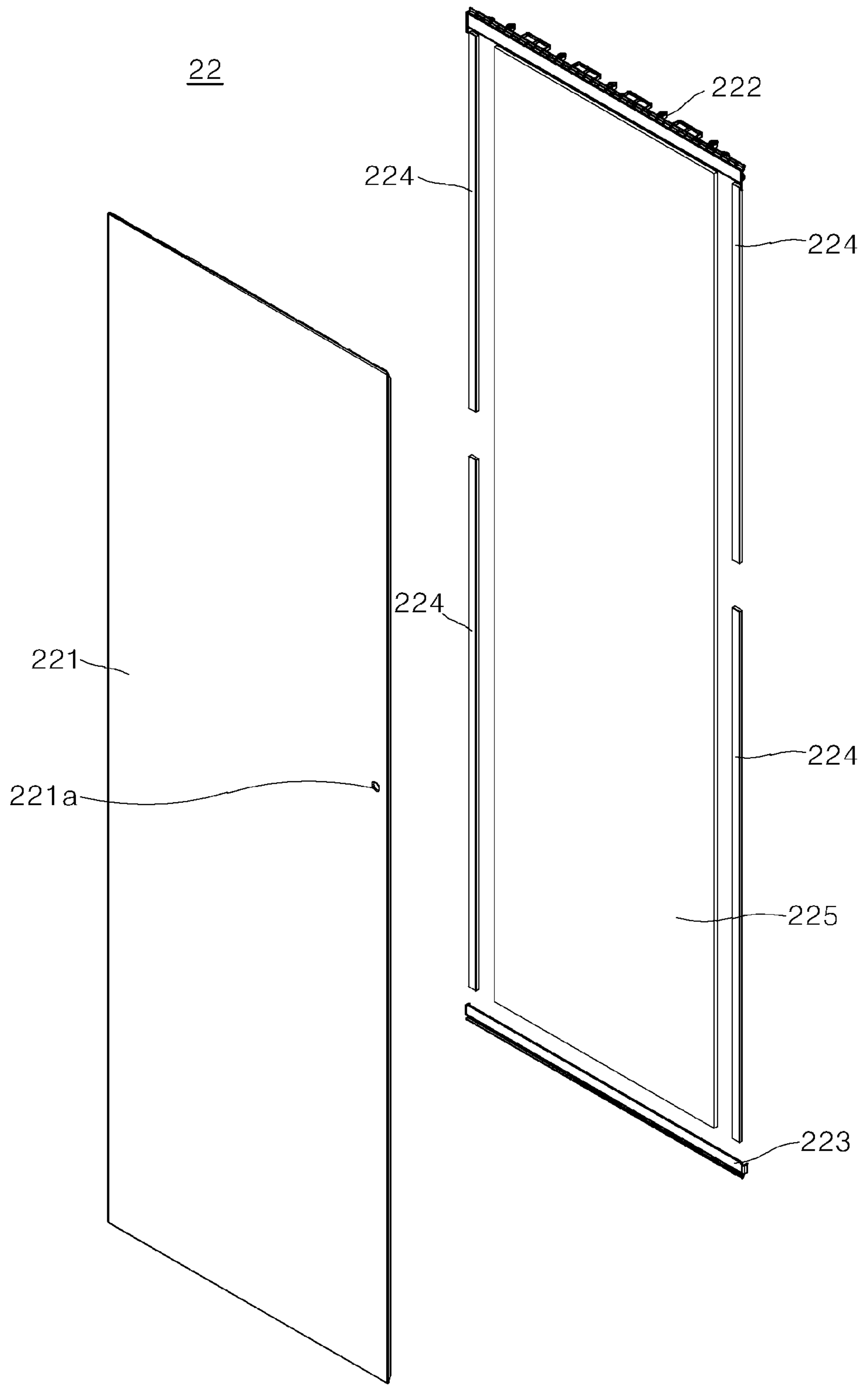
FIG. 4 is an exploded perspective view showing a panel assembly of one embodiment.
Figure 5:
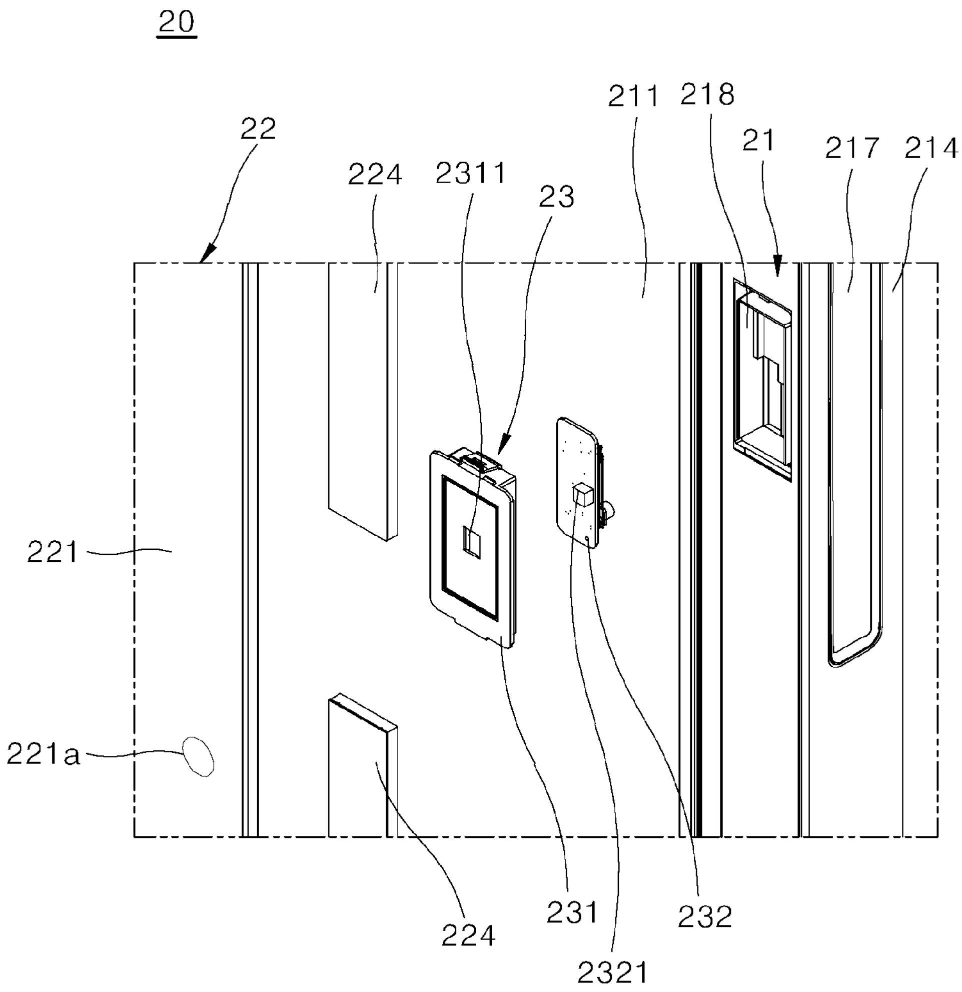
FIG. 5 is an enlarged exploded perspective view showing partial areas of a panel assembly, a door assembly and a body assembly in one embodiment.
Figure 6:
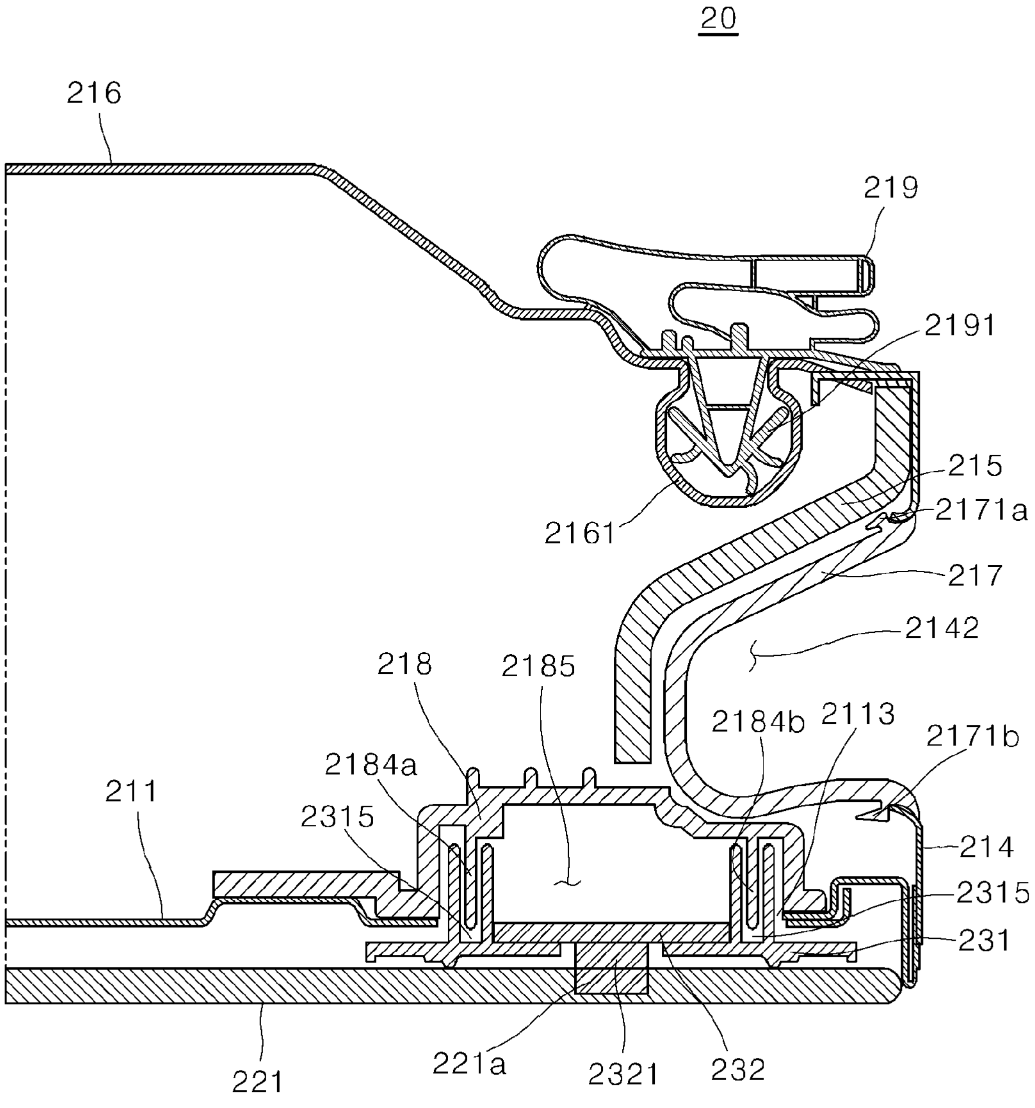
FIG. 6 is a top cross-sectional view showing the door assembly of one embodiment.
Figure 7:
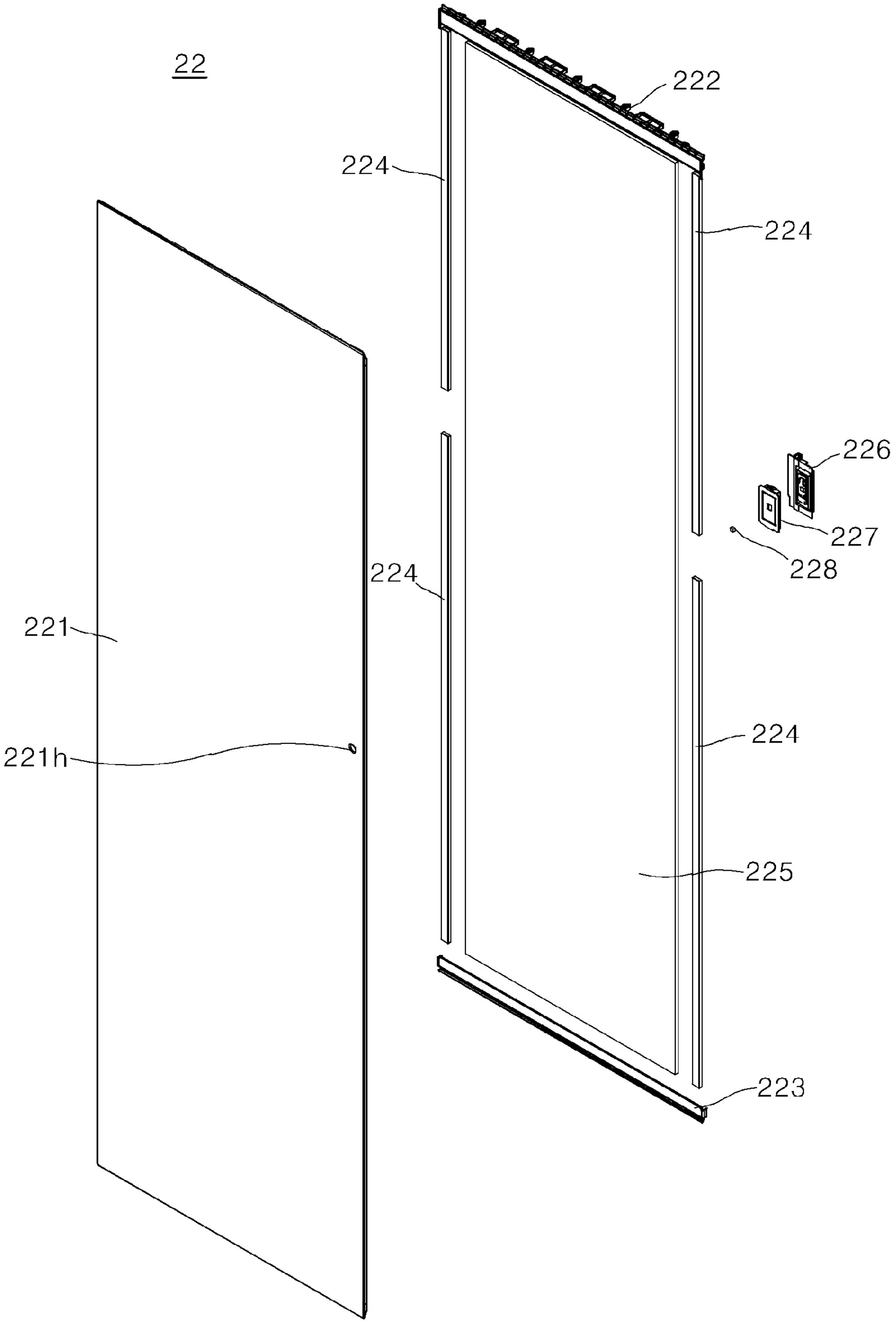
FIG. 7 is an exploded perspective view showing a panel assembly of another embodiment.
Figure 8:
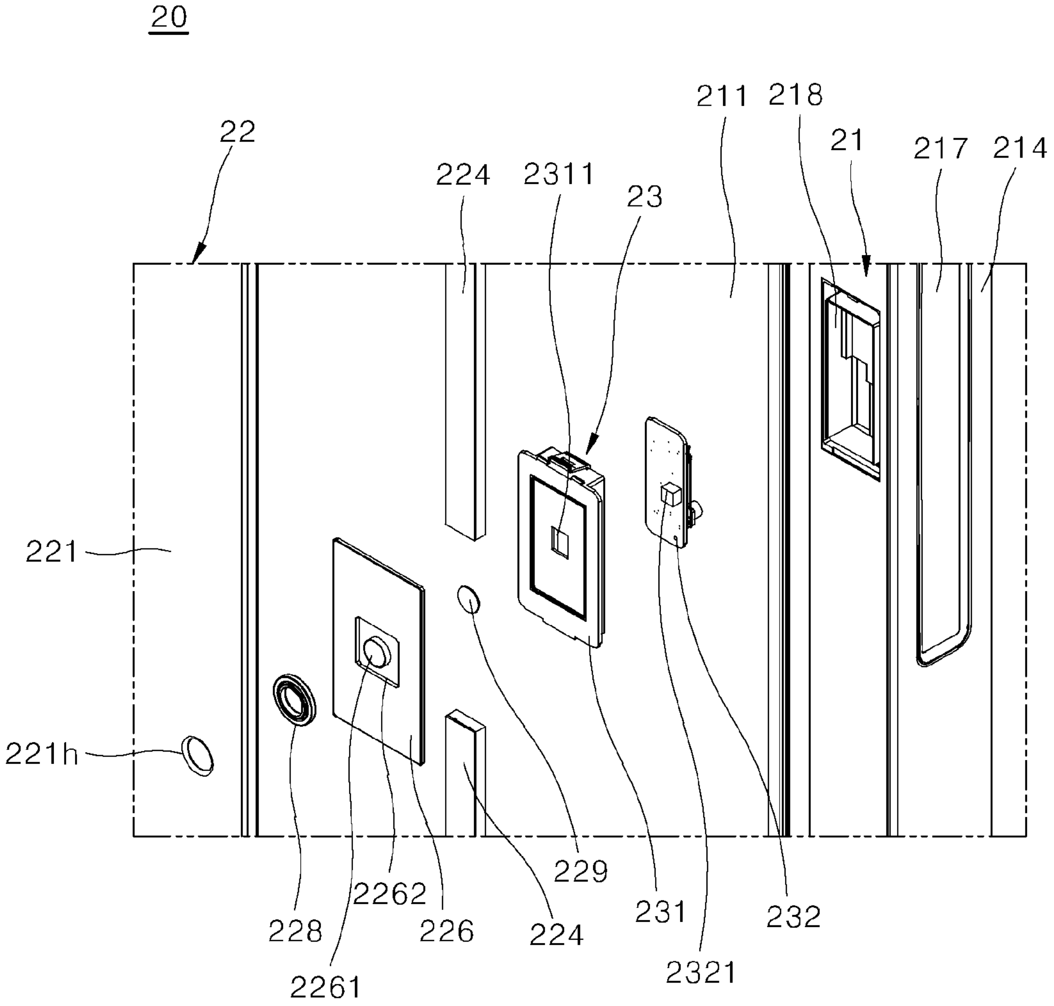
FIG. 8 is an enlarged exploded perspective view showing partial areas of a panel assembly, a door assembly and a body assembly in another embodiment.
Figure 9:
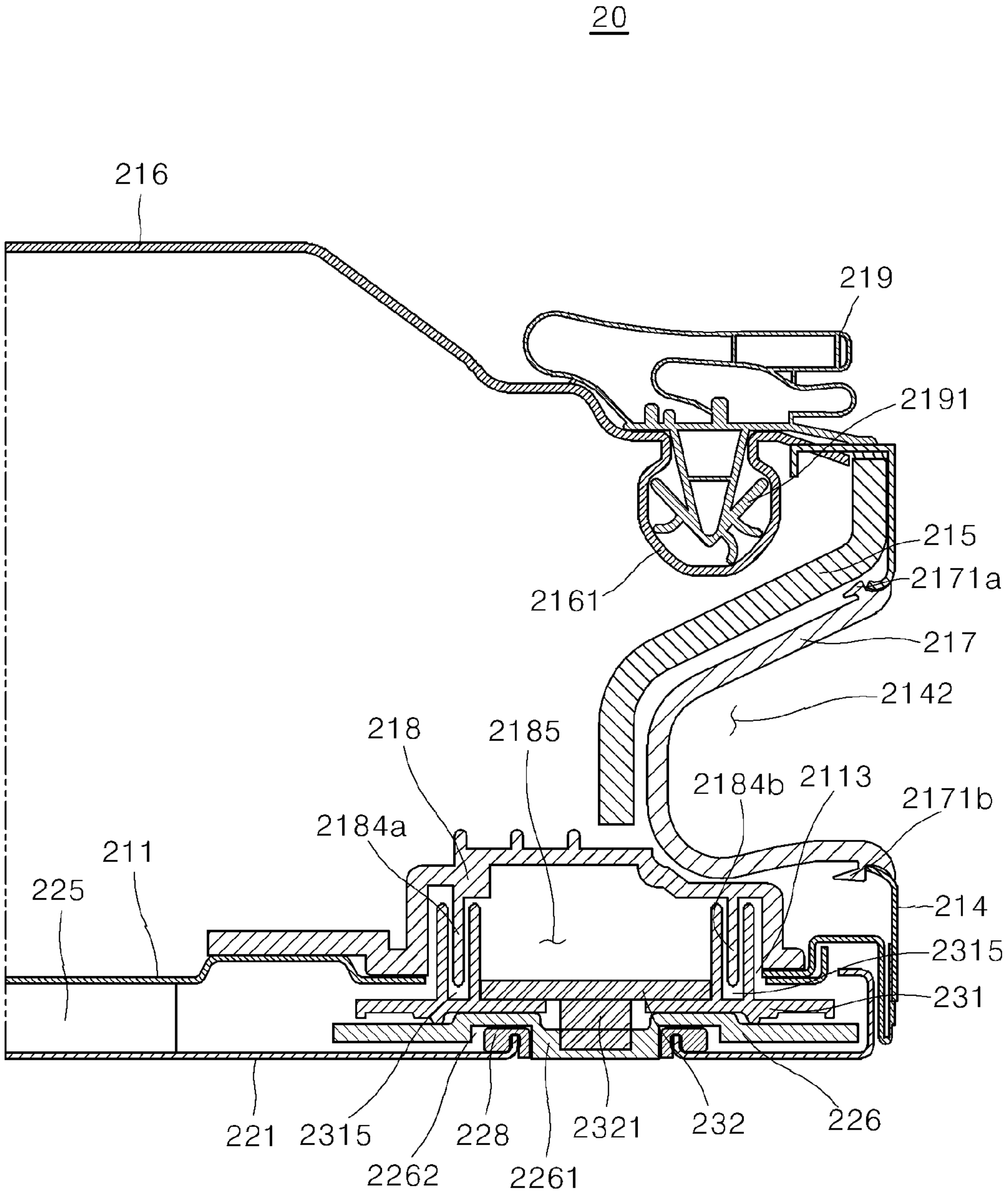
FIG. 9 is a top cross-sectional view showing the door assembly of another embodiment.

Referring to FIGS. 4 to 6, the panel assembly 22 of one embodiment may comprise a front panel 221 constituting the front surface of the panel assembly 22, an upper bracket 222 constituting the upper surface of the panel assembly 22, a lower bracket 223 constituting the lower surface of the panel assembly 22, gasket foam 225 being disposed on the back surface of the front panel 221, and a plurality of magnets 224 being disposed along both side surfaces of the gasket foam 225.

FIGS. 5 and 6 show the touch assembly 23 being inserted into the second accommodation part **218*b* that is disposed at the right side of the door assembly 20, such that the door assembly 20** is opened counterclockwise, as an example.

The front panel 221, for example, may be made of a non-conducive material such as glass.

A touch display part **221*a* may be formed on the front surface of the front panel 221 and disposed to correspond to the touch sensor 2321 disposed on the back surface of the front panel 221**.

The touch display part **221*a* may be formed in a way that the touch display part 221*a* is printed on the front surface of the front panel 221, and the user may touch the touch display part 221*a* to open the door assembly 20**.

The plurality of magnets 224 may be elongated in the up-down direction and disposed along both the side surfaces of the gasket foam 225. Specifically, the plurality of magnets 224 arranged along one side surface may be discontinuously disposed in an area where the touch assembly 23 is disposed.

Accordingly, the plurality of magnets 224 may be disposed, not to overlap the touch assembly 23 in the front-rear direction.

The panel assembly 22 may be fixed to the front plate 211 of the body assembly 21 by the magnetic force of the plurality of magnets 224 in a way that the panel assembly 22 is freely attached and detached without falling downward.

The touch assembly 23 may comprise a touch panel 232 comprising the touch sensor 2321 and a touch case 231 being coupled the front surface of the touch panel 232.

The touch sensor 2321 may involve an electrostatic capacity-based touch sensor that senses a touch signal of the user who touches the front panel 221, but not be limited.

The touch case 231 may protect the touch panel 232 from external static electricity and damage, and couple and fix the touch assembly 23 to the accommodation part 218 of the body assembly 21.

The touch case 231 may comprise a touch hole 2311 that exposes the touch sensor 2321, and the touch sensor 2321 of the touch panel 232 being coupled to the back surface of the touch case 231, may be exposed outward through the touch hole 2311 of the touch assembly 23.

Accordingly, in terms of the touch assembly 23, the user touches the front surface of the panel assembly 22, and the touch sensor 2321 senses the user's touch, since the touch sensor 2321 is disposed to face the rear surface of the panel assembly 22.

The touch panel 232 is disposed on the back surface of the front panel 221 in a way that the touch panel 232 is inserted into and fixed to the body assembly 21. Accordingly, the touch sensor 2321 may not protrude further forward than the front panel 221.

Thus, in the case of a door assembly 20 of the present disclosure, the user touches the front surface of the panel assembly 22, without an additional protruding part for recognizing a touch on the front surface of the panel assembly 22, such that the exterior of the front surface of the door assembly and ease of use of a product improve.

Referring to FIG. 6, a gasket groove 2161 may be formed around the perimeter of the rear surface of the door liner 216, and the gasket 219 may be inserted into and fixed to the gasket groove 2161. A gasket mounting part 2191 protruding from the gasket 219 may be inserted into the gasket groove 2161, and the gasket 219 may be fixed to the gasket mounting part 2191.

The side deco 214 finishing the side surface of the door liner 216 may be fastened and fixed to the end portion of one side of the door liner 216.

The side handle 217 may have a U shape and be inserted into the door assembly 20.

The side deco 214 may comprise a fastening penetrating part 2142 the side surface of which is open, and the side handle 217 may be inserted into the fastening penetrating part 2142 of the side deco 214 and then held, coupled and fixed to the fastening penetrating part 2142 of the side deco 214 by a first fastening jaw **2171*a* formed on the outer circumferential surface of one side of the side handle 217 and a second fastening jaw 2171*b* formed on the outer circumferential surface of the other side of the side handle 217**.

Figure 34:
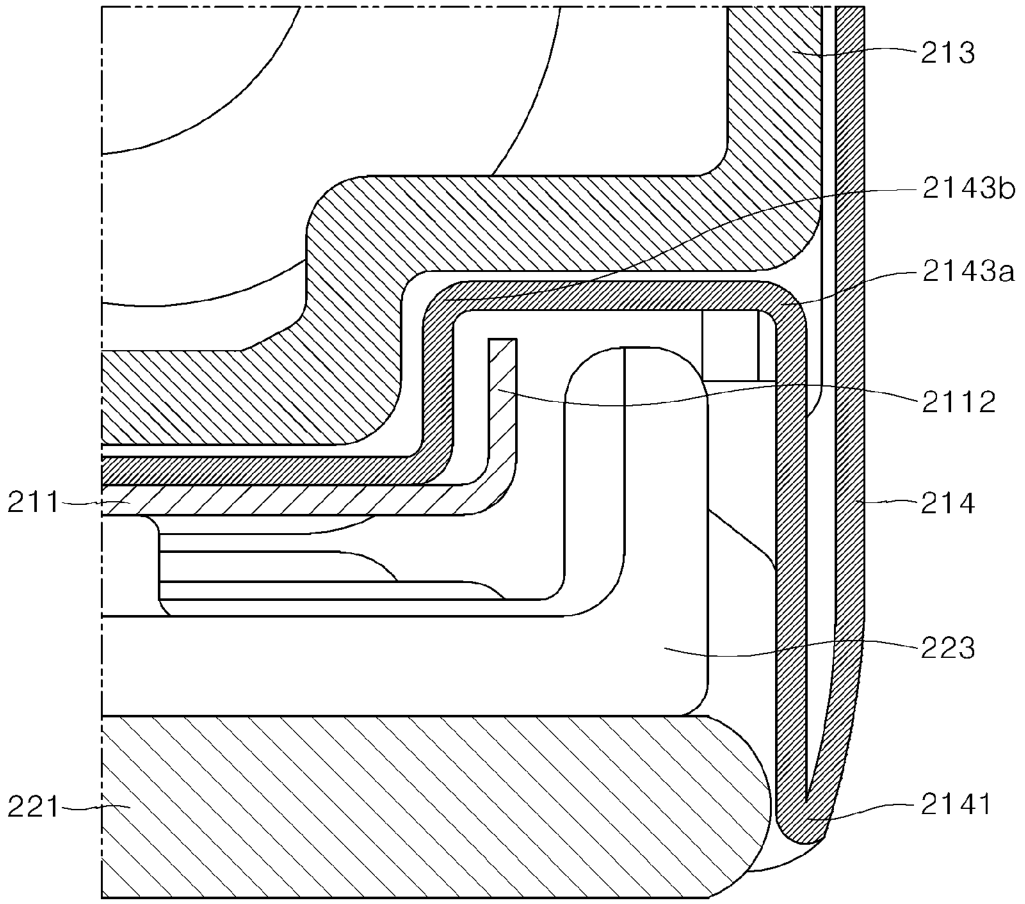
FIG. 34 is an enlarged top cross-sectional view showing one side end of a door assembly.
Figure 35:
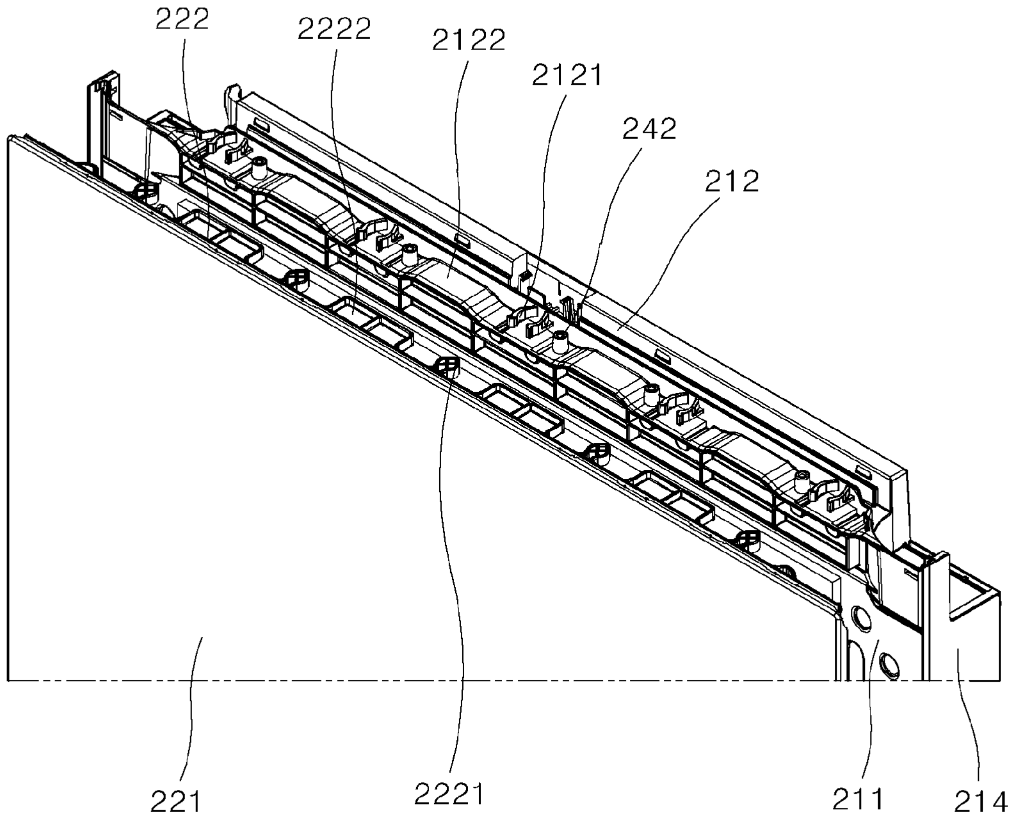
FIG. 35 is a perspective view showing an upper bracket of a panel assembly is coupled to an upper cap deco of a body assembly.
Figure 36:
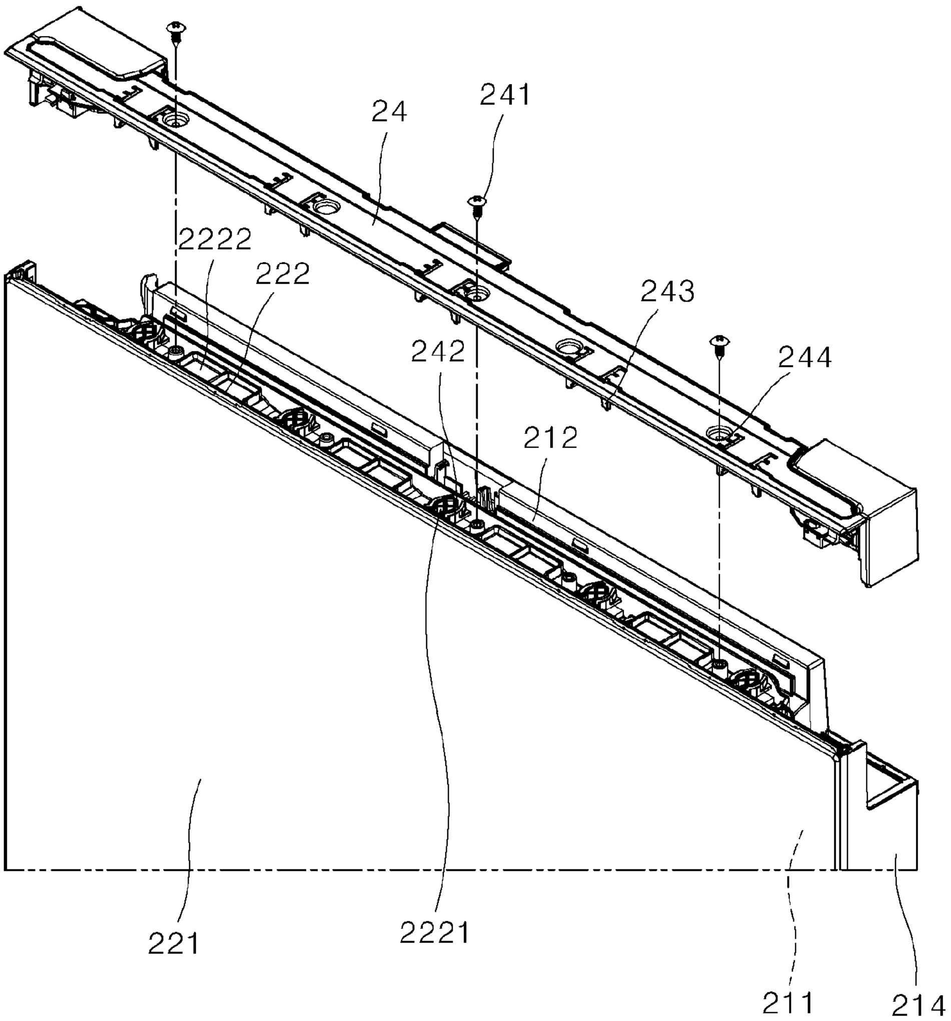
FIG. 36 is a perspective view showing a state before a deco cover is additionally coupled to the upper cap deco and the upper bracket that are coupled.
Figure 37:
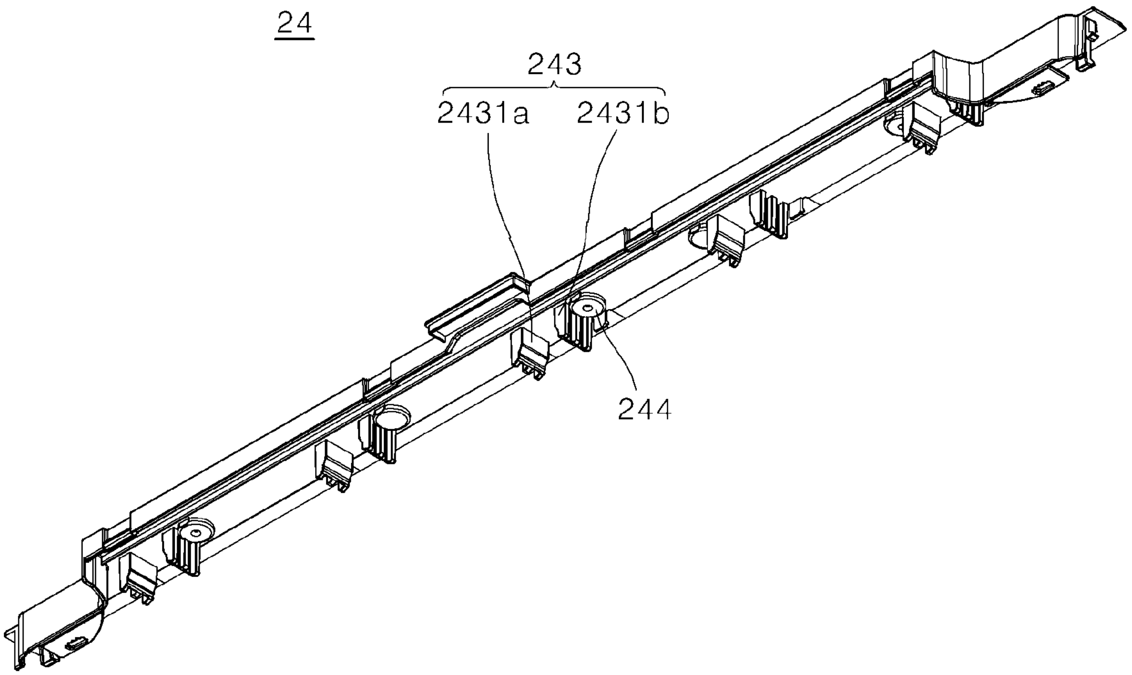
FIG. 37 is a rear perspective view showing a deco cover.
Figure 38:
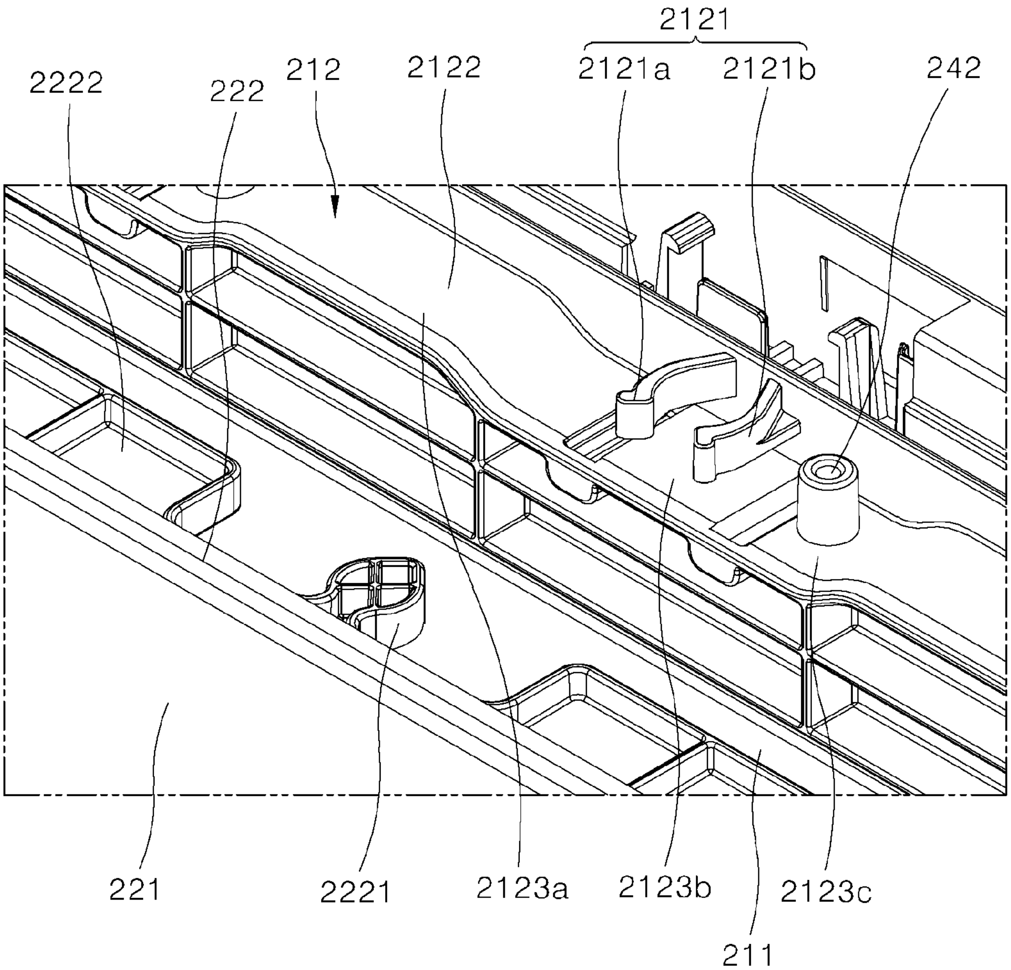
FIG. 38 is an enlarged perspective view showing an upper bracket of a panel assembly is coupled to an upper cap deco of a body assembly.
Figure 39:
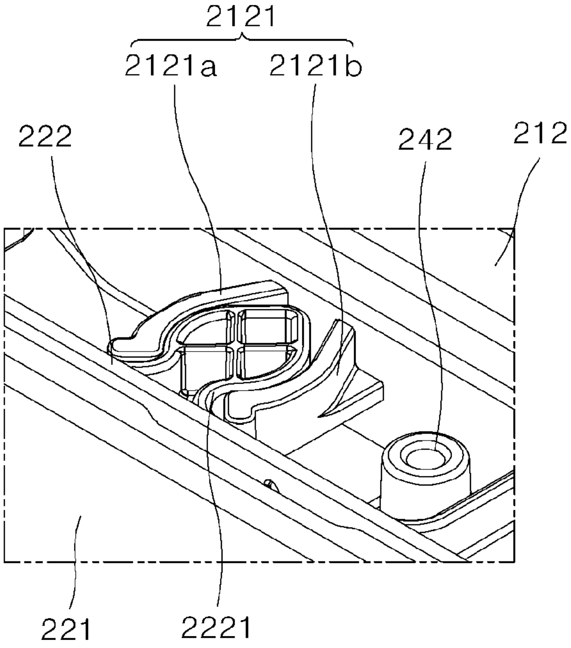
FIG. 39 is an enlarged perspective view showing an upper cap deco is coupled to an upper bracket.
Figure 40:
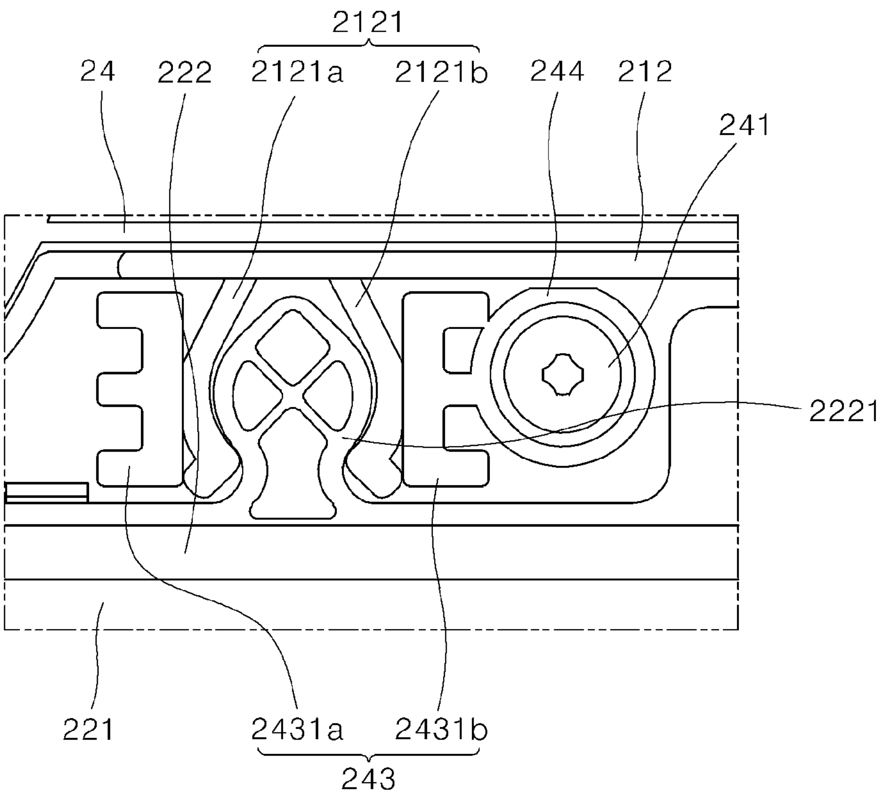
FIG. 40 is a top cross-sectional view showing a deco cover is additionally coupled to the upper cap deco and the upper bracket that are coupled.
Figure 41:
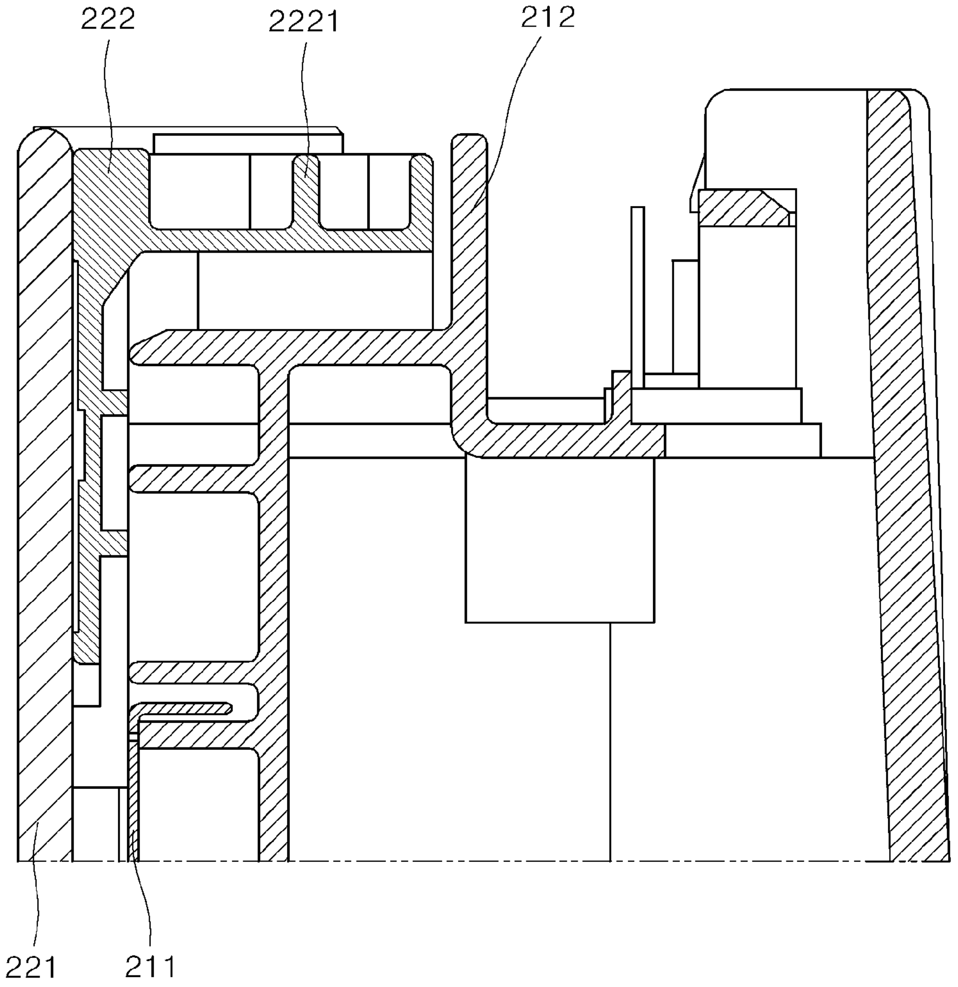
FIG. 41 is an enlarged lateral cross-sectional view showing an upper cap deco is coupled to an upper bracket.
Figure 42:
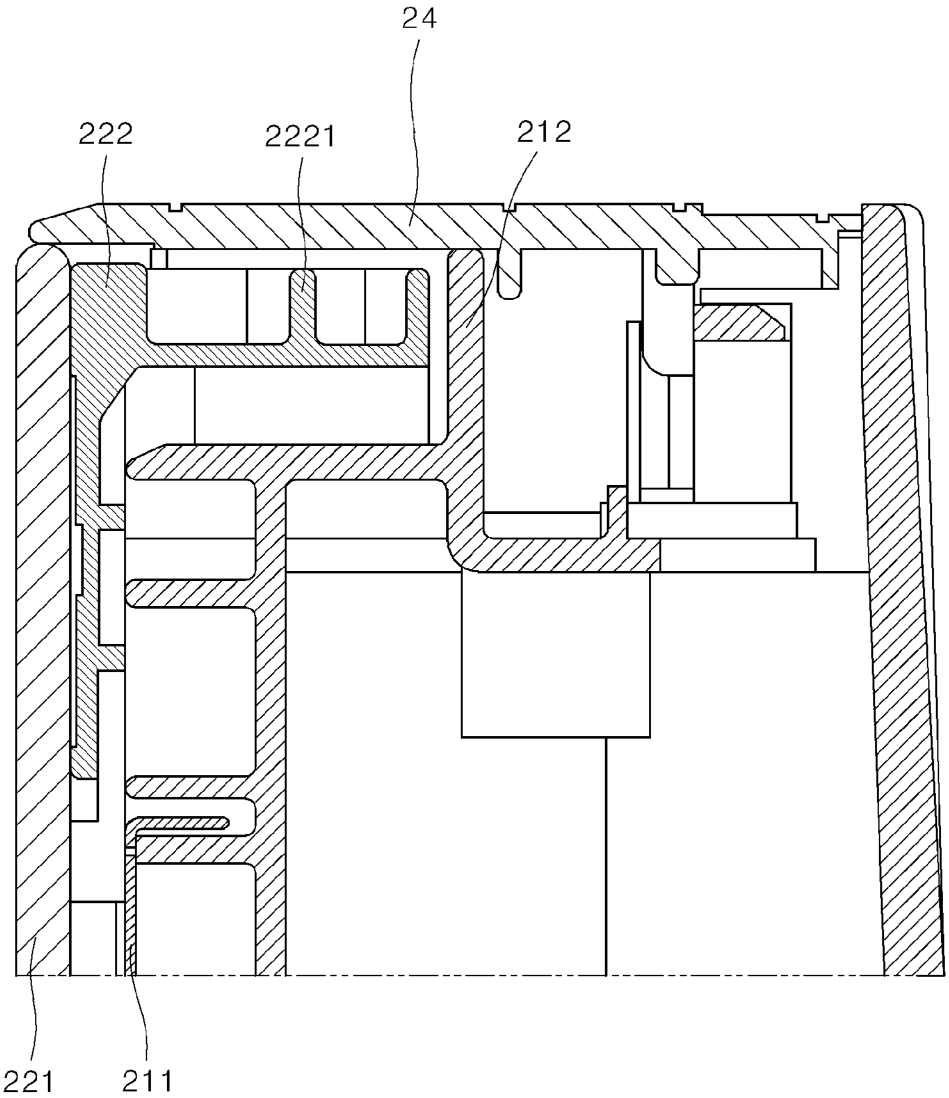
FIG. 42 is a lateral cross-sectional view showing a deco cover is additionally coupled to the upper cap deco and the upper bracket that are coupled.

Referring further to FIG. 34, the side deco 214 may comprise a bend support part 2141 that protrudes further in a front direction more than the front plate 211.

In terms of the bend support part 2141, an outer side surface constituting the exterior of the side surface of the door assembly 20 is elongated in the front surface direction to the position where the front panel 221 is placed, and bends in the rear surface direction at the position where the front panel 221 is placed and is elongated.

The bend support part 2141 may support the side surface of the panel assembly 22, specifically, the side surface of the front panel 221.

That is, the pair of side decos 214, disposed on the door assembly 20's both sides, may comprise a bend support part 2141 protruding further in the front surface direction than the front plate 211, respectively, and a pair of bend support parts 2141 may support the panel assembly 22's both side surfaces to prevent the left-right movement of the panel assembly 22 as a time of assembling the panel assembly 22.

The bend support part 2141 may have a predetermined separation space therein and have elasticity, and help to assemble and fix the panel assembly 22 readily.

The side deco 214 may be formed to have a first bend part **2143*a* that bends inward from the end portion of the bend support part 2141 elongated in the rear surface direction, and a second bend part 2143***b* that bends in the front surface direction again in the end portion of the first bend part 2143*a*.

Accordingly, the side deco 214 may comprise a space that is inserted in the rear surface direction by the first bend part 2143*a* and the second bend part 2143*b*, and a door assembly 20 may be embodied, which has a slim thickness since the end portions of various types of components constituting the front surface of the door assembly 20, such as a plate bend part 2112 formed in a way that the end portion of the front plate 211 bends, or the lower bracket 223 and the like, are inserted into the space.

The accommodation part 218 may be exposed through the mounting penetrating part 2113 of the front plate 211, and the touch case 231 of the touch assembly 23 may be coupled to the exposed accommodation part 218.

The accommodation part 218 may comprise a first lateral wall 2184*a* and a second lateral wall 2184*b* that are elongated along both sides of the inside of the accommodation part 218, and the first lateral wall 2184*a* and the second lateral wall 2184*b* may be inserted into a guide space 2315 of the touch case 231, which protrudes in the rear surface direction, such that the touch case 231 may be guided in the left-right direction at a time of coupling the touch case 231 to the accommodation part 218.

At least a partial area of the side handle 217 may be disposed to overlap the touch assembly 23 in the front-rear direction of the door assembly 20.

If the side handle 217 and the touch assembly 23 are far from each other, the user needs to hold the side handle 217 far from the touch assembly 23 after touching the touch assembly 23, causing inconvenience to the user and causing deterioration in ease of use.

The side handle 217 and the touch assembly 23 are disposed to overlap each other at least partially so that a distance between the side handle 217 and the touch assembly 23 may decrease as much as possible. Accordingly, the user may hold the handle at the same time as the user touches the touch assembly 23, ensuring improvement in ease of use.

The panel assembly 22 described above has a front panel 221 made of a non-conductive material, in an example. Hereafter, a front panel 221 made of a conductive material is described as another example, with reference to FIGS. 7 to 9.

Details of parts that changes depending on a material for the front panel 221 are provided additionally, and details the same as those of the above-described door assembly 20 made of a non-conductive material are omitted.

The front panel 221, for example, may be made of a conductive material such as metal.

In the case of a front panel 221 made of a conductive material, even if the user touches the front panel 221, a touch signal is not delivered to the touch assembly 2. To prevent this from happening, a cover plate 226 made of a non-conductive material such as plastic may be additionally disposed on the back surface of the front panel 221.

A front surface hole 221*h* penetrating the front panel 221 may be formed in a position of the front panel 221, which is touched by the user.

The cover plate 226 may have a button part 2261 on the front surface thereof, in a prominent manner.

The outer diameter of the button part 2261 may be less than the inner diameter of the front surface hole 221*h* such that the button part 2261 of the cover plate 226 is exposed outward through the front surface hole 221*h*.

The cover plate 226 may be attached and fixed to the back surface of the front panel 221 through an adhesive member 227.

In the door assembly 20 of the present disclosure, in the case of a front panel 221 made of a conductive material, the cover plate 226 may be additionally disposed between the touch assembly 23 and the front panel 221 such that the front panel 221 maintains constant touch recognition sensitivity, unlike a front panel 221 made of a non-conductive material.

Thus, the exterior may change freely despite a change in the material for the front panel 221.

A protective member 228 having a hollow-hole ring shape may be additionally disposed between the cover plate 226 and the front panel 221.

The protective member 228 may be made of silicone, and a cover plate 226-induced scratch on the exterior of the front panel 221, e.g., an area of the front panel 221, exposed through the front hole 221*h*, may decrease.

The edge part of the front surface of the protective member 228 is fit-coupled to the back surface of the front panel 221 having the front surface hole 221*h*, and serve as a buffer between the cover plate 226 and the front surface hole 221*h* of the front panel 221.

The inner diameter of the protective member 228 may be less than the inner diameter of the front surface hole 221*h* and greater than the outer diameter of the button part 2261, such that the button part 2261 penetrates the protective member 228.

Accordingly, the outer circumferential surface of the button part 2261 may directly contact the inner circumferential surface of the protective member 228 without directly contacting the front panel 221.

The cover plate 226 may have a groove part 2262 on the front surface thereof, and the groove part 2262 allows the protective member 228 to sit along surroundings of the button part 2261.

The protective member 228 may be disposed to sit in the groove part 2262 and surround the outer circumferential surface of the button part 2261.

A conductive sheet 229 may be additionally disposed between the cover plate 226 and the touch assembly 23.

The conductive sheet 229 has a surface area greater than that of the touch sensor 2321 of the touch assembly 23 and covers the touch sensor 2321, and helps to improve the touch sensitivity of the touch sensor 2321.

The conductive sheet 229 may be a carbon sheet, for example, and the carbon sheet may be formed in a way that carbon is applied to a plastic sheet.

When the panel assembly 22 of the door assembly 20 according to the present disclosure is replaced, constant touch recognition sensitivity needs to be maintained regardless of the material for the front panel 221, to decrease the number of components which are changed and increase the number of commonly used components.

For example, in the case of a front panel 221 made of glass or metal, there is a difference in the sensitivity of the front panel 221 depending on the thickness and material of the front panel 221 at a time of measuring touch sensitivity.

Even when the front panel 221 made of glass has a thickness greater than that of the front panel 221 made of metal, the front panel 221 made of glass may be more sensitive to a touch than the front panel 221 made of metal.

In the case of a front panel 221 made of a conductive material such as metal, a conductive sheet 229 may be additionally provided to increase a touch signal reception area and increase touch sensitivity.

That is, the sensitivity of the touch sensor 2321 is adjusted without additional software and not affected by a change in the material for the front panel 221, and the exterior of the front panel 221 may improve freely, thereby increasing the number of commonly used components.

Hereafter, the configuration of the touch assembly 23, and the coupling structure of the touch assembly 23, being coupled to the accommodation part 218 of the body assembly 21, are described with reference to FIGS. 10 to 26.

Figure 10:
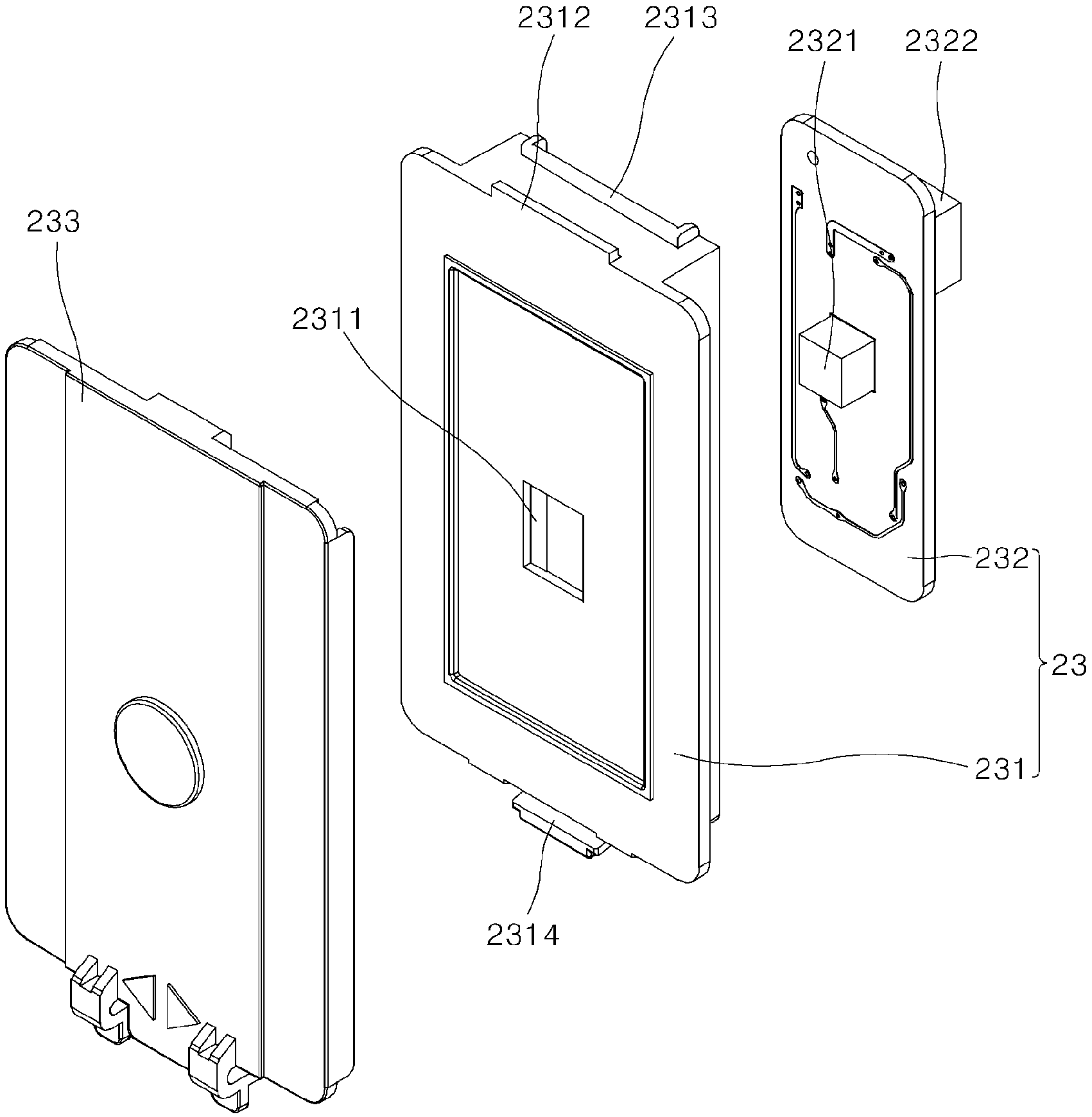
FIG. 10 is an exploded perspective view showing a touch assembly and a touch cover.
Figure 11:
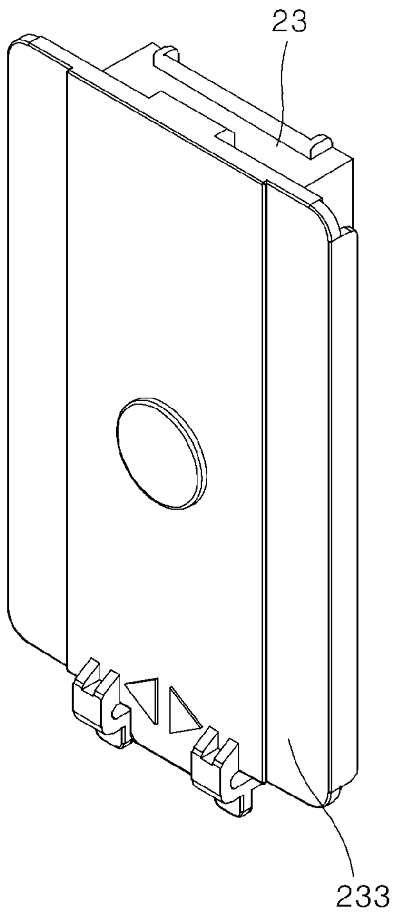
FIG. 11 is a perspective view showing a touch cover coupled to the front surface of a touch assembly.

Referring to FIGS. 10 and 11, a touch cover 233 may be additionally mounted on the front surface the touch assembly 23 comprising the touch panel 232 and the touch case 231.

The touch cover 233 may protect the touch assembly 23 accommodated in the accommodation part 218 of the body assembly 21, in the state where the panel assembly 22 on the front surface of the body assembly 21 is removed.

Accordingly, when the touch assembly 23 is inserted into the accommodation part 218 of the body assembly 21, in the state where the touch cover 233 is coupled to the front surface of the touch assembly 23, and then coupled with the panel assembly 22, the touch cover 233 needs to be removed.

The touch case 231 may have a rear surface rib 2313 at the rear of one side surface thereof, and the rear surface rib 2313 may protrude in a way that the rear surface rib 2313 is elongated along the left-right direction. Additionally, the touch case 231 may have a front surface rib 2312 at the front of one side surface thereof, and the front surface rib 2312 may protrude in a way that the front surface rib 2312 is elongated along the left-right direction.

Figure 12:
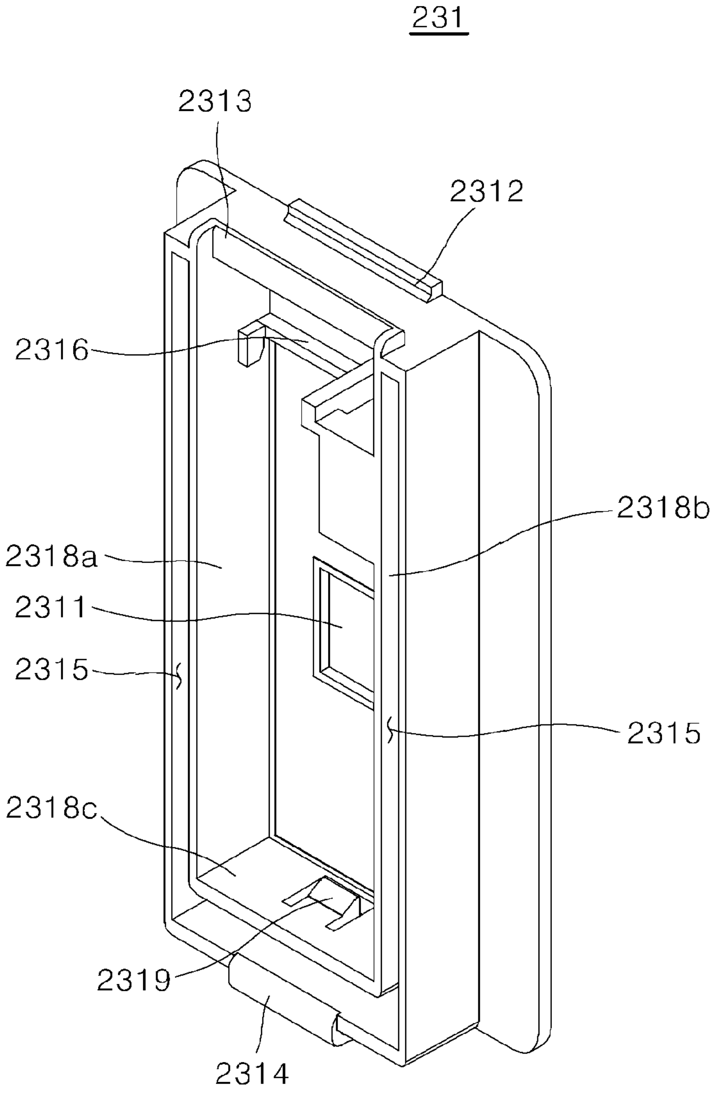
FIG. 12 is a rear perspective view showing a touch case.

In the disclosure, one side surface and the other side surface of the touch case 231 may denote the upper surface and the lower surface respectively, referring to FIGS. 10 and 12.

Depending on the direction of coupling of the touch case 231, the upper surface and the lower surface are overturned in the up-down direction. Accordingly, the direction of coupling of the touch case 231 is not limited to the up-down direction.

However, hereafter, one side surface and the other side surface of the touch case 231, which are respectively the upper surface and the lower surface of the touch case 231, are described as an example, for convenience of description.

Likewise, the terms like the upper surface and the lower surface are used for the accommodation part 218 of the touch cover 233 for convenience of description. However, the accommodation part 218 may be overturned in the up-down direction. Thus, the up-down direction of the accommodation part 218 is not limited by the terms.

The touch case 231 may have an elastic bend part 2314 at the rear of the lower surface thereof, in a way that the elastic bend part 2314 bends and extends along the front-rear direction.

A distance between the elastic bend part 2314 and the lower surface of the touch case 231 may increase toward the front.

A through-hole 2314*a* may be formed in a partial area around the center of the elastic bend part 2314, in a penetrating manner.

The touch cover 233 may have an upper hook part 2331, on the upper surface thereof, and the upper hook part 2331 may protrude downward and be held and coupled to the front surface rib 2312 of the touch case 231.

Additionally, the touch cover 233 may have a lower hook part 2332, the lower surface thereof and the lower hook part

2332 may be fit-coupled to the elastic bend part 2314 of the touch case 231, such that the touch cover 233 may be attached and detached easily.

The accommodation part 218 of the body assembly 21 may comprise a storage space 2185 in which the touch panel 232 is stored, and an insertion space 2183 in which the elastic bend part 2314 is stored.

The accommodation part 218 may comprise a connection wall 2184*c* that protrudes forward in a position adjacent to the lower surface of the accommodation part 218, and a storage space 2185 that is divided by the first lateral wall 2184*a* and the second lateral wall 2184*b* which respectively connect to one side and the other side of the connection wall 2184*c* and are elongated upward.

The insertion space 2183 may be a lower area of the storage space 2185 and distinguished from the storage space 2185 by the connection wall 2184*c*.

A holding jaw 2181 may be formed at the front of the upper surface of the accommodation part 218 and protrude in the downward direction where the storage space 2185 is placed, and a protruding part 2181 may be formed at the front of the lower surface of the accommodation part 218 and protrude in the upward direction where the insertion space 2183 is placed.

Referring to FIG. 12, the touch case 231 may comprise a guide space 2315, into which the first lateral wall 2184*a*, the second lateral wall 2184*b* and the connection wall 2184*c* are inserted, on the rear surface thereof.

Specifically, a connection extension part 2318*c* that protrudes rearward in a position adjacent to the lower surface of the touch case 231, and a first side surface extension part 2318*a* and a second side surface extension part 2318*b* that connect to one side and the other side of the connection extension part 2318*c* and extend upward may be formed inside the touch case 231.

The guide space 2315 may be formed by the connection extension part 2318*c*, the first side surface extension part 2318*a* and the second side surface extension part 2318*b* that are formed as described above.

The guide space 2315 of the touch case 231 may help to guide the touch case 231 accurately in a coupling direction at a time when the touch case 231 is coupled to the accommodation part 218.

A fitting wall 2319 may be formed on the upper surface of the connection extension part 2318*c* of the touch case 231 and protrude upward, and a fitting jaw 2316 may be formed at the upper side of the touch case 231 and protrude rearward.

One side of the touch panel 232 may be held by the fitting jaw 2316, and the other side may be held by the fitting wall 2319, such that the touch panel 232 is fixed and coupled to the touch case 231 without an additional fastening means.

The touch panel 232 coupled to the touch case 231 and accommodated in the storage space 2185 of the accommodation part 218 may be spaced a predetermined distance apart from the rear surface of the accommodation part 218.

For example, a touch PCB 2322 may be disposed on the back surface of the touch panel 232, and as the touch PCB contacts the rear surface of the accommodation part 218, may be damaged by static electricity produced in an electrical conductor.

Accordingly, the touch PCB 2322 of the touch panel 232 may be spaced a predetermined distance apart from the accommodation part 218, for example.

Figure 20:
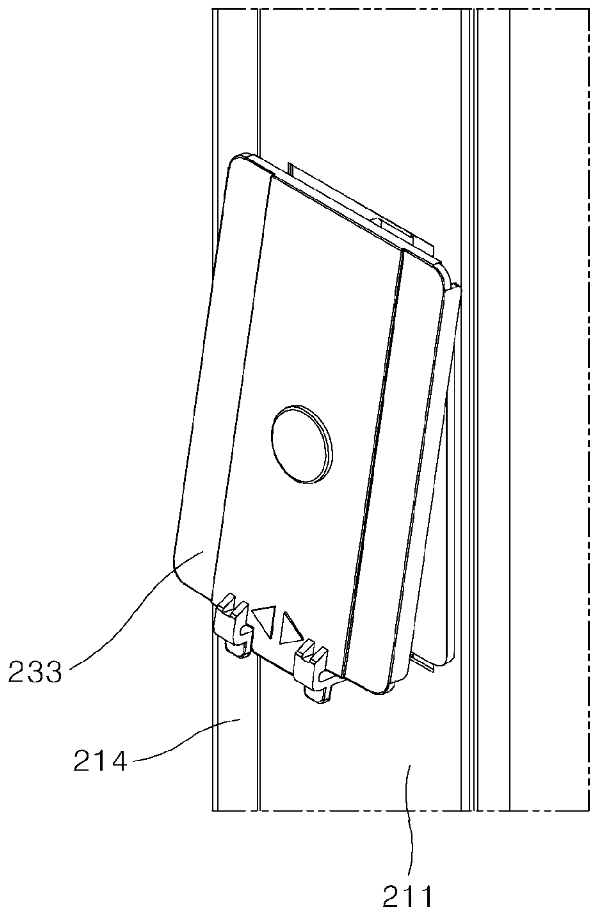
FIG. 20 is a perspective view showing a primary coupling of a touch assembly to the upper side of an accommodation part.
Figure 22:
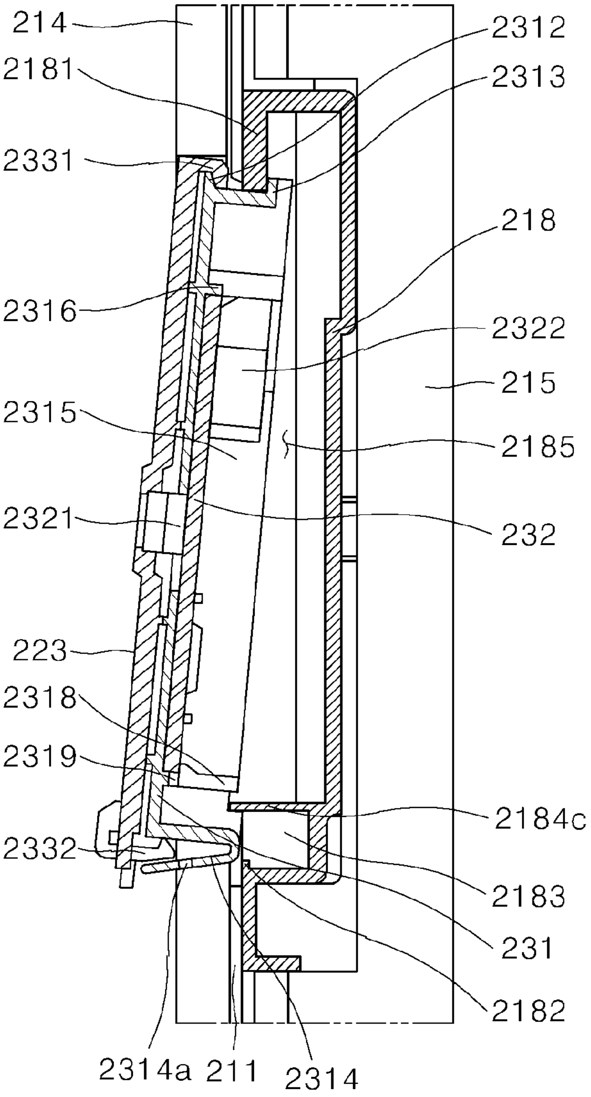
FIG. 22 is a lateral cross-sectional view showing a primary coupling of a touch assembly to the upper side of an accommodation part.
Figure 25:
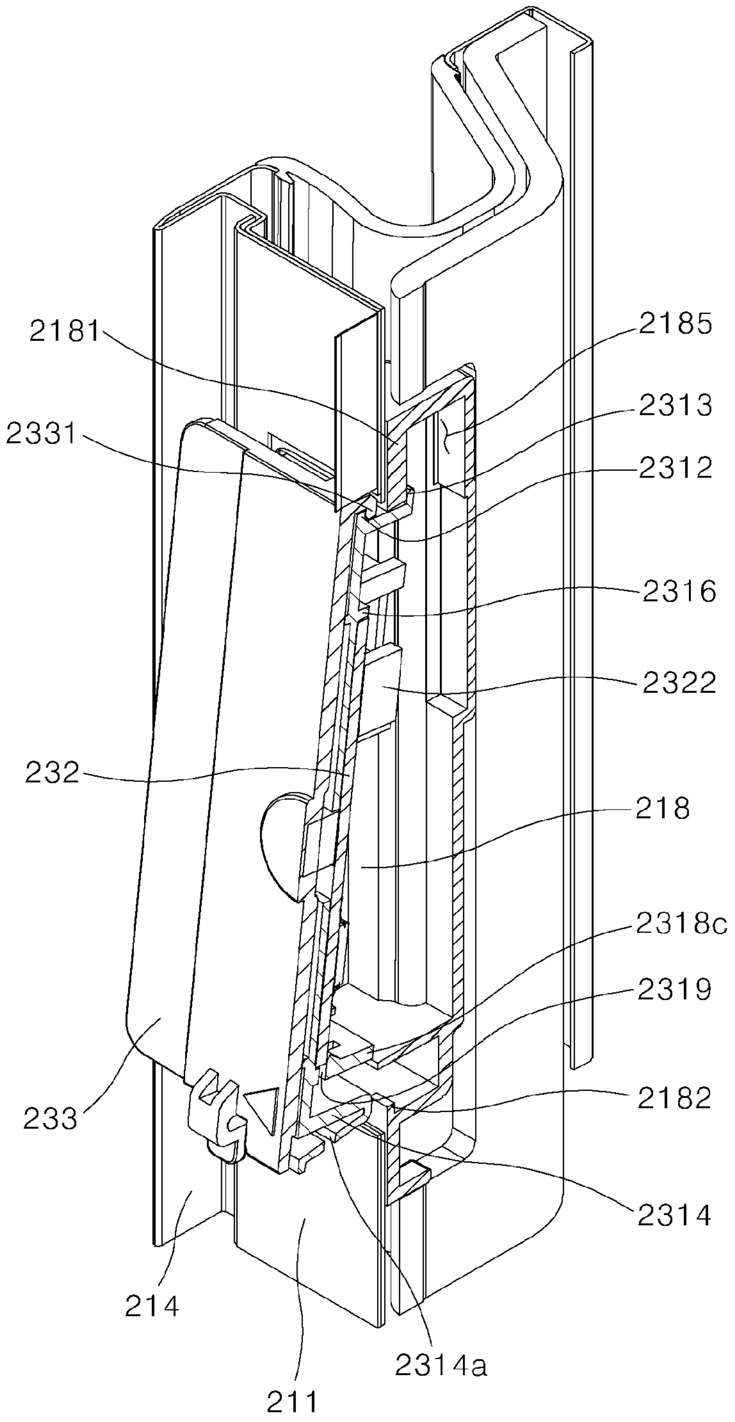
FIG. 25 is a perspective cross-sectional view showing a primary coupling of a touch assembly to the upper side of an accommodation part.

As the touch assembly 23 having the above-described structure is coupled to the accommodation part 218, a primary coupling may enable the rear surface rib 2313 of the touch case 231 to be held by the holding jaw 2181, on the back surface of the holding jaw 2181 of the accommodation part 218, as illustrated in FIGS. 20, 22 and 25.

Figure 21:
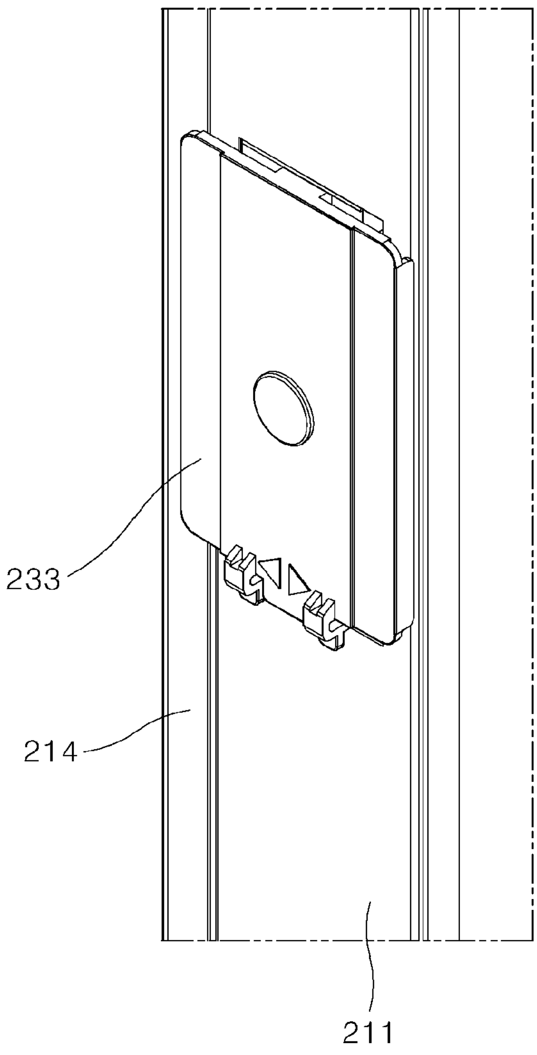
FIG. 21 is a perspective view showing a secondary coupling of the touch assembly to the lower side of the accommodation part.
Figure 23:
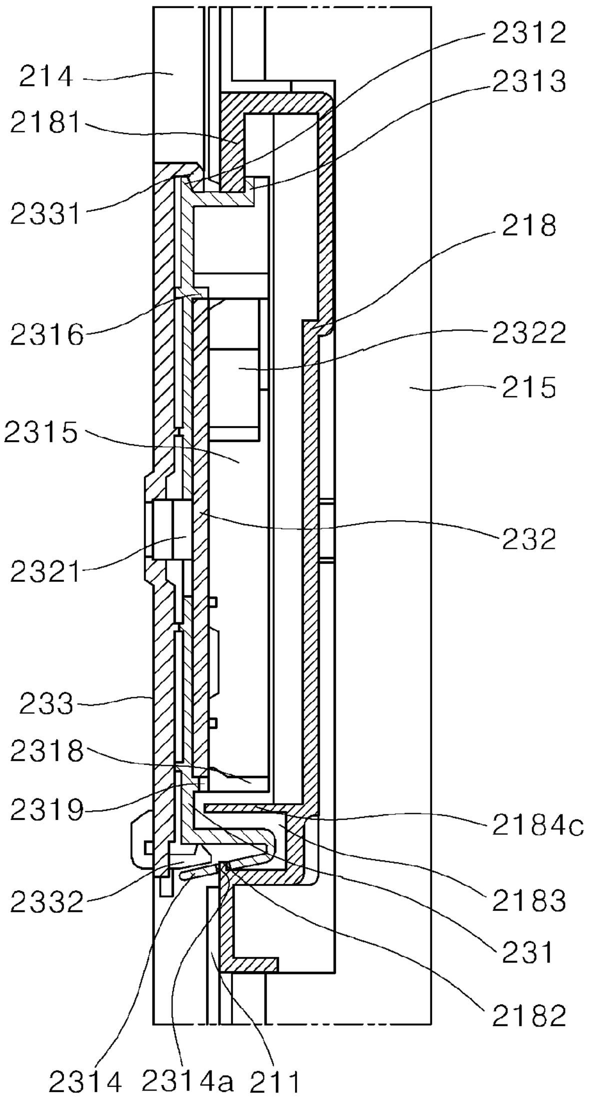
FIG. 23 is a lateral cross-sectional view showing a secondary coupling of the touch assembly to the lower side of the accommodation part.
Figure 24:
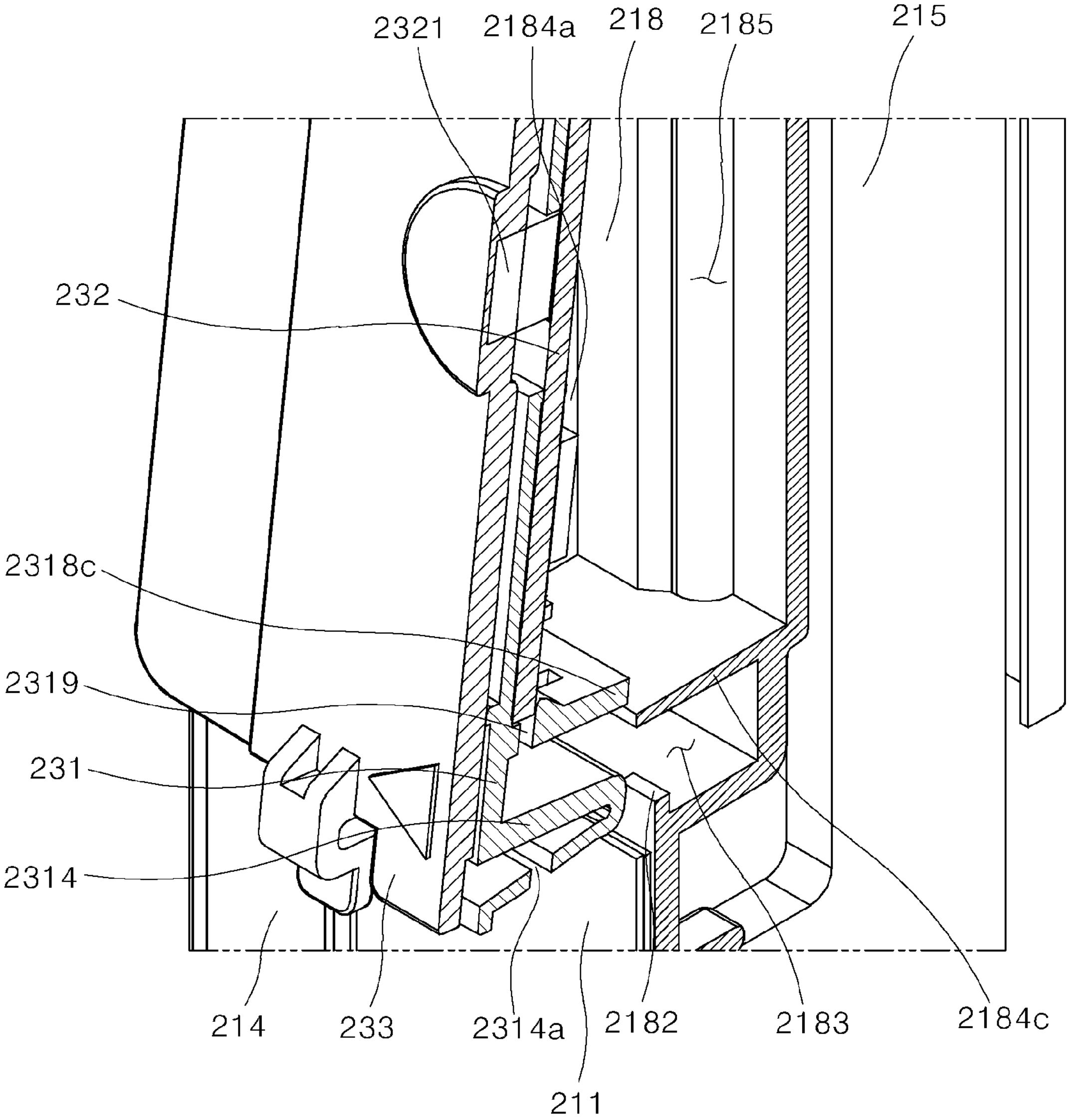
FIG. 24 is a perspective cross-sectional view showing a state before a touch assembly is coupled to an accommodation part.
Figure 26:
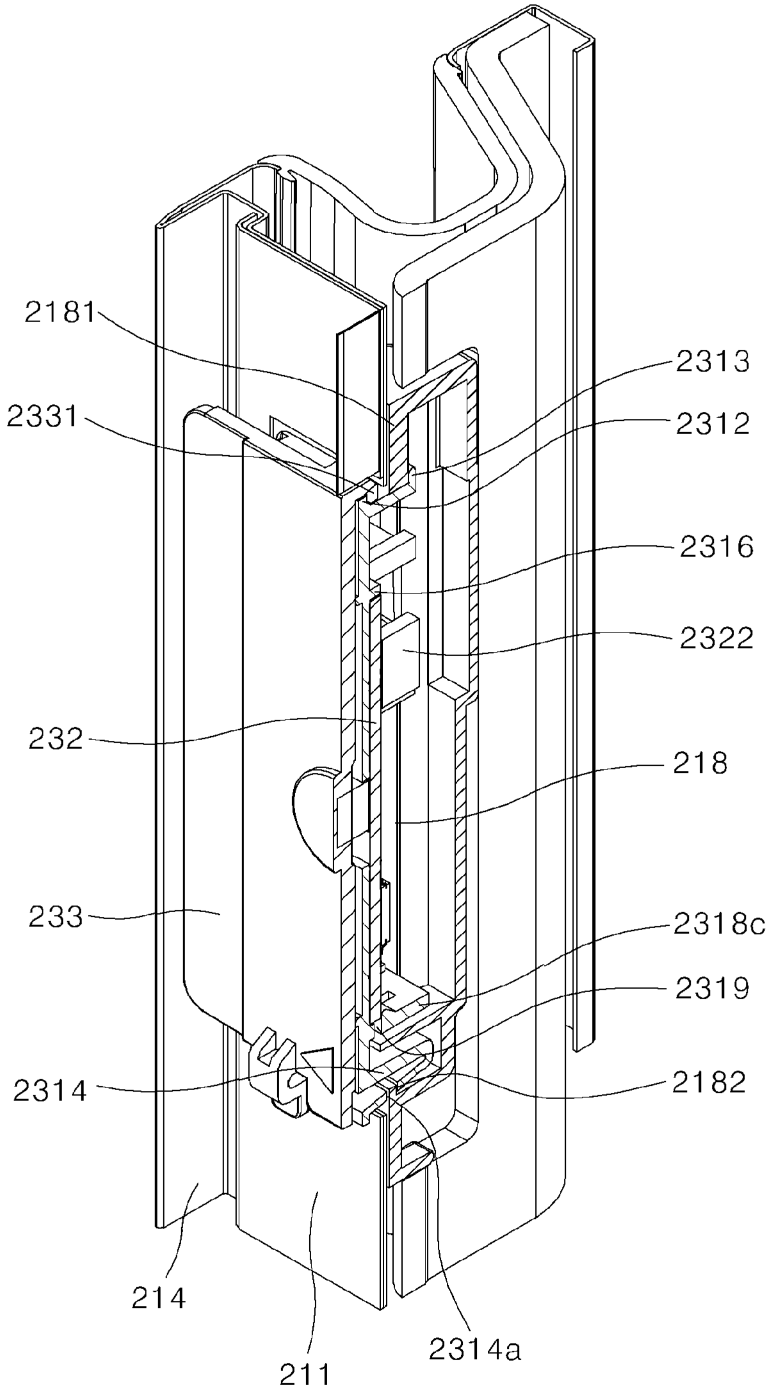
FIG. 26 is a perspective cross-sectional view showing a secondary coupling of the touch assembly to the lower side of the accommodation part.

Then a secondary coupling may enable a projection part 2182 of the accommodation part 218 to be inserted into the through-hole 2314*a* of the elastic bend part 2314 of the touch case 231, and enable the touch assembly 23 to be fixed to the accommodation part 218, as illustrated in FIGS. 21, 23 and 26.

The touch assembly 23 may separate in a reverse order to the order in which the touch assembly 23 is coupled.

Accordingly, as the end portion of the elastic bend part 2314 in the lower portion of the touch case 231 is pressed, the through-hole 2314*a* of the elastic bend part 2314 escapes from the projection part 2182 of the accommodation part 238, and then the holding jaw 2181 in the upper portion of the accommodation part 218 may be unheld and decoupled.

Further, as described above, the touch assembly 23 may be coupled to and accommodated in one of the first accommodation part 218*a* and the second accommodation part 218*b*, along the direction in which the door assembly 20 is open.

When the touch assembly 23 is coupled to the first accommodation part 218*a* or the second accommodation part 218*b*, the touch assembly 23 may be coupled to the first accommodation part 218*a* or the second accommodation part 218*b*, in the up-down direction and in a reversed direction.

To this end, the first accommodation part 218*a* and the second accommodation part 218*b* may respectively be inserted into and fixed to the body assembly 21, respectively in the up-down direction and in a reversed direction.

Thus, the up-down positions of the holding jaw 2181 and the projection part 2182 of the first accommodation part 218*a* may be vertically opposite to the up-down positions of the holding jaw 2181 and the projection part 2182 of the second accommodation part 218*b*. Accordingly, the touch assembly 23 is coupled to the first accommodation part 218*a* and the second accommodation part 218*b*, in the up-down direction and in a reversed direction.

The touch assembly 23, being coupled to one of the pair of accommodation parts 218 of the body assembly 21, may be coupled to one of the pair of accommodation parts 218, in the up-down direction or in a reversed direction, depending on the direction in which the door assembly 20 is open, as described above. Even if the touch assembly 23 is formed asymmetrically, the touch assembly 23 may be disposed not to interfere with the side handle 217 and commonly used.

Referring to FIGS. 15 to 18, the accommodation part 218 may have an asymmetric shape rather than a symmetric shape, in the left-right direction, for example.

Accordingly, an internal design such as the coupling structure of the side handle 217 and the accommodation part 218 needs to change, depending on whether the side handle 217 is disposed at the left side or the right side of the accommodation part 218.

However, since the positions of the first accommodation part 218*a* and the second accommodation part 218*b* are overturned in the up-down direction, as shown in the embodiment, commonly used components of the accommodation part 218 may be used for both of the first accommodation part 218*a* and the second accommodation part 218*b*, without changing in the internal design additionally.

Figure 14:
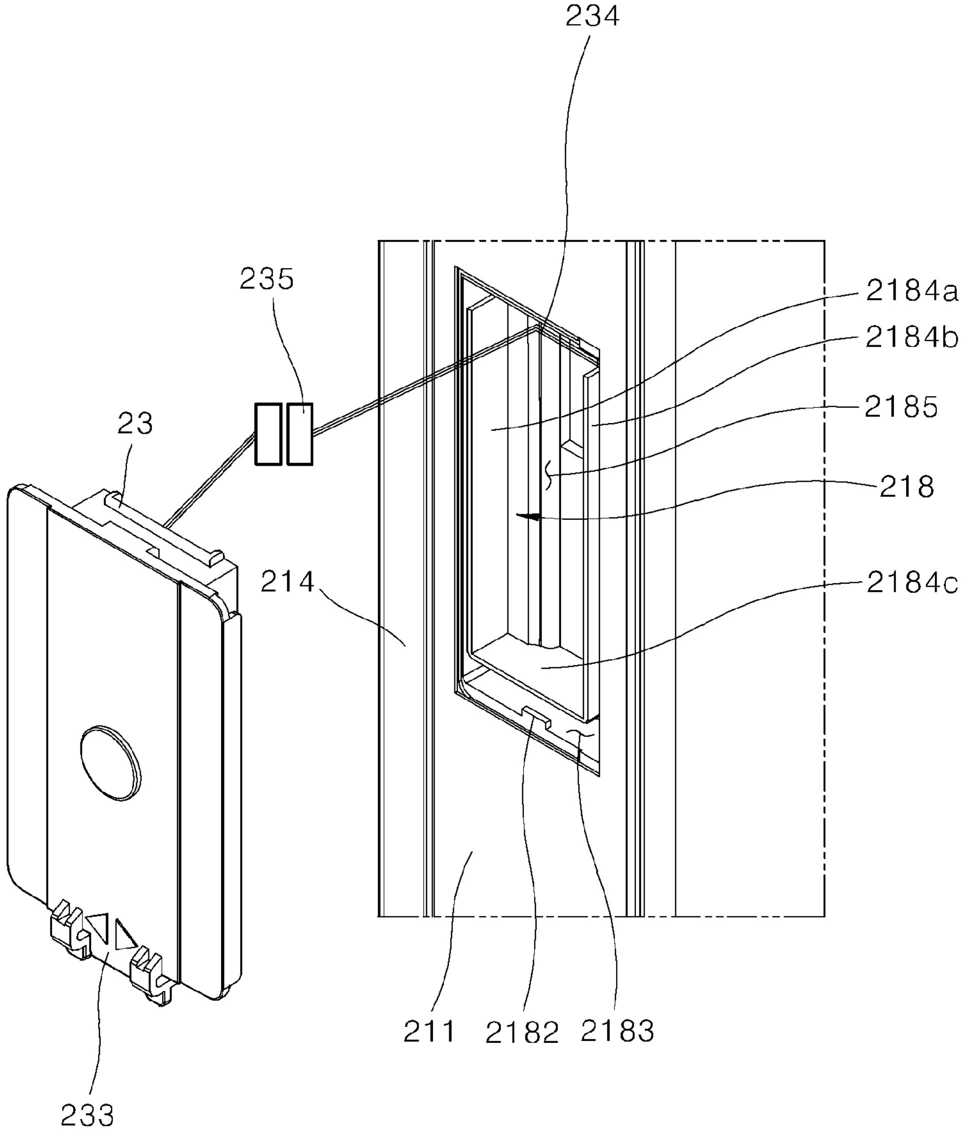
FIG. 14 is an enlarged perspective view showing a connector connecting to a touch assembly before an accommodation part of a body assembly and the touch assembly are coupled.

Referring to FIG. 14, before the touch assembly 23 is inserted into the accommodation part 218, a connector 235 of a wire harness 234 withdrawn through the accommodation part 218 may connect to the touch assembly 23.

The wire harness 234 may electrically connect to a main PCB 15 that is supplied with a touch signal of the touch assembly 23, and be fixed differently depending on the up-down direction of the accommodation part 218.

Figure 15:
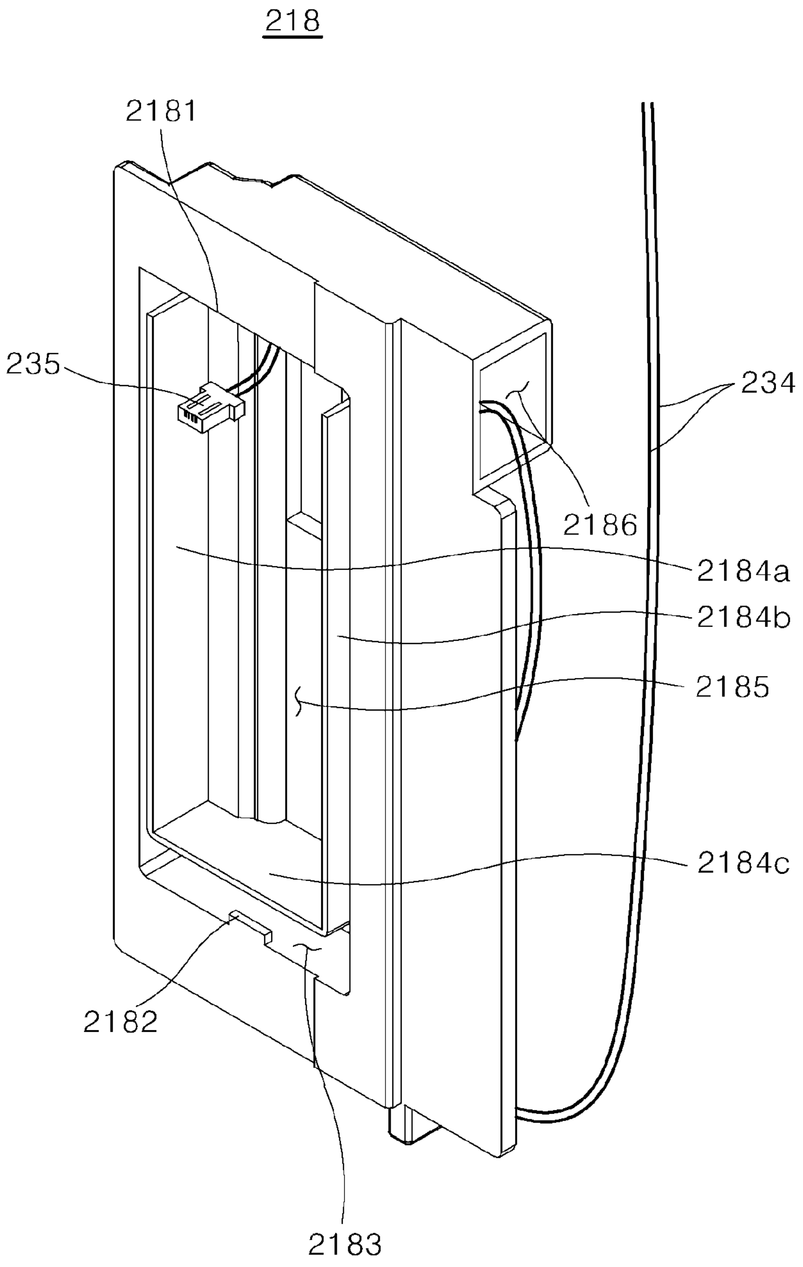
FIGS. 15 and 16 are respectively a front perspective view and a rear perspective view showing a wire harness connecting to an accommodation part of one embodiment.
Figure 16:
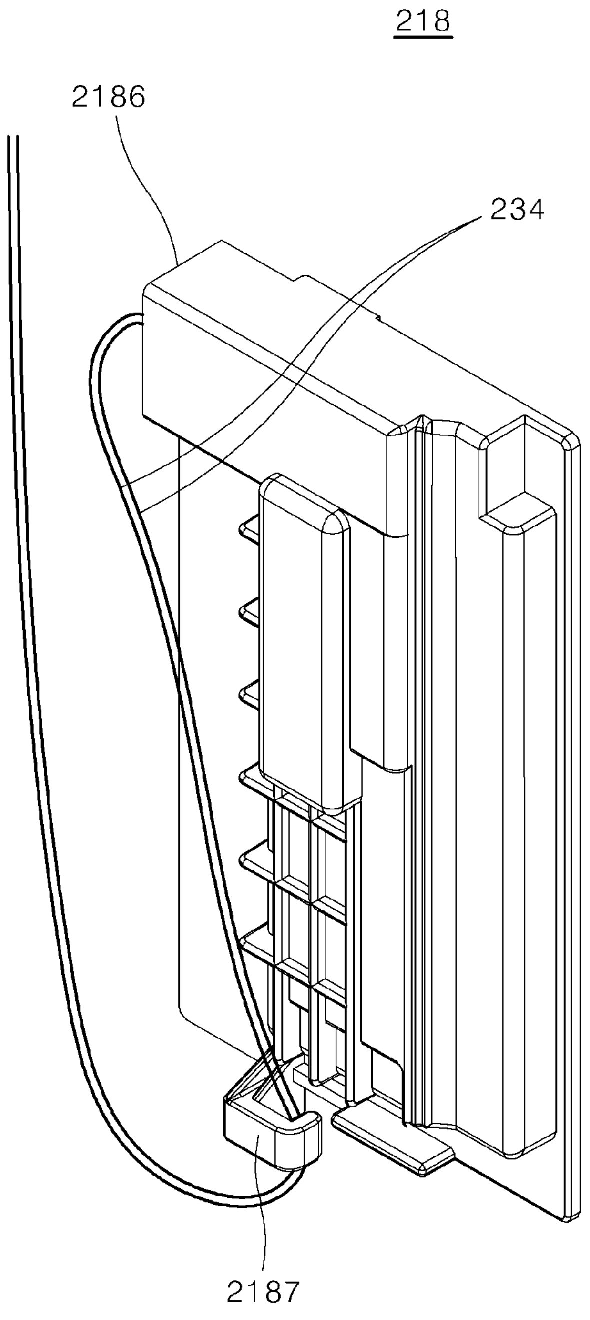

For example, FIGS. 15 and 16 show that a harness passage part 2186 through which the wire harness 234 passes is disposed at the upper side of the accommodation part 218, in one embodiment.

The harness passage part 2186 that is open in the side surface direction may be formed at the upper end of the back surface of the accommodation part 218, and the one end of the wire harness 234 may connect to the connector 235 while the other end may connect to the main PCB 15 electrically.

A ring part 2187 may be formed at the lower end of the back surface of the accommodation part 218 and fix the wire harness 234.

At this time, the wire harness 234 may extend upward in the state where the wire harness 234 is held by the ring part 2187 at the lower end of the back surface of the accommodation part 218, and pass through the harness passage part 2186 and connect to the connector 235.

Ordinarily, the cold air of the storage chamber may be drawn through the wire harness 234, and accordingly, dew may be formed on the touch PCB 2322.

However, when the wire harness 234 extends to the lower portion of the accommodation part 218 and then extends to the upper portion of the accommodation part 218, as shown in the embodiment, the cold air drawn through the wire harness 234 is collected in the lower area of the accommodation part 218, such that the touch PCB 2322 is not affected by the cold air.

Figure 17:
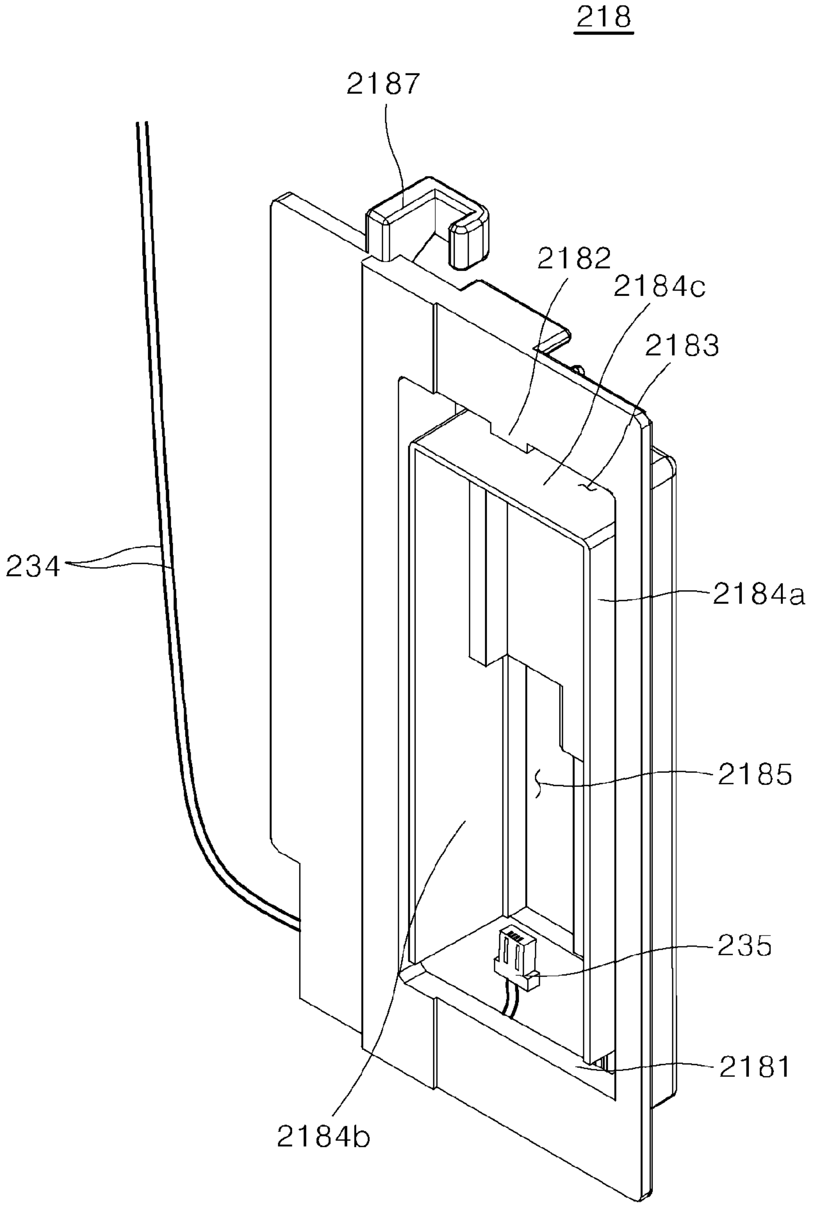
FIGS. 17 and 18 are respectively a front perspective view and a rear perspective view showing a wire harness connecting to an accommodation part of another embodiment.
Figure 18:
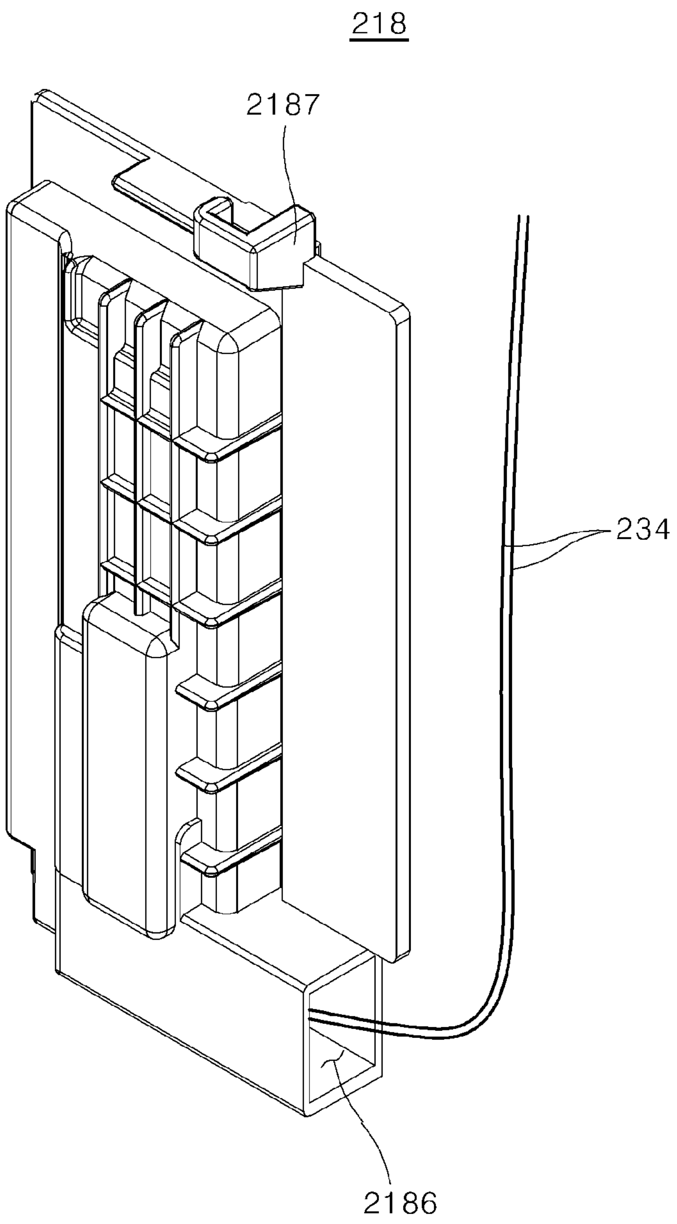
Figure 19:
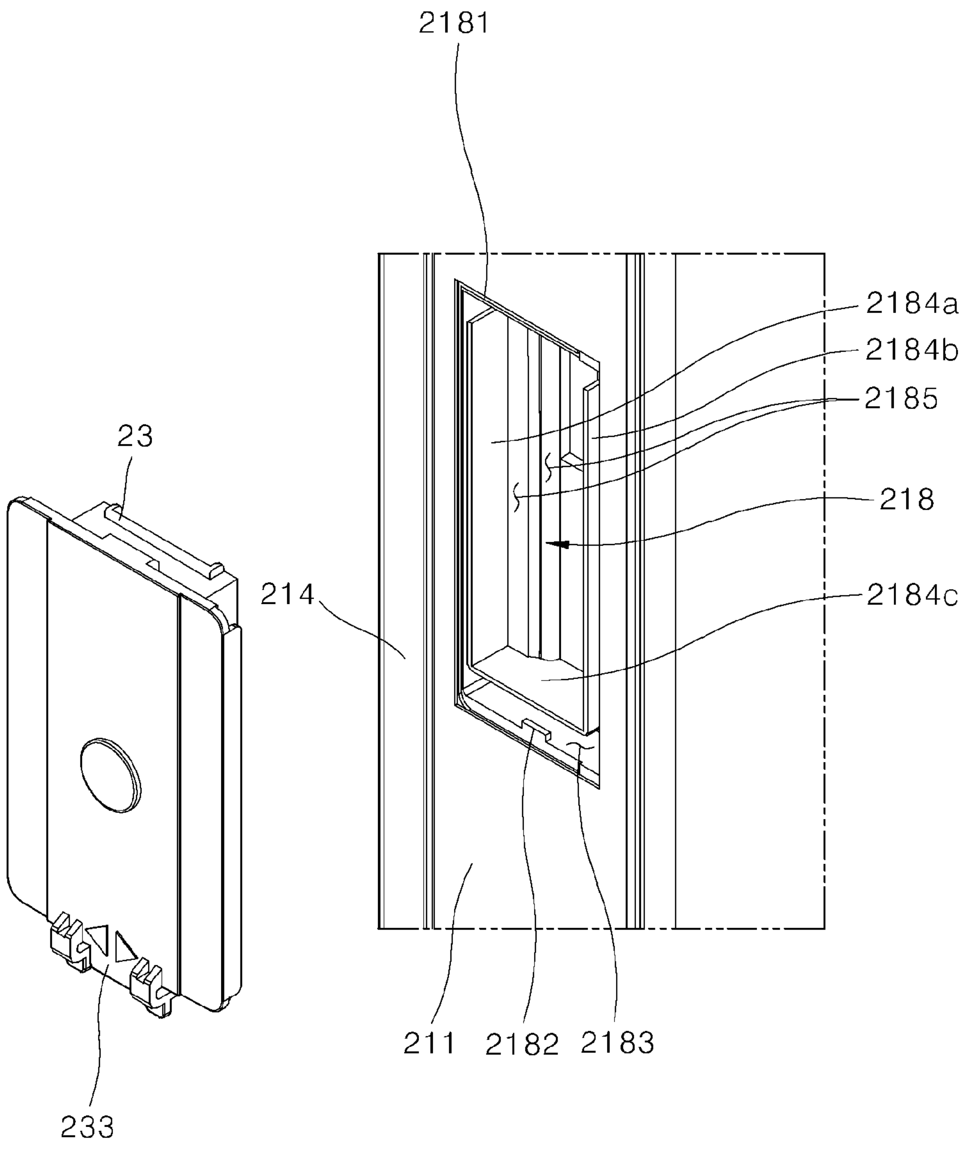
FIG. 19 is a perspective view showing a state before a touch assembly is coupled to an accommodation part.

FIGS. 17 and 18 show that the harness passage part 2186 through which the wire harness 234 passes is disposed at the lower side of the accommodation part 218, in another embodiment.

The harness passage part 2186 that is open in the side surface direction may be formed at the lower end of the back surface of the accommodation part 218, and one end of the wire harness 234 may connect to the connector 235 while the other end may connect to the main PCB 15 electrically.

A ring part 2187 may be formed at the upper end of the back surface of the accommodation part 218 and fix the wire harness 234.

At this time, the wire harness 234 may connect to the connector 235 through the harness passage part 2186 directly, without being held by the ring part 2187 at the upper end of the back surface of the accommodation part 218.

When the harness passage part 2186 is formed at the lower end of the accommodation part 218, the cold air drawn through the wire harness 234 is collected further downward than the connector 235 such that the touch PCB 2322 is not affected by the cold air, since the connector 235 is disposed further upward tan the harness passage part 2186.

Hereafter, a coupling between the body assembly 21 and the panel assembly 22 is described with further reference to FIGS. 27 to 42.

Figure 27:
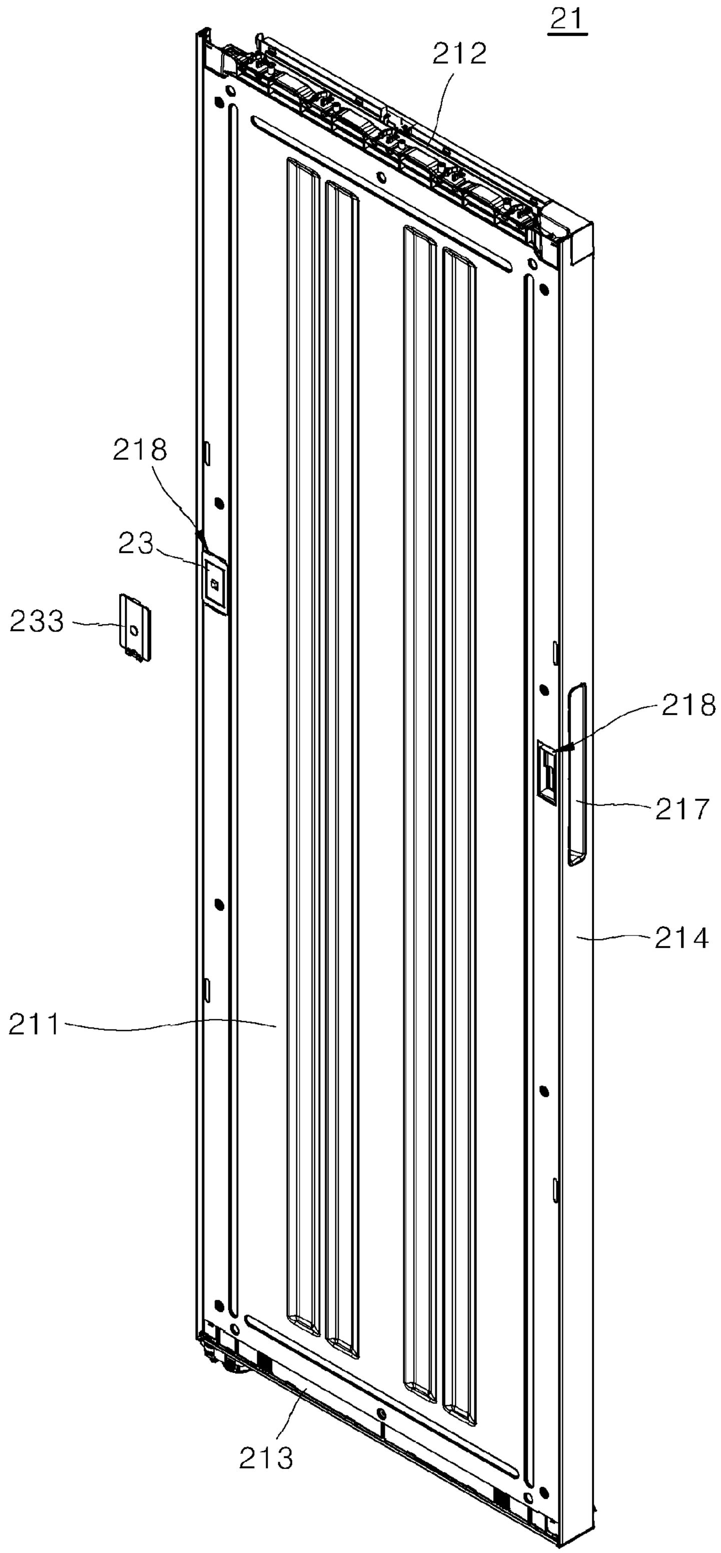
FIG. 27 is a perspective view showing a touch cover is removed from a body assembly to which a touch assembly is coupled.

The order of the coupling is described, hereafter. The touch cover 233 may be removed from the body assembly 21 to which the touch assembly 23 is coupled, as illustrated in FIG. 27.

Figure 28:
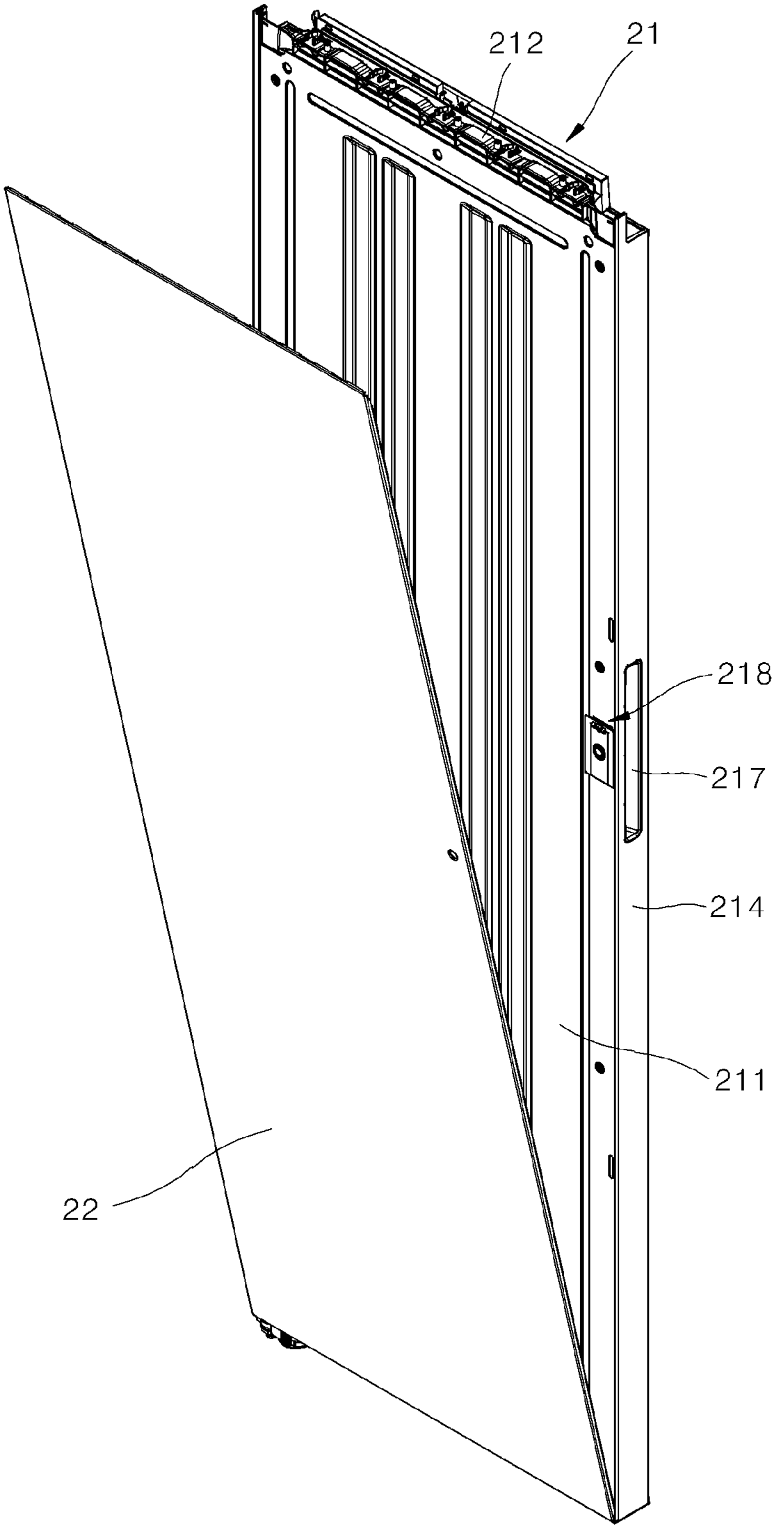
FIG. 28 is a perspective view showing a primary coupling a panel assembly to the lower side of a body assembly.
Figure 29:
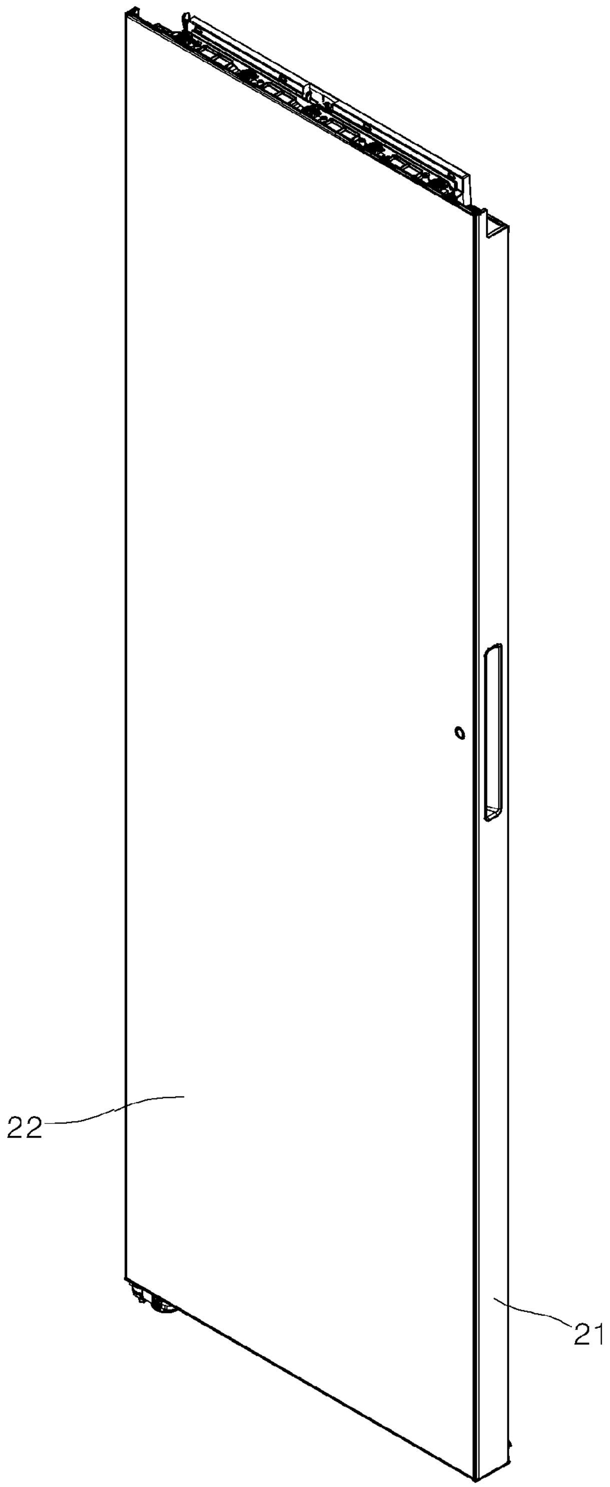
FIG. 29 is a perspective view showing a secondary coupling the panel assembly to the upper side of the body assembly.

Then the lower end of the panel assembly 22 may be coupled to the lower end of the body assembly 21, as illustrated in FIG. 28, and the upper end of the panel assembly 22 may be coupled to the upper end of the body assembly 21, as illustrated in FIG. 29.

Figure 30:
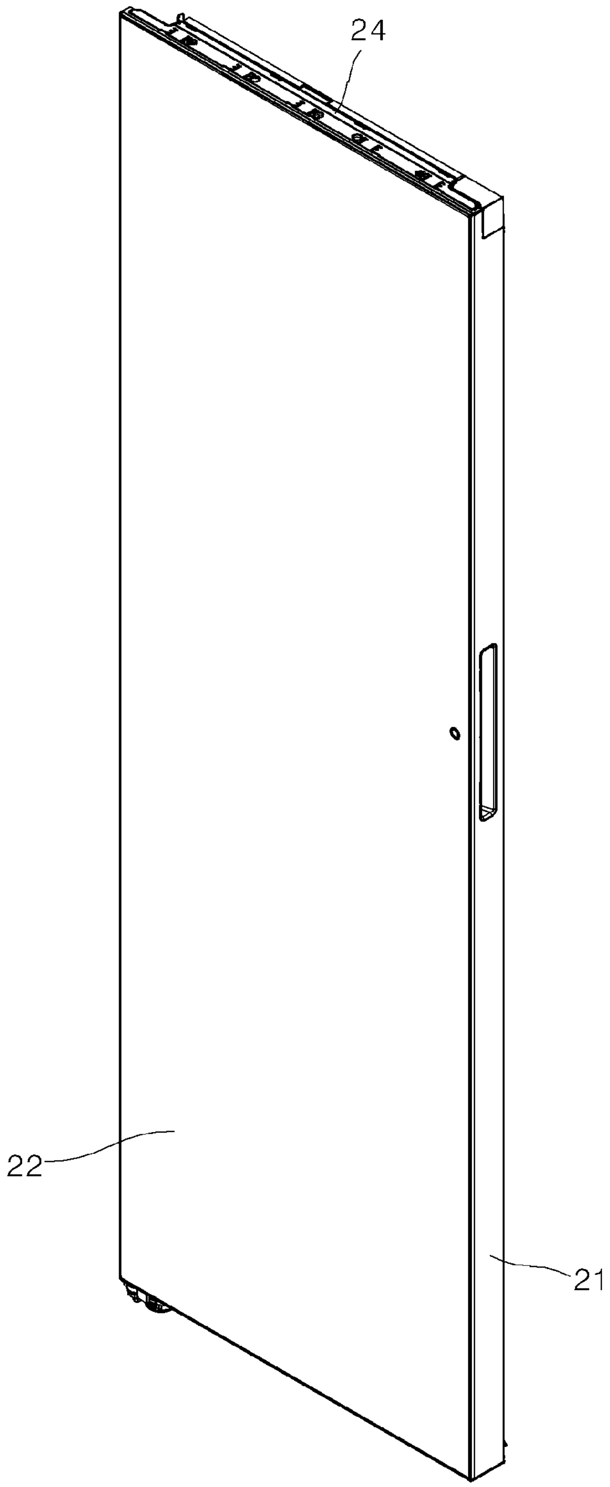
FIG. 30 is a perspective view showing a deco cover is coupled to the upper sides of the body assembly and the panel assembly.

Then the deco cover 24 may be additionally coupled to the upper ends of the panel assembly 22 and the body assembly 21, such that the panel assembly 22 and the body assembly 21 are firmly fixed, as illustrated in FIG. 30.

Figure 31:
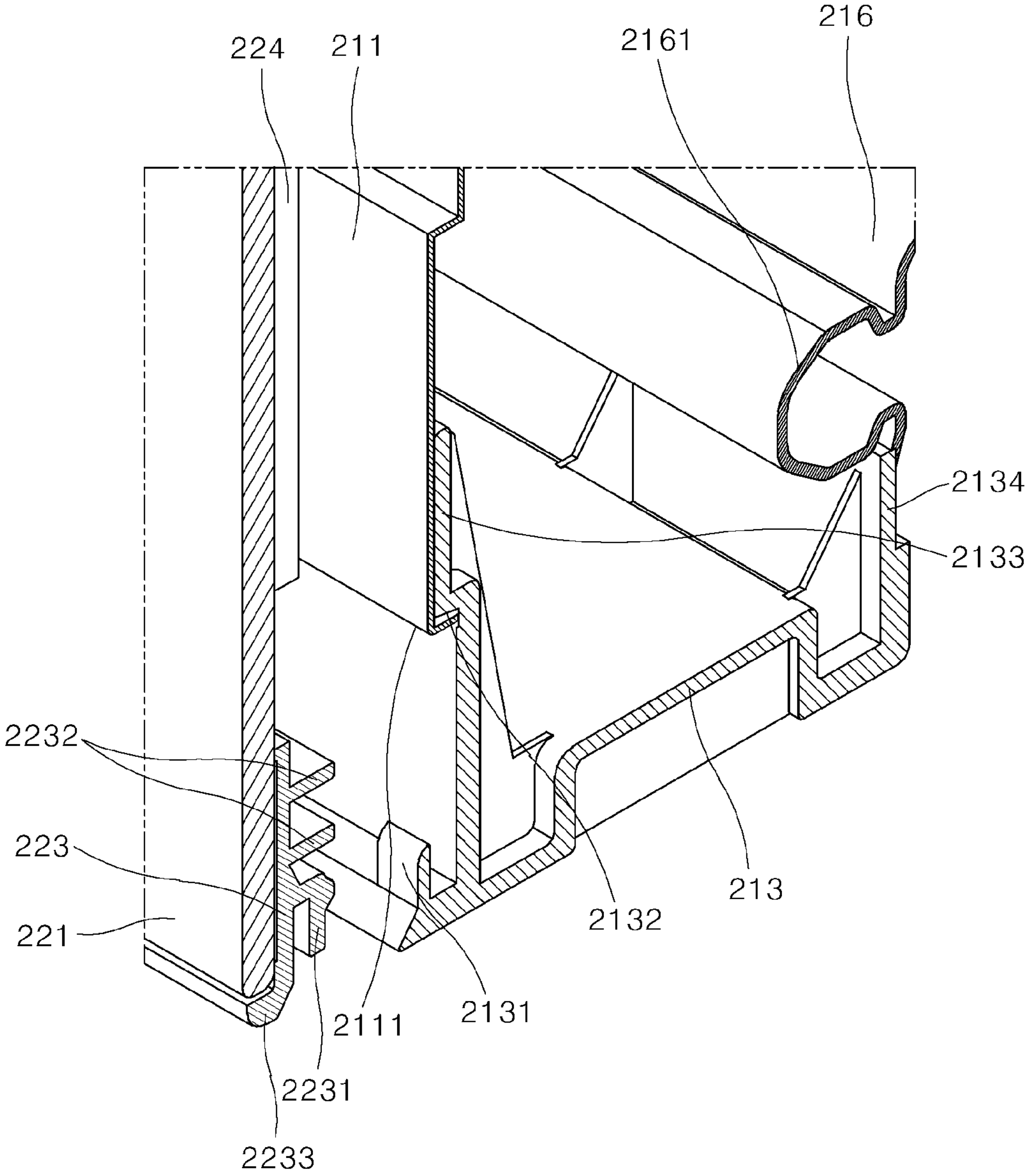
FIGS. 31 to 33 are perspective cross-sectional views showing the process of coupling a lower bracket of a panel assembly to a lower cap deco of a body assembly.
Figure 32:
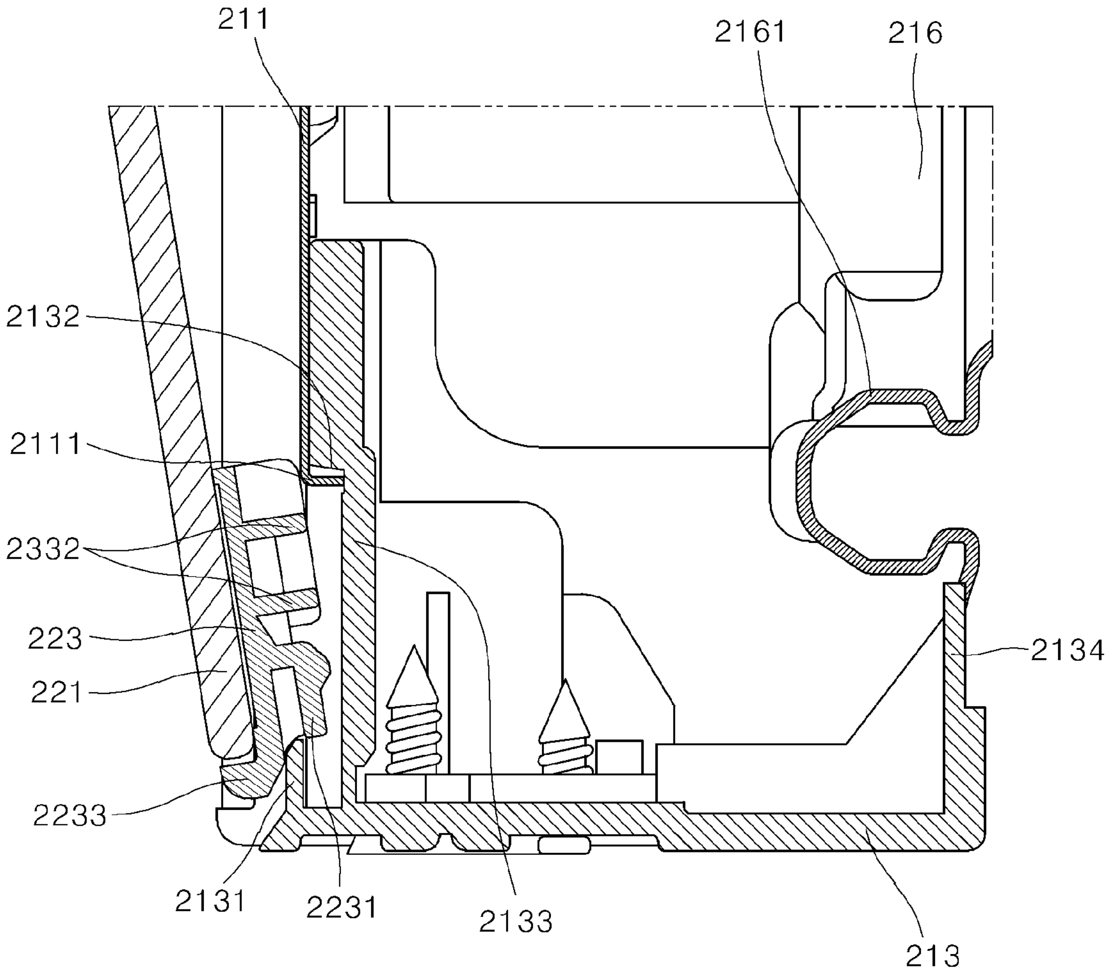
Figure 33:
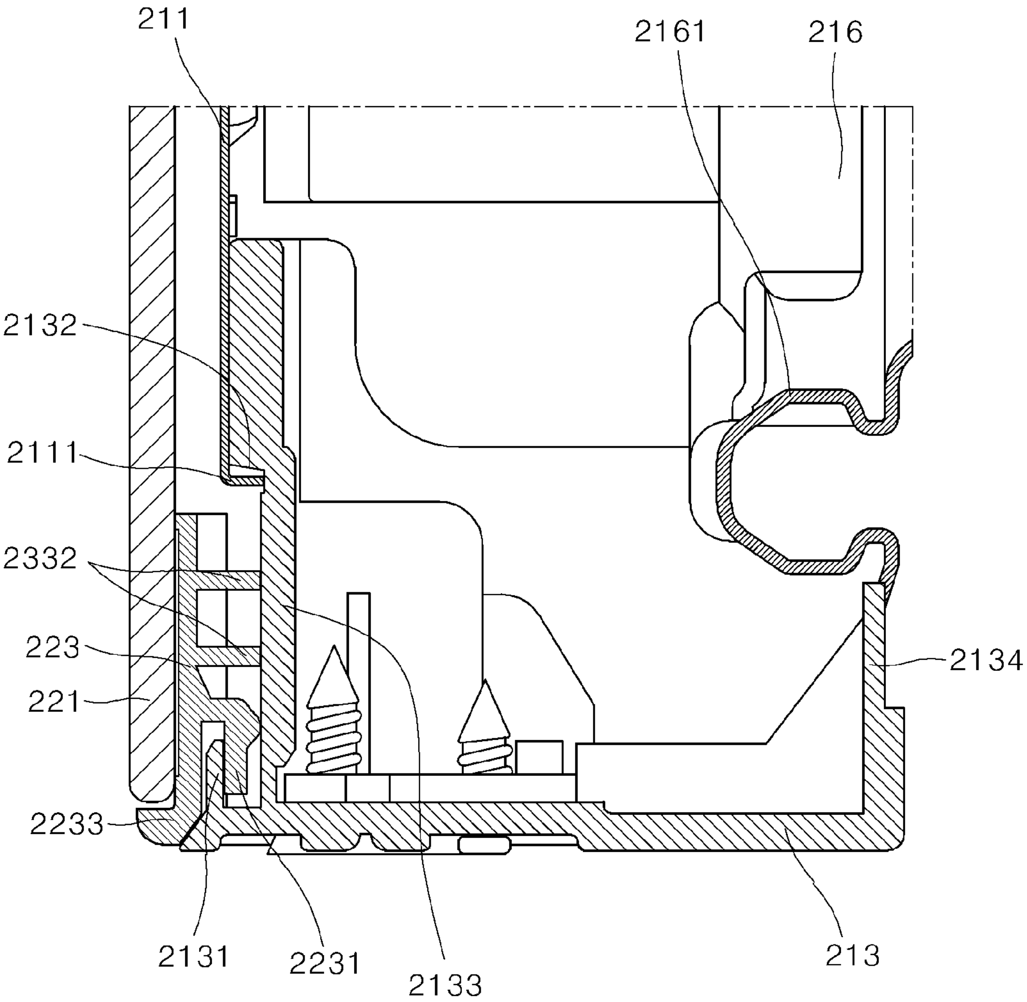

Referring to FIGS. 31 to 33, one side of the lower cap deco 213 constituting the lower portion of the body assembly 21 may connect to the front plate 211, and the other side may connect to the door liner 216.

A stepped part 2132 may be formed on one lateral wall 2133 extending upward from the front of the lower cap deco 213, and a holding rib 2111 bending to be held by the stepped part 2132 may be formed in the end portion of the front plate 211, such that the front plate 211 is fixed to one lateral wall 2133 of the lower cap deco 213.

The other lateral wall 2134 extending upward may be formed at the rear of the lower cap deco 213 and fastened to the end portion of the door liner 216.

A protruding rib 2131 protruding upward may be formed at the front of one lateral wall 2133 of the lower cap deco 213.

In response, a hook rib 2231 bending downward may be formed in the lower portion of the back surface of the lower bracket 223.

The hook rib 2231 bends to have a space into which the protruding rib 2131 is inserted, and the lower bracket 223 is fixed to the lower cap deco 213, such that the lower end of the panel assembly 22 is coupled to the lower end of the body assembly 21 primarily.

A support rib 2233 protruding in the front surface direction of the lower bracket 223 may be formed in the lower portion of the front surface of the lower bracket 223, such that the end portion of one side of the front panel 221 is supported by the support rib 2233.

A plurality of extension ribs 2232, being disposed in the upper portion of the support rib 2233 and protruding rearward, may be formed on the back surface of the lower bracket 223.

The extension ribs 2232 may extend in contact with one lateral wall 2133 of the lower cap deco 213 and help to improve the support force of the lower bracket 223.

Additionally, the rear surface of the protruding rib 2131, facing rearward, may extend in contact with one lateral wall 2133 of the lower cap deco 213 and help to improve the support force of the lower bracket 223.

Referring to FIGS. 35, 38, 39 and 41, the body assembly 21 may comprise an upper cap deco 212 constituting the upper portion of the body assembly 21, and the panel assembly 22 may comprise an upper bracket 222 fixing the upper side of the panel assembly 22 to the upper cap deco 212. Accordingly, the upper cap deco 212 and the upper bracket 222 may be coupled such that the panel assembly 22 is fastened to the body assembly 21.

Specifically, a limiting rib 2121 may be formed on the upper surface of the upper cap deco 212, and have an open camber shape and be open in the direction of the upper bracket 222.

The limiting rib 2121 may be comprised as a first limiting rib body 2121*a*, and a second limiting rib body 2121*b* that are a pair of limiting rib bodies.

The first limiting rib body 2121*a* and the second limiting rib body 2121*b* may be spaced from each other and face each other in a way that a space is formed between the first limiting rib body 2121*a* and the second limiting rib body 2121*b*.

For example, the first limiting rib body 2121*a* and the second limiting rib body 2121*b* may be formed into a camber that bends like an arrow.

Specifically, a distance between the first limiting rib body 2121*a* and the second limiting rib body 2121*b* increases and then decreases toward the front such that an insertion projection 2221 of the upper bracket 222 is inserted into the inner space of the limiting rib 2121.

The upper bracket 222 may comprise the insertion projection 2221 formed into a projection protruding rearward.

The width of the insertion projection 2221 may decrease and then increase toward the rear, and decrease again toward the end portion.

The insertion projection 2221 may be inserted along the limiting rib 2121 formed into a camber such that the upper side of the panel assembly 22 is easily fastened and assembled to the upper side of the body assembly 21.

The upper cap deco 212 may comprise a mounting surface 2122 that is disposed at one side of the limiting rib 2121 and has a bottom surface higher than surroundings thereof.

For example, a first bottom surface 2123*a* on which the mounting surface 2122 is disposed may be formed higher than a second bottom surface 2123*b* on which the limiting rib 2121 is disposed.

In response, the upper bracket 222 may have a mounting projection 2222 that is disposed at one side of the insertion projection 2221 and protrudes rearward.

As the upper bracket 222 is coupled to the upper cap deco 212, the mounting projection 2222 is disposed on the mounting surface 2122, to support the panel assembly 22's force facing downward.

The first bottom surface 2123*a* on which the mounting surface 2122 is disposed has a surface area greater than that of the second bottom surface 2123*b*, to distribute the force of supporting the panel assembly 22 as much as possible.

Referring to FIGS. 36, 37, 40 and 42, after the upper bracket 222 of the panel assembly 22 is fastened to the upper cap deco 212 of the body assembly 21, the deco cover 24 may cover the upper cap deco 212 and the upper bracket 222 that are fastened, from above.

The deco cover 24 may comprise a crimping rib 243 that protrudes downward, and the crimping rib may comprise a first crimping rib body 2431*a* and a second crimping rib body 2431*b* that are formed to face each other.

The crimping rib 243 pressurizes both side surfaces of the limiting rib 2121, to help to prevent the insertion projection 2221 inserted into the limiting rib 2121 from being removed from the limiting rib 2121 easily.

Accordingly, the first crimping rib body 2431*a* may contact the outer side surface of the first limiting rib body 2121*a*, and the second crimping rib body 2431*b* may contact the outer side surface of the second limiting rib body 2121*μb*.

The upper bracket 222 may further comprise a fastening projection 242 that is disposed between one side of the insertion projection 2221 and the mounting projection 2222.

The fastening projection 242 may protrude upward from a third bottom surface 2123*c* that has a height less than that of the first bottom surface 2123*a* and the second bottom surface 2123*b*.

The deco cover 24 may comprise an insertion hole 244 that is disposed at one side of the crimping rib 243 to correspond to the fastening projection 242, and the fastening projection 242 may be fastened to the insertion hole 244 by a fastening member 241 that is fastened from the upper side of the insertion hole 244, based on a screw-assembly method.

In terms of the door assembly 20 according to the present disclosure, the upper bracket 222 and the lower bracket 223 of the panel assembly 22 may respectively be attached to and detached from the upper cap deco 212 and the lower cap deco 213 of the body assembly 21 easily, without an additional fastening member, ensuring the simplification of the process of replacing the panel assembly 22 comprising the front panel 221 may be simplified and a reduction in the assembly period.

Hereafter, the refrigerator 1 comprising a door opening device 30 that automatically opens the door assembly 20, and an auto hinge 43 that operates to automatically close the door assembly 20 is described with reference to FIGS. 43 to 53.

Figure 43:
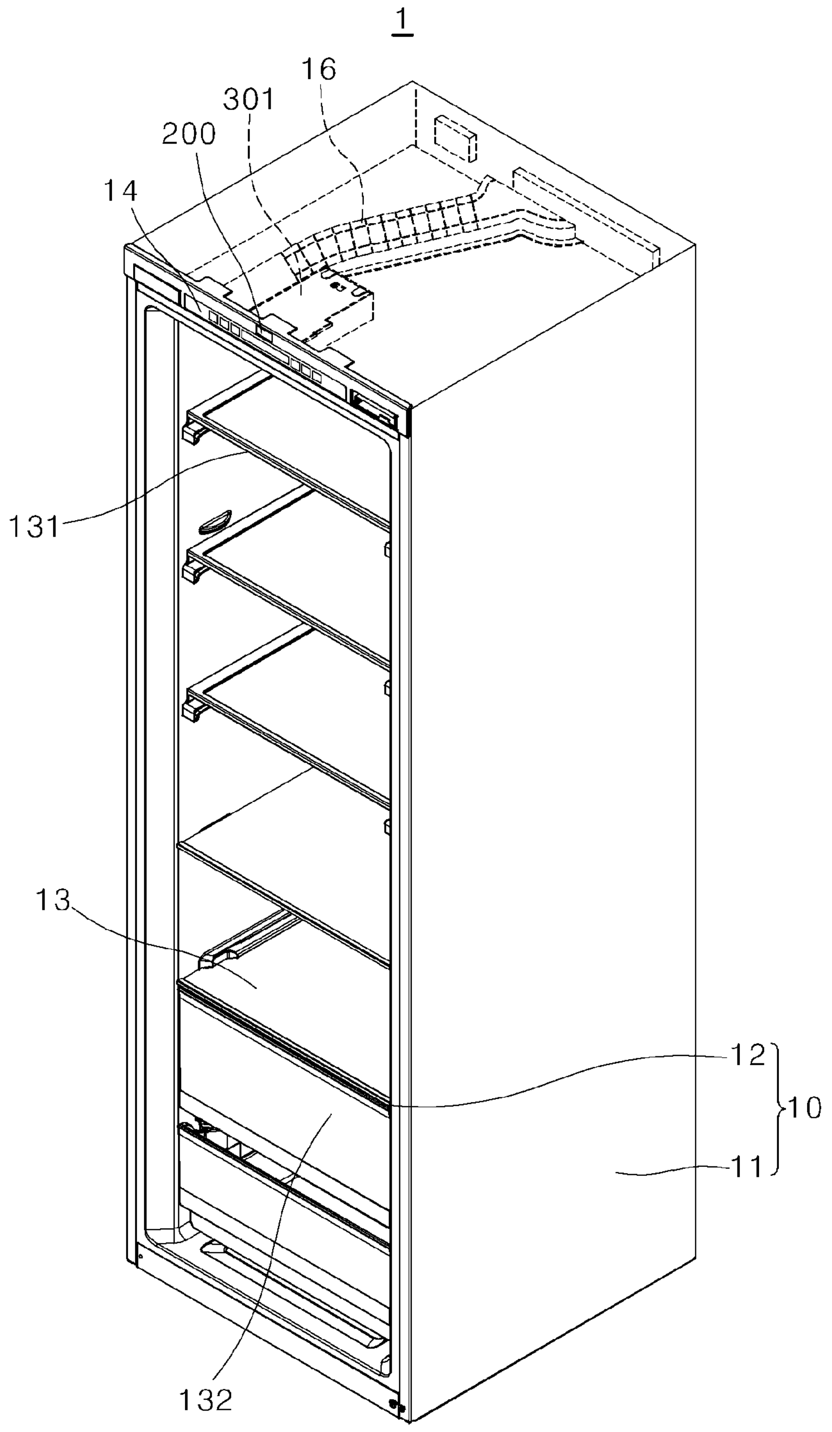
FIG. 43 is a perspective view showing a door opening device and an upper duct formed at the upper side of a cabinet, without a door assembly.
Figure 44:
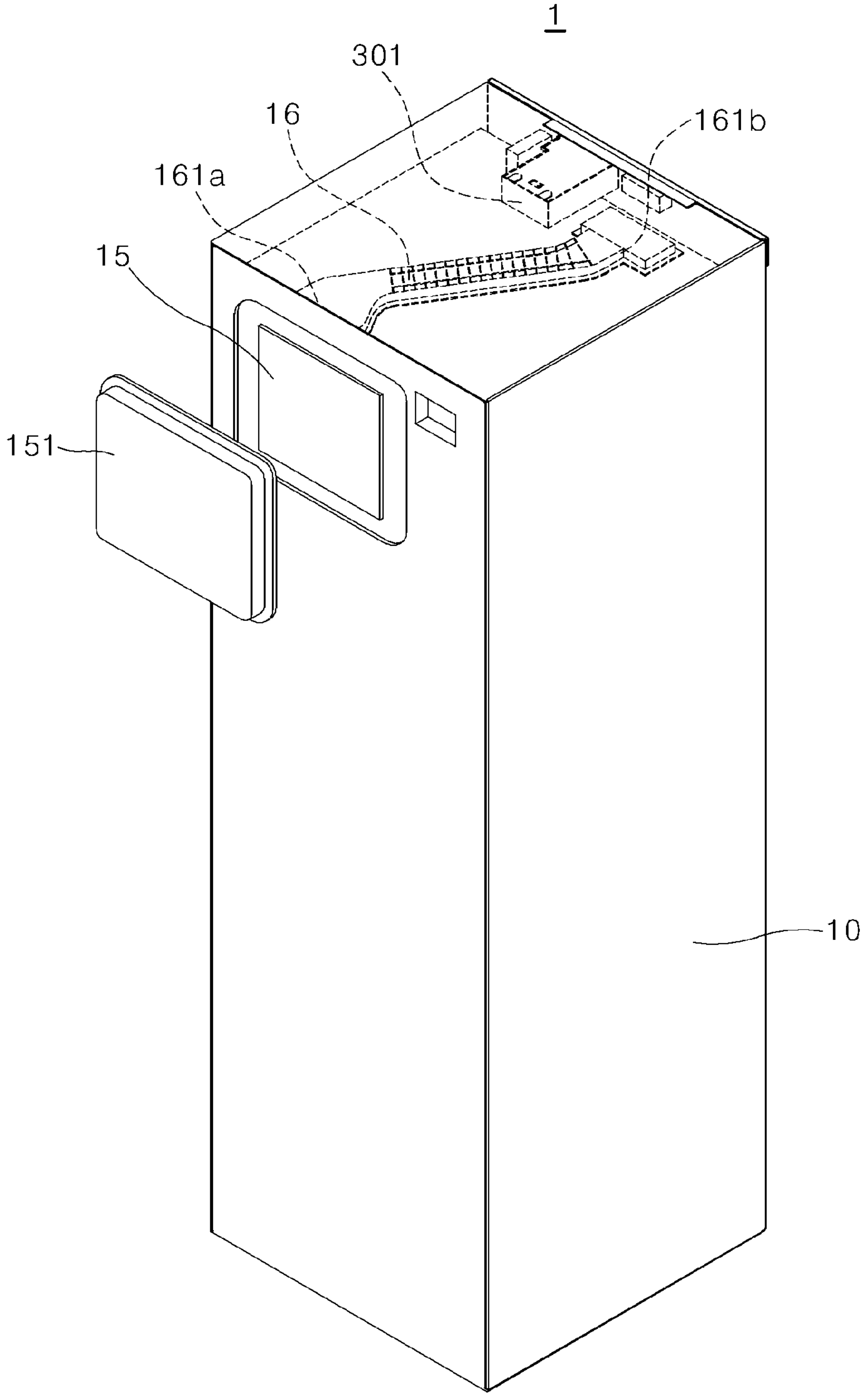
FIG. 44 is a rear perspective view showing the position of a main PCB that receives a touch signal from a touch sensor.
Figure 47:
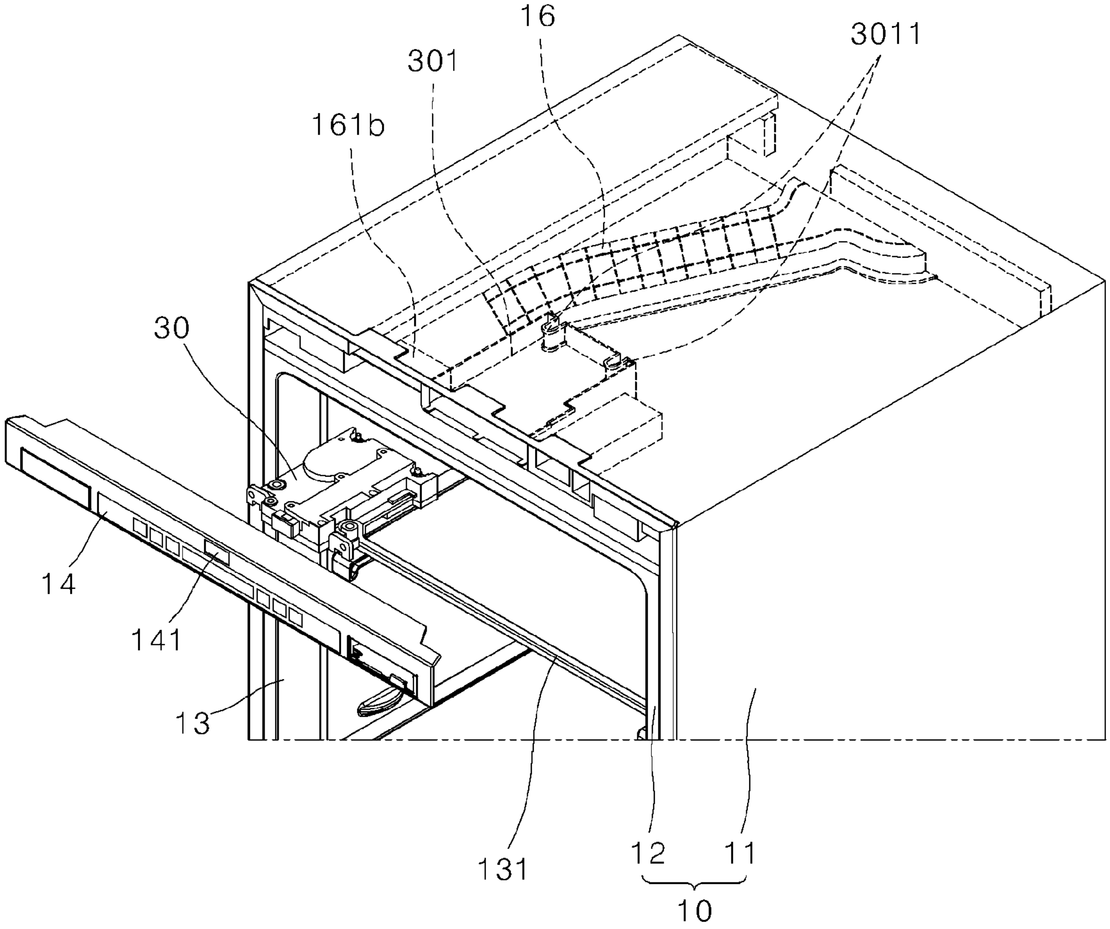
FIG. 47 is an exploded perspective view showing a cabinet, a door opening device and a manipulation panel are separated.

Referring to FIGS. 43 and 47, the refrigerator 1 according to the present disclosure may comprise a cabinet 10 comprising a storage chamber 13 the front surface of which is open, a touch assembly 23 the front surface of which is touched and recognizes a touch, a door assembly 20 which opens and closes the front surface of the cabinet 10, and a door opening device 30 which is disposed in the upper portion of the cabinet 10 and automatically opens the door assembly 20.

The door opening device 30 may be accommodated in an accommodation case 301 that is disposed in the upper portion of the cabinet 10 to overlap the central portion of the cabinet 10.

The accommodation case 301 may have an open front surface, and the door opening device 30 may be inserted into and fixed to the accommodation case 301 the front surface of which is open, in a sliding manner.

A manipulation panel 14 capable of displaying and setting various types of information of the refrigerator 1 may be attached to the front surface of the door opening device 30, and the front surface of the door opening device 30 may be formed with the manipulation panel 14.

The door opening device 30 may comprise a rack bar 37 that pushes the back surface of the upper side of the door assembly 20 to open the door assembly 20.

The rack bar 37 may be disposed to pass through a protruding hole 141 that is a hole formed on the manipulation panel 14.

Accordingly, at a time of opening the door assembly 20, the rack bar 37 may be withdrawn outward past the protruding hole 141 to push the door assembly 20.

The protruding hole 141 and the rack bar 37 may be disposed to push the center of the door assembly 20, such that the door assembly 20 is opened at a predetermined angle, with a predetermined amount of force, with no additional change in the settings, despite a change in the direction where the door assembly 20 is opened.

A main PCB 15 may be disposed on the back surface of the refrigerator 1, and receive a touch signal from the touch assembly 23 and supply an operation signal to the door opening device 30.

The main PCB 15 may be disposed inside the back surface of the refrigerator 1, and a back cover 151 may serve as a cover that covers the main PCB 15.

The first accommodation part 218*a* and the second accommodation part 218*b* of the body assembly 21 may respectively comprise a pair of wire harnesses 234 that connect to the touch assembly 23 electrically, and the pair of wire harnesses 234 may respectively connect to the main PCB 15 electrically.

That is, in terms of the refrigerator 1 according to the present disclosure, since the pair of wire harnesses 234 electrically connecting to the main PCB 15 is disposed at both sides of the body assembly 21, the position of touch recognition may change simply as long the touch assembly 23 connects to a wire harness 234 in need, if the direction where the door assembly 20 is opened changes.

Figure 45:
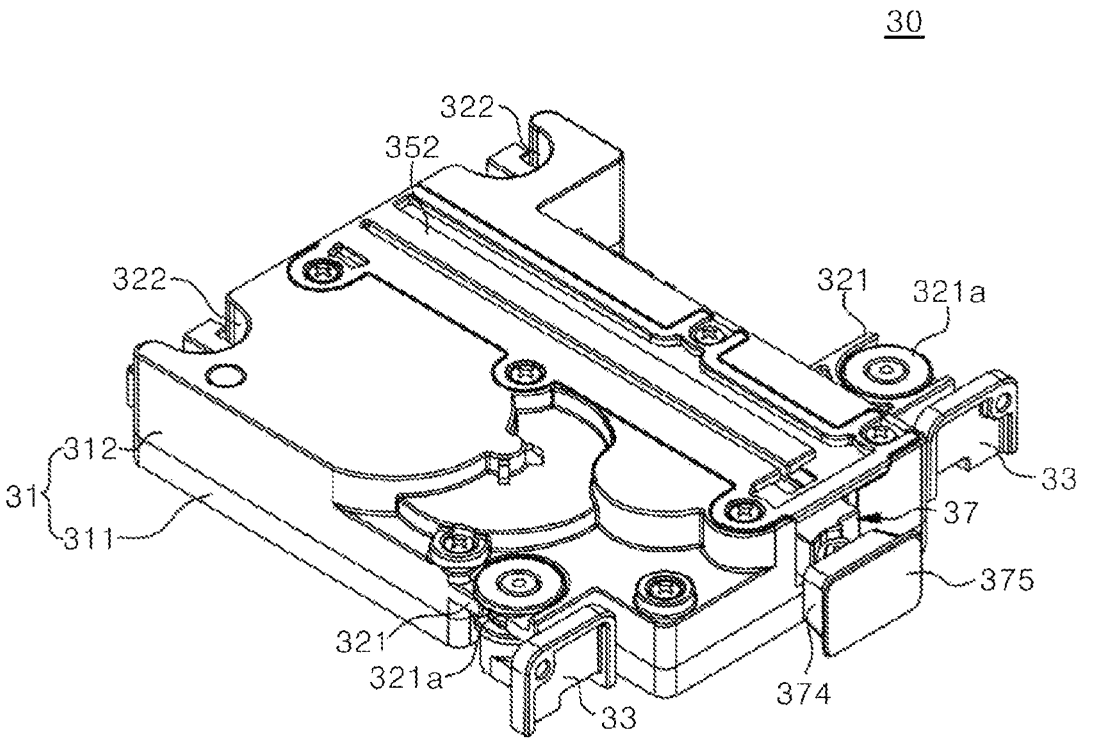
FIG. 45 is a view showing a door opening device.
Figure 46:
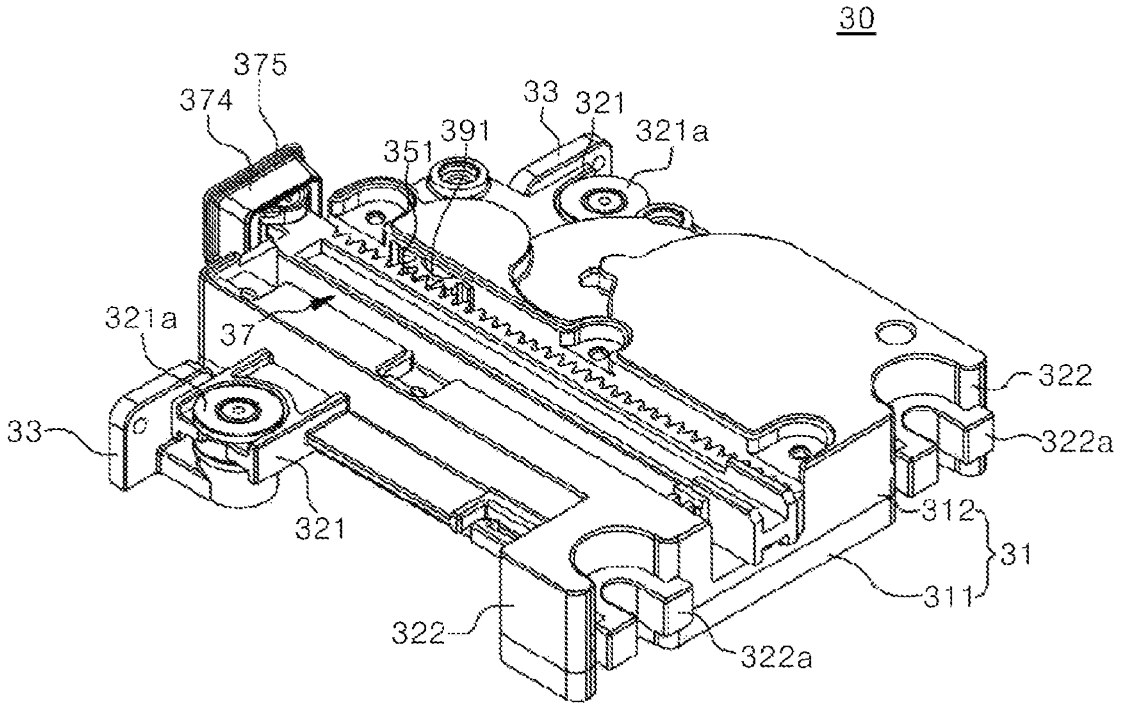
FIG. 46 is a view showing a partial inner area of the door opening device.

Referring to FIGS. 45 and 46, the door opening device 30 may comprise a rack bar 37 that is inserted into or withdrawn from a housing 31 comprised of a lower base 311 and an upper cover 312, and the rack bar 37 may be protected by a rack cover 352.

The door opening device 30 may have a fastening end 33 at the front ends of both sides thereof, and the door opening device 30 may be screw-coupled and fixed to the accommodation case 301.

A pair of first fastening parts 321 may be formed at both the sides of the door opening device 30, and a pair of second fastening parts 322 facing rearward may be formed at the rear end of the door opening device 30.

The first fastening part 321 may have a first cushion member 321*a*, and the second fastening part 322 may have a second cushion member 322*a*, to buffer an impact applied to the door opening device 30 and reduce vibrations applied thereto.

The second cushion member may have a U shape, and be fastened to a mounting pillar 3011 disposed at both sides of the back surface of the accommodation case 301 in a way that surrounds the mounting pillar 3011. Accordingly, if the door opening device 30 is coupled to the accommodation case 301 in a sliding manner, the second cushion member may guide the position of the door opening device 30.

The rack bar 37 may engage with a pinion gear 391 that is exposed through an exposure hole 351 disposed in the rack bar 37 and can be drawn in or drawn out in the forward and backward directions.

A head cover 374 may be attached to the front end of the rack bar 37 and buffer an impact when the door assembly 20 is pushed.

A strut rib 375 may be formed at the front end of the head cover 374 along the outer circumferential surface thereof, such that the rack bar 37 is held by the protruding hole 141 of the manipulation panel 14 as the rack bar 37 moves back to be inserted into the door opening device 30, thereby readily adjusting a withdrawal distance of the rack bar 37 and maintaining an initially set withdrawal distance of the rack bar 37.

Figure 52:
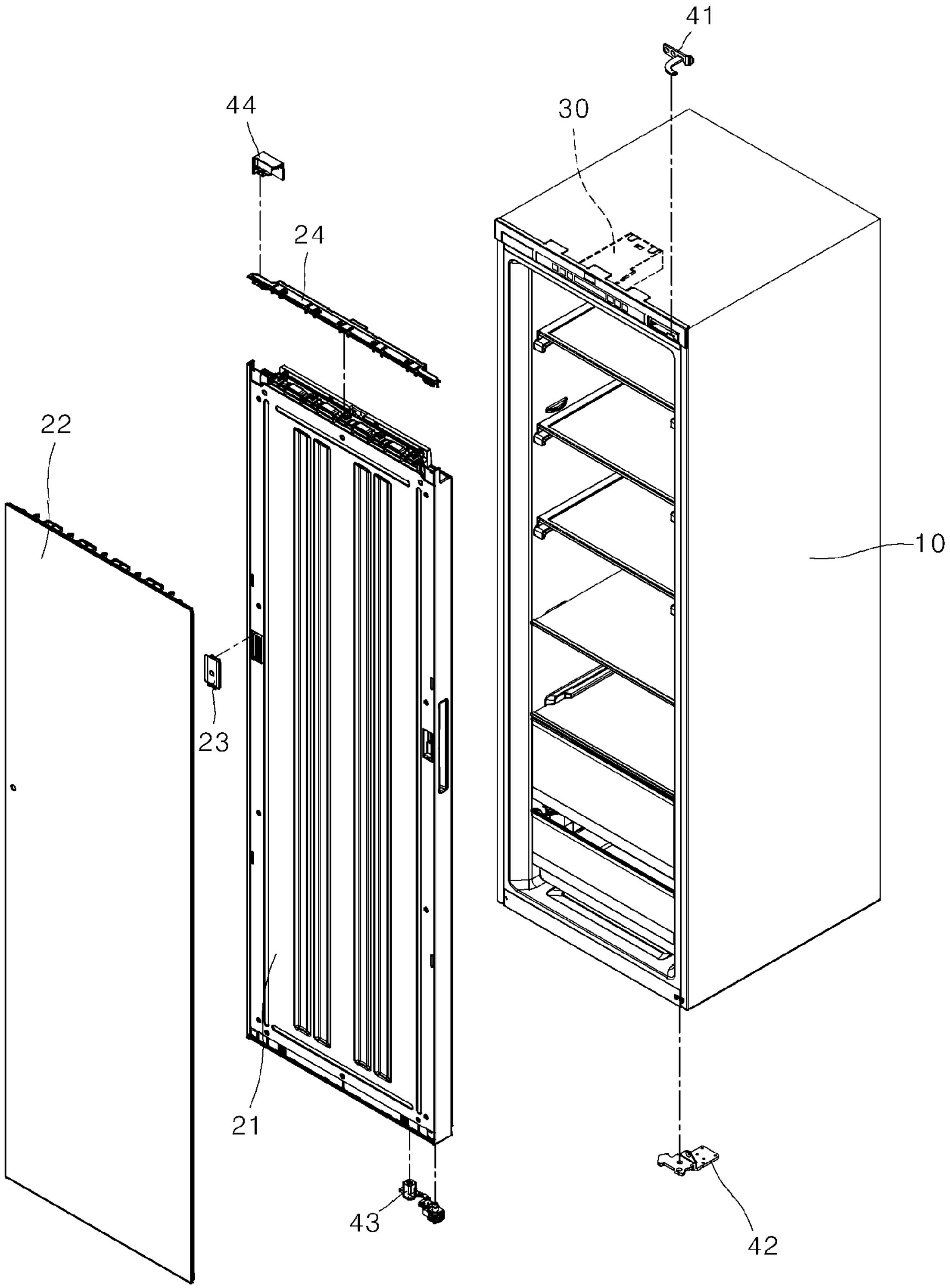
FIG. 52 is an exploded perspective view showing the positions and shapes of components, which are changed at a time when a door assembly is open counterclockwise.

FIG. 52 is an exploded perspective view showing main components of a refrigerator 1 where the door assembly 20 is opened counterclockwise.

A touch assembly 23 is disposed at the left side of the body assembly 21, and an upper hinge 41 and a lower hinge 42 constituting the rotation axis of the door assembly 20 may respectively be disposed at the upper end and the lower end of the right side of the door assembly 20.

A hinge cover 44 may be formed at the upper end of the left side of the door assembly 20, and finish the left hinge axis portion that is not used.

Additionally, an auto hinge 43 may be disposed at the lower end of the right side of the door assembly 20, and interlock with the lower hinge 42 and operate to allow the door assembly 20 to be automatically closed.

Figure 53:
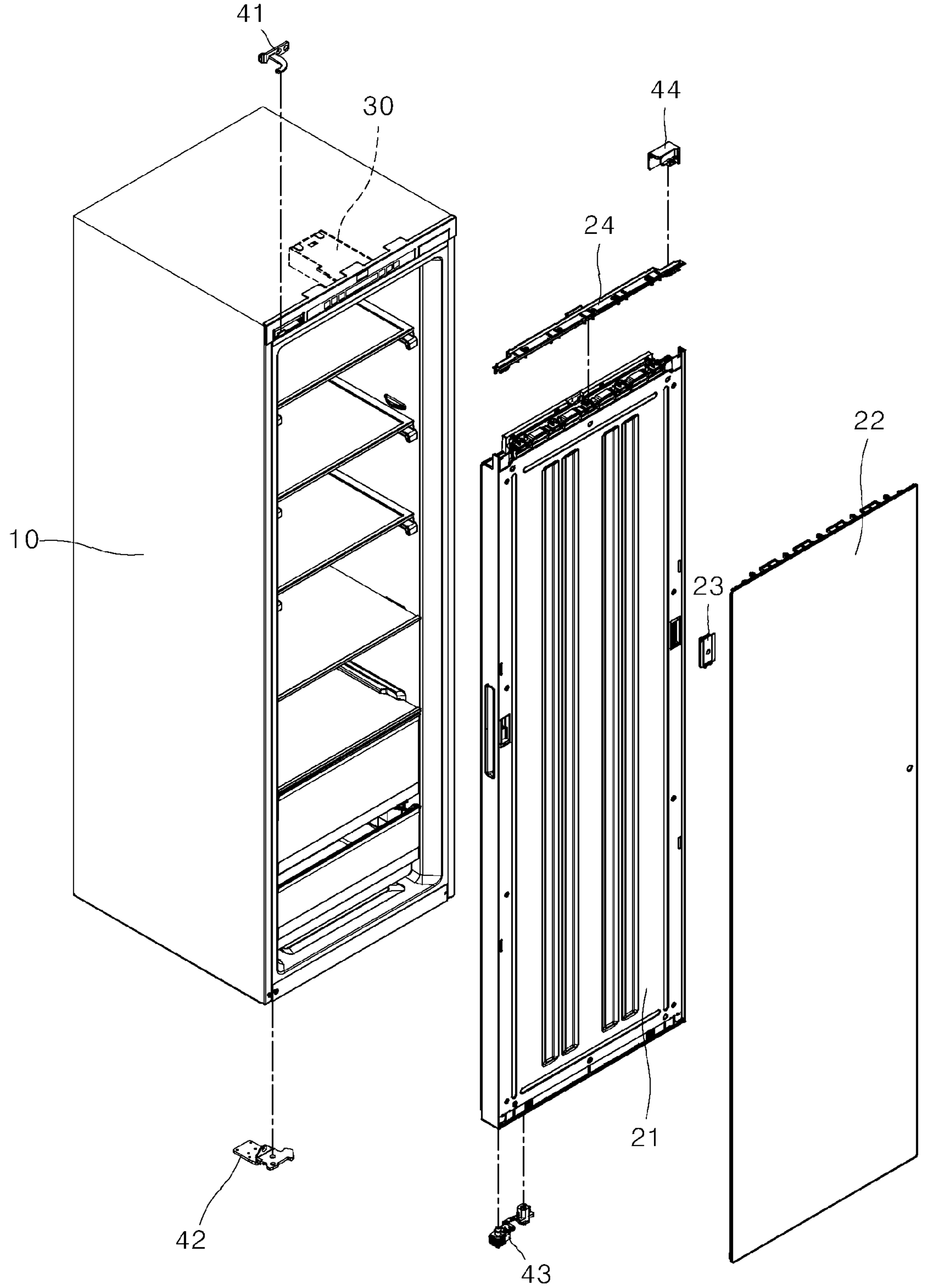
FIG. 53 is an exploded perspective view showing the positions and shapes of components, which are changed at a time when a door assembly is open clockwise.
Figure 54:
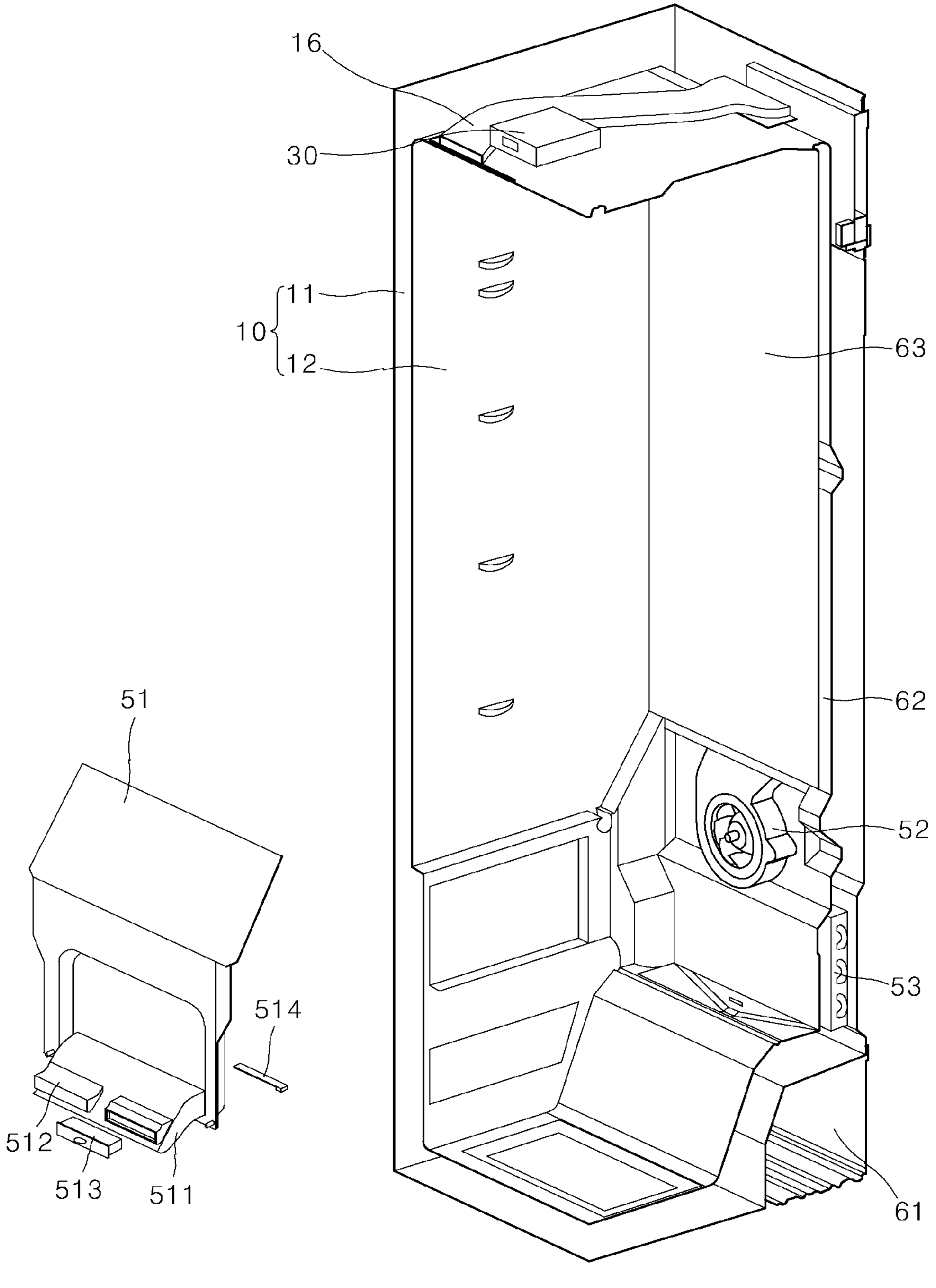
FIG. 54 is an exploded perspective cross-sectional view showing a cabinet separated from a grille panel.
Figure 55:
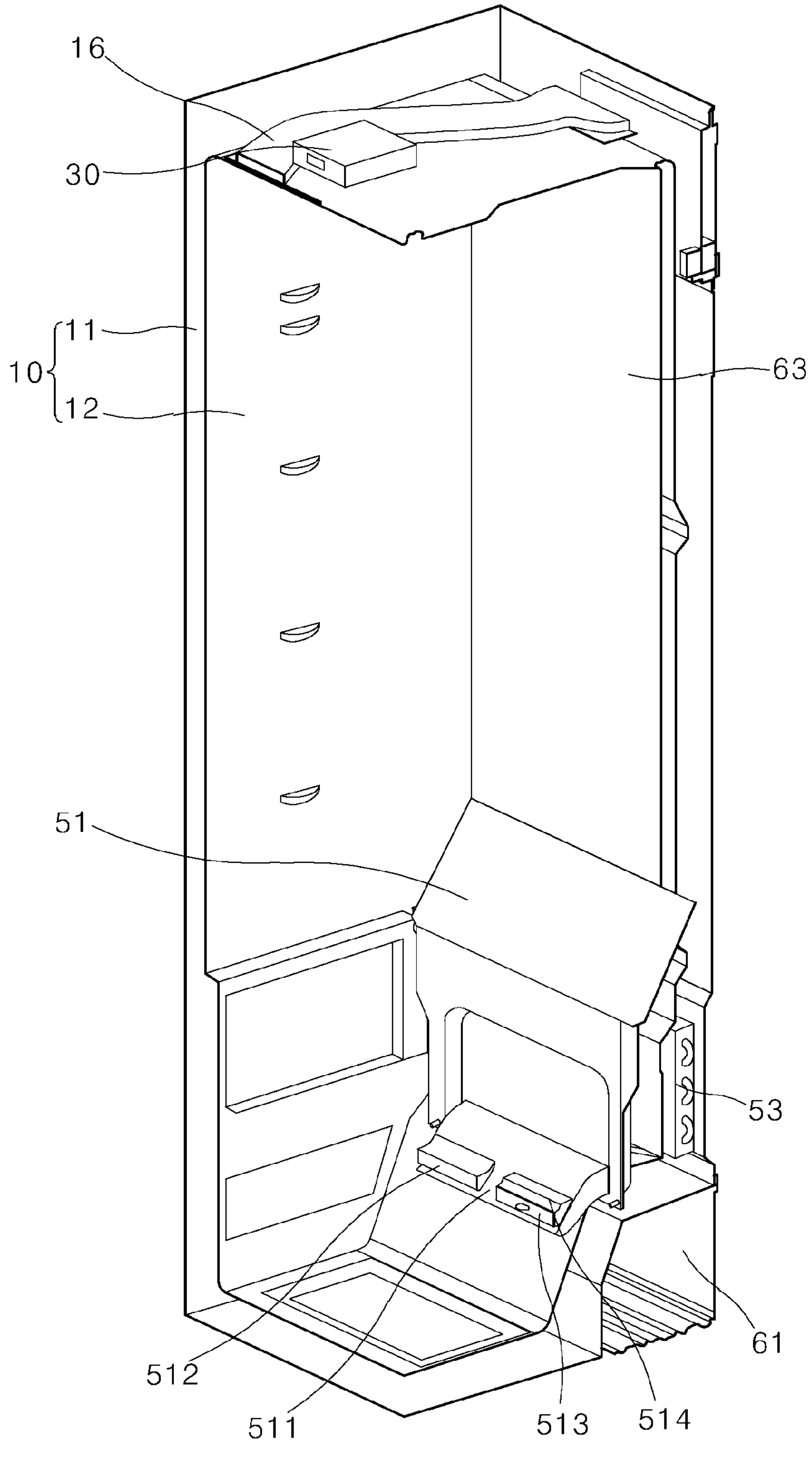
FIG. 55 is an exploded perspective cross-sectional view showing a cabinet to which a grille panel is coupled.

FIG. 53 is an exploded perspective view showing main components of a refrigerator 1 where the door assembly 20 is open clockwise.

A touch assembly 23 is disposed at the right side of the body assembly 21, and an upper hinge 41 and a lower hinge 42 constituting the rotation axis of the door assembly 20 may respectively disposed at the upper end and the lower end of the left side of the door assembly 20.

A hinge cover 44 may be formed at the upper end of the right side of the door assembly 20, and finish the right hinge axis portion that is not used.

Additionally, an auto hinge 43 may be disposed at the lower end of the left side of the door assembly 20, and interlock with the lower hinge 42 and operate to allow the door assembly 20 to be automatically closed.

Figure 48:
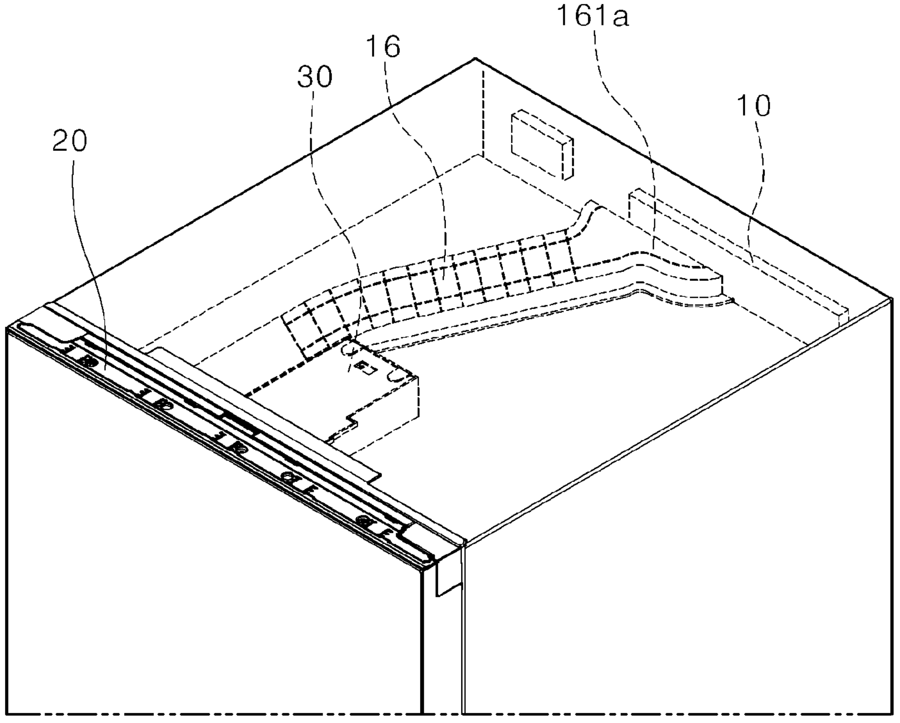
FIGS. 48 and 49 are views respectively showing a door opening device and an auto hinge with a door assembly closed.
Figure 49:
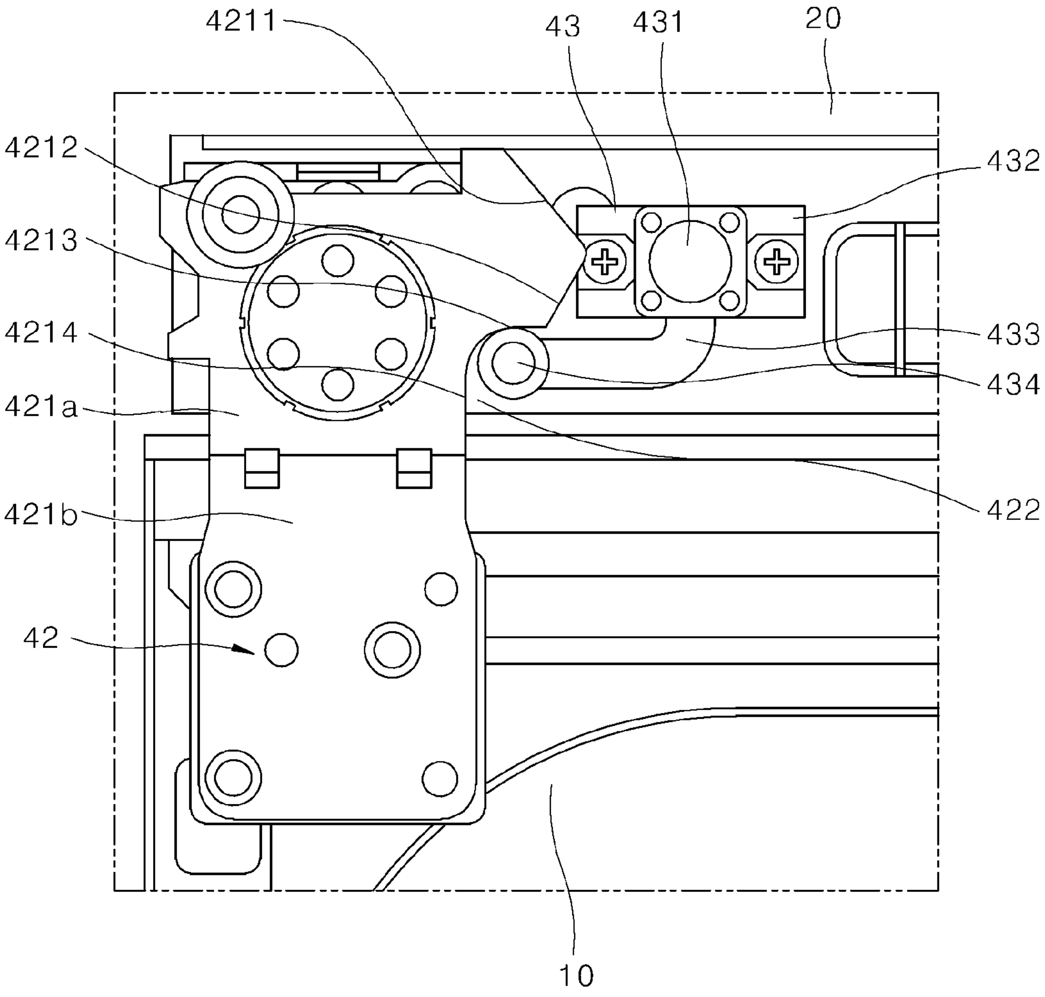
Figure 50:
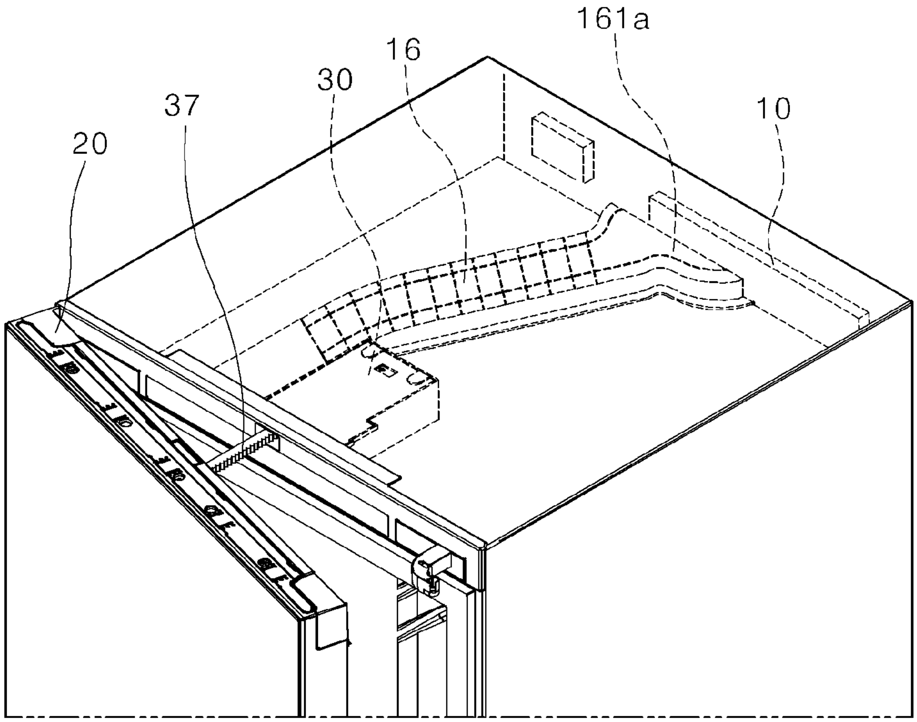
FIGS. 50 and 51 are views respectively showing a door opening device and an auto hinge with a door assembly open.
Figure 51:
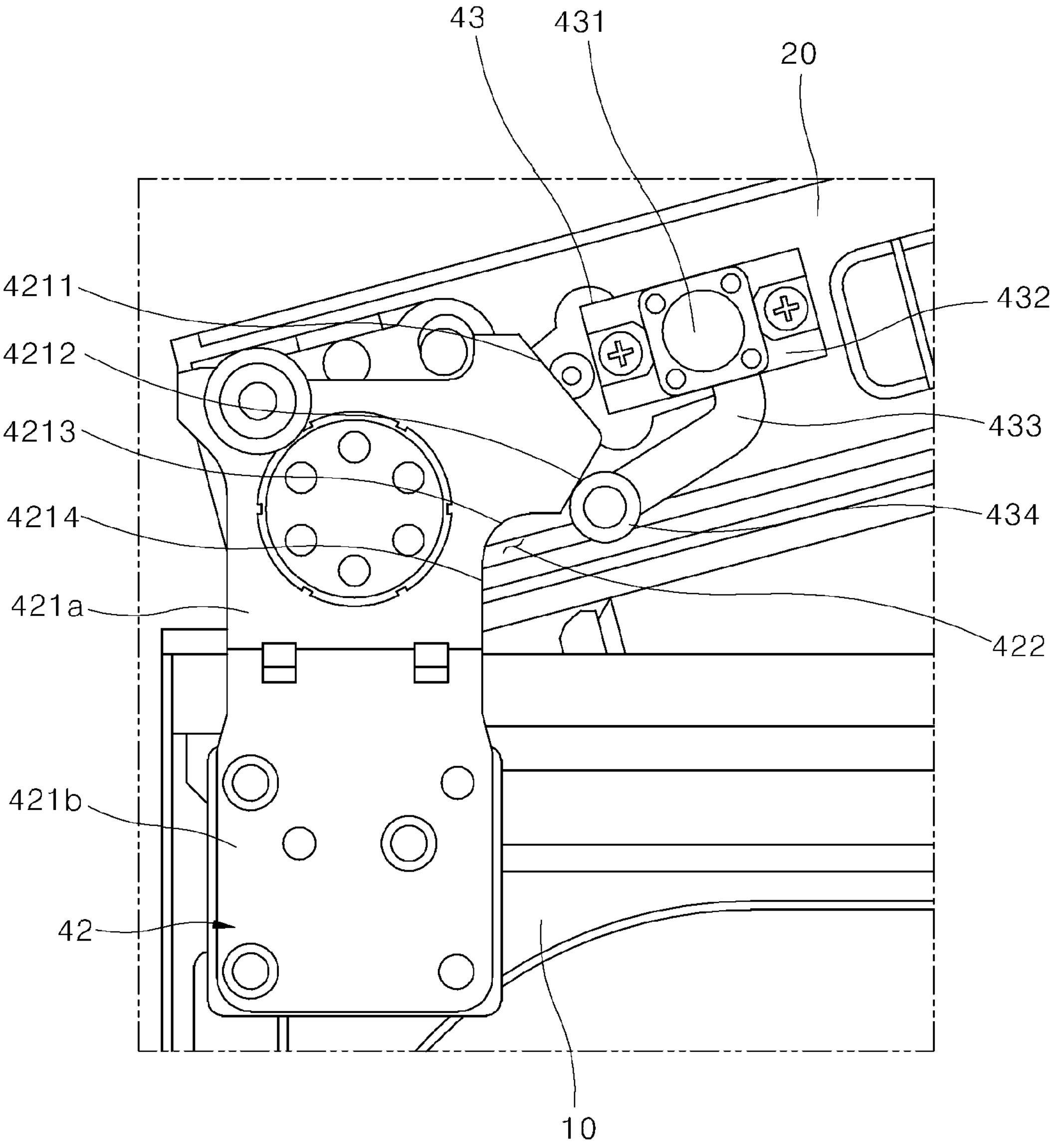

FIGS. 48 and 49 are view showing the door opening device 30 and the auto hinge 43 with the door assembly 20 closed, and FIGS. 50 and 51 are views showing the door opening device 30 and the auto hinge 43 with the door assembly 20 open.

Hereafter, the auto hinge 43 is described with reference to FIGS. 49 and 51.

The lower hinge 42 may comprise a first bracket body 421*a* connecting to the door assembly 20, and a second bracket body 421*b* connecting to the cabinet 10.

The auto hinge 43 may comprise a body part 431 comprising an elastic member, and the body part 431 may be inserted into the door assembly 20.

A fastening extending part 432 may be formed in a way that surrounds the body part 431, and fix the auto hinge 43 to the door assembly 20 through a fastening member.

The auto hinge 43 may comprise a lever 433 connecting to the body part 431, and a roller 434 connecting to the end portion of the lever 433.

The lower hinge 42 may comprise a contact surface contacted by the roller 434 of the lever 433.

The roller 434 of the lever 433 may move along the contact surface such that the auto hinge 43 allows the door assembly 20 to be automatically closed.

For example, the contact surface may have a first surface 4211, a second surface 4212, a third surface 4213 and a fourth surface 4214, and protrude toward the auto hinge 43.

The first surface 4211 starting from the front end of the door assembly 20 may have a slope to become close to the auto hinge 43, further toward the front surface of the cabinet 10, and the second surface 4212 may connect to the end portion of the first surface 4211 and have a slope to become far from the auto hinge 43, further toward the front surface of the cabinet 10.

The third surface 4213 may connect to the end portion of the second surface 4212, and be formed in a way that bends in a direction farther from the auto hinge 43, and the fourth surface 4214 may connect to the end portion of the third surface 4213 and be formed in a way that extends in the front surface direction of the cabinet 10.

At this time, an accommodation groove 422 into which the roller 434 of the auto hinge 43 is inserted may be formed by the third surface 4213 and the fourth surface 4214 of the contact surface.

Accordingly, with the door assembly 20 closed, the roller 434 of the auto hinge 43 may remain accommodated in the accommodation groove 422, in contact with the third surface 4213 and the fourth surface 4214.

As the door assembly 20 is opened, the roller 434 of the auto hinge 43 may move along the second surface 4212 and the first surface 4211 in contact with the second surface 4212 and the first surface 4211.

The refrigerator 1 having the above structure may operate based on the following touch manipulation method.

As the user touches the front surface of the door assembly 20 where the touch assembly 23 is placed, the touch assembly 23 recognizes the touch signal and sends the touch signal to the main PCB 15.

The main PCB 15 supplied with the touch signal sends an operation signal to the door opening device 30, and the door opening device 30 supplied with the operation signal allows the rack bar 37 to push the door assembly 20 such that the door assembly 20 is open up to a predetermined angle.

The user may hold the side handle 217 and pull the door assembly 20 fully to open the door assembly 20.

As the user pulls the door assembly 20 and open the door assembly 20 fully, a distance between the magnet of the door opening device 30 and the door switch of the door assembly 20 increases.

When the door switch does not recognize the magnet, the door switch sends a signal to the main PCB 15, and the main PCB 15 sends a rack bar 37 return signal to the door opening device 30 to rapidly return the rack bar 37.

If the user does not pull the door even after a predetermined period of time, the rack bar 37 of the door opening device 30 returns, and the door assembly 20 is closed automatically by the pulling force of the auto hinge 43.

Hereafter, a cold air flow path and a grille panel 51 are described with reference to FIGS. 44, 45, 54 to 60.

An upper duct 16 may be disposed in the upper portion of the storage chamber 13 and supply cold air to the storage chamber 13.

An inlet 161*a* of the upper duct 16 may connect to one side of a cold air duct 63 mounted onto the rear surface of the refrigerator 1 and be supplied with cold air, and an outlet 161*b* of the upper duct 16 may connect to the front end of the upper surface of the refrigerator 1 and supply cold air into the storage chamber 13.

At this time, while the inlet 161*a* of the upper duct 16 may be disposed to overlap the central portion of the cabinet 10, the outlet 161*b* of the upper duct 16 may be disposed not to overlap the central portion of the cabinet 10.

In the present disclosure, since the door opening device 30 disposed on the upper surface of the refrigerator 1 is placed in the central portion of the cabinet 10 as described above, the upper duct 16 disposed on the upper surface of the refrigerator 1 may be entirely formed in a curved manner, not to interfere with the door opening device 30.

An evaporator 53 generating cold air, and a fan module 52 supplying cold air generated by the evaporator 53 to the cold air duct 63 may be disposed on the back surface of the cabinet 10.

A grille panel assembly 50 may be disposed on the front surface of the fan module 52, such that the exterior of the inner portion of the cabinet 10 is finished with the grille panel assembly 50.

The grille panel assembly 50 may comprise a grille panel 51 finishing the exterior of the grille panel assembly 50, a cold air return guide part 511 being formed at the lower end of the grille panel 51 and returning cold air of the storage chamber 13, a filter part 513 being disposed at the cold air return guide part 511, and an ultraviolet irradiation part 514 irradiating ultraviolet rays to the filter part 513.

Since a machine compartment is placed on the rear surface of the lower portion of the storage chamber 13, the rear surface of the lower portion of the storage chamber 13 may have an inclined surface formed into steps.

The cold air return guide part 511 formed at the lower end of the grille panel 51 has a shape corresponding to the shape of the inclined surface and is spaced from the inclined surface 511, to form a suction flow path 54 returning cold air of the storage chamber 13.

Additionally, one or more mounting parts 512 protruding forward may be formed at the cold air return guide part 511.

The filter part 513 may be inserted into the mounting part 512, and the ultraviolet irradiation part 514 may be disposed at the upper end of the mounting part 512, to face the filter part 513.

The filter part 513 may comprise a photocatalytic reaction filter reacting with ultraviolet rays.

The deodorization and the germ removal of cold air passing through the photocatalytic reaction filter irradiate with ultraviolet rays may be ensured.

The on/off time of the ultraviolet irradiation part 514 may be adjusted on a regular basis. For example, the ultraviolet irradiation part 514 may operate for 10 minutes and then stop operating, repeatedly.

Accordingly, cold air suctioned into the suction flow path 54, formed by the grille panel assembly 50, may pass through the filter part 513 disposed at the suction flow path 54, and flow to the evaporator 53 in the state where the cold air is deodorize and its germs are removed.

The cold air having flown to the evaporator 53 may be cooled, and provided to the cold air flow path 62, formed by the cold air duct 63, through the fan module 52, and provided again to the upper duct 16 through the cold air flow path 62.

The cold air supplied to the cold air duct 63 and the upper duct 16 may be provided into the storage chamber 13 from the rear surface and the upper surface of the storage chamber 13, and flow between shelves 131 and drawers 132.

The cold air provided may be suction into the suction flow path 54, formed by the grille panel assembly 50, again, such that the deodorization and germ removal of the cold air are continued and repeated.

Figure 56:
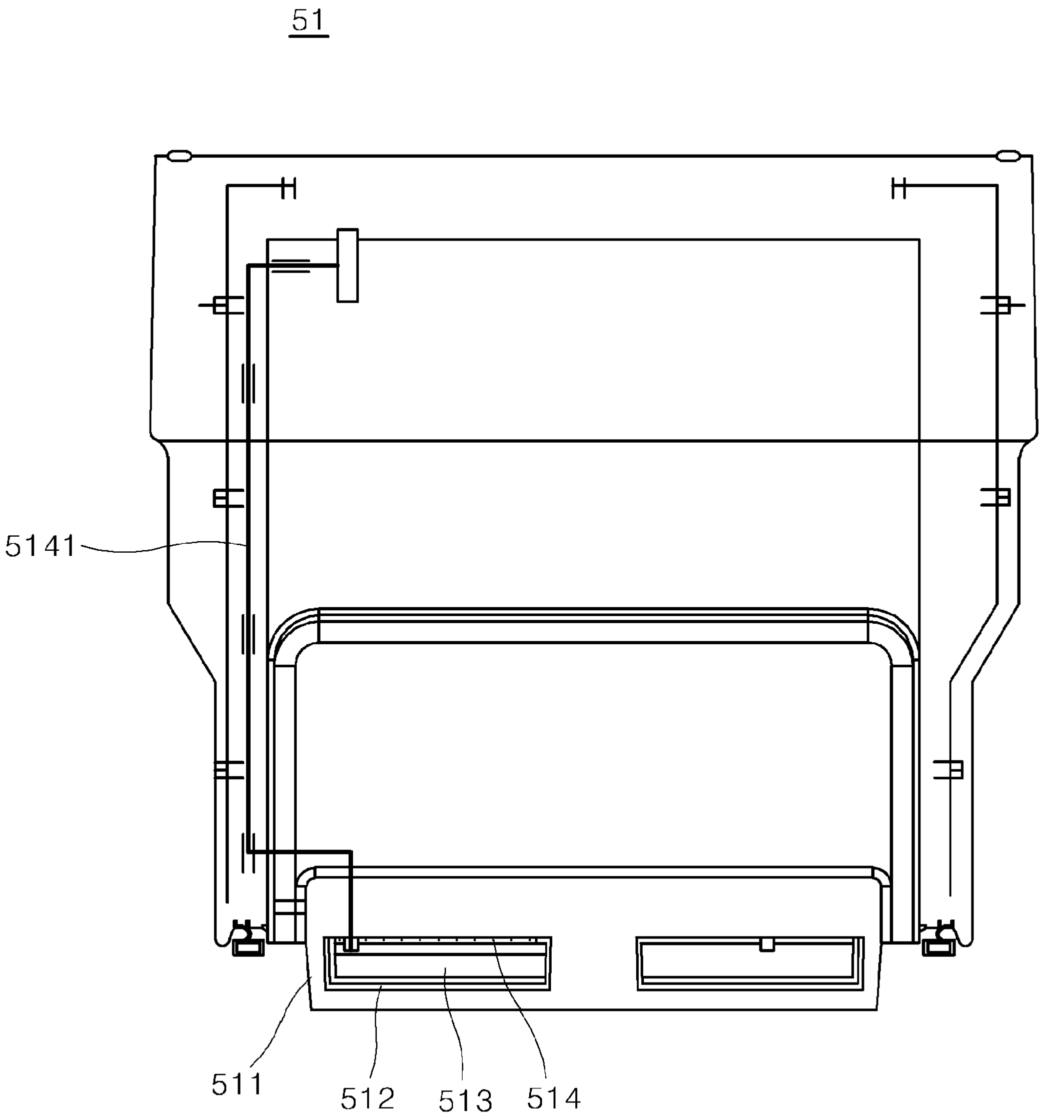
FIG. 56 is a view showing the back surface of a grille panel.
Figure 57:
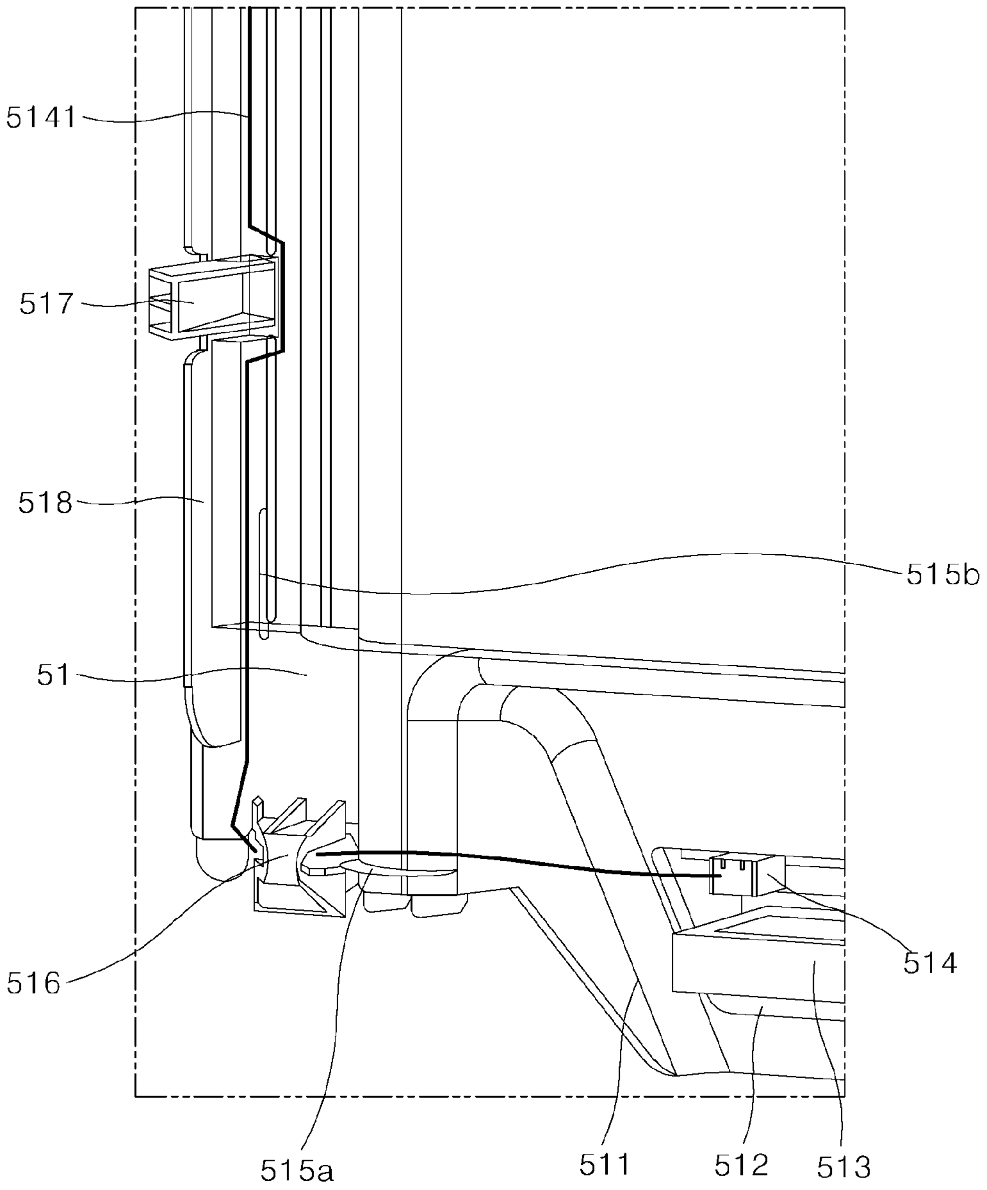
FIG. 57 is an enlarged view showing a fixation structure of a harness connecting to an ultraviolet irradiation part of a grille panel.

Referring to FIGS. 56 and 57, a structure to which an LED harness 5141 connects may be formed on the back surface of the grille panel 51, and the LED harness 5141 supplies a signal to the ultraviolet irradiation part 514.

A first guide rib 515*a* is formed at the lower end of one side of the grille panel 50, to prevent the LED harness 5141 withdrawn from the ultraviolet irradiation part 514 from sagging.

A fixation hook 516 may be formed at one side of the first guide rib 515*a*, and bend the LED harness 5141 upward while fixing the LED harness 5141.

A guide wall 518 may be formed on the side surface of the grille panel 51 and extend along the side surface of the grille panel 51, and the LED harness 5141 may extend upward along the guide wall 518.

A second guide rib 515*b* may protrude toward the inside of the guide wall 518, and the LED harness 5141 may be fixed in a way that passes between the guide wall 518 and the second guide rib 515*b*.

The guide wall 518 may have one or more fixation part projections 517, such that the . . . is fixed to the rear surface of the storage chamber 13.

Figure 58:
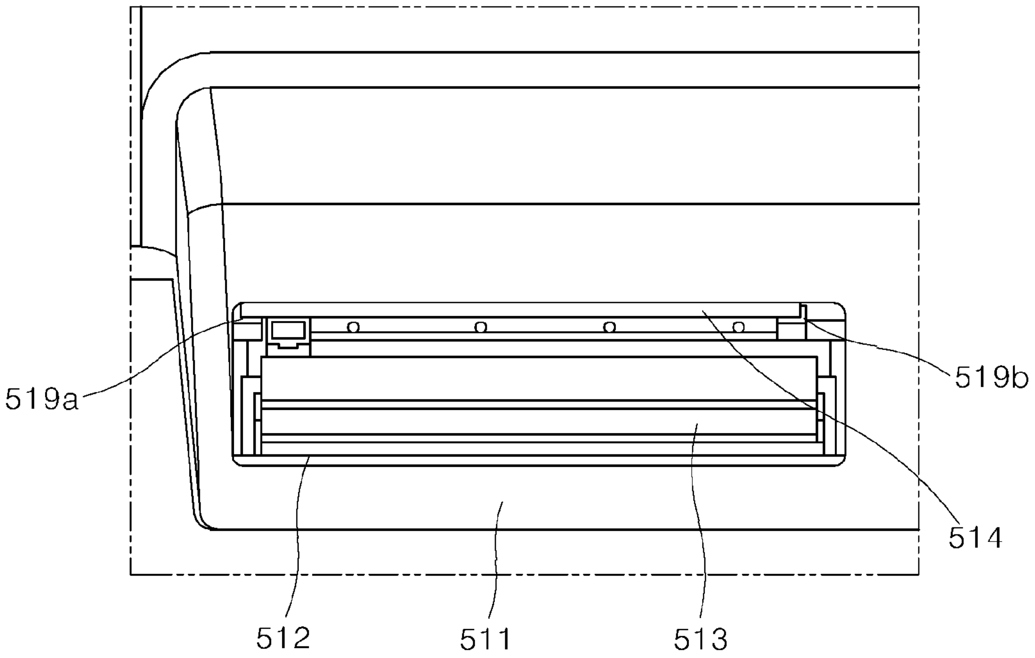
FIG. 58 is a view showing the back surfaces of an ultraviolet irradiation part and a filter part that are coupled to a grille panel.
Figure 59:
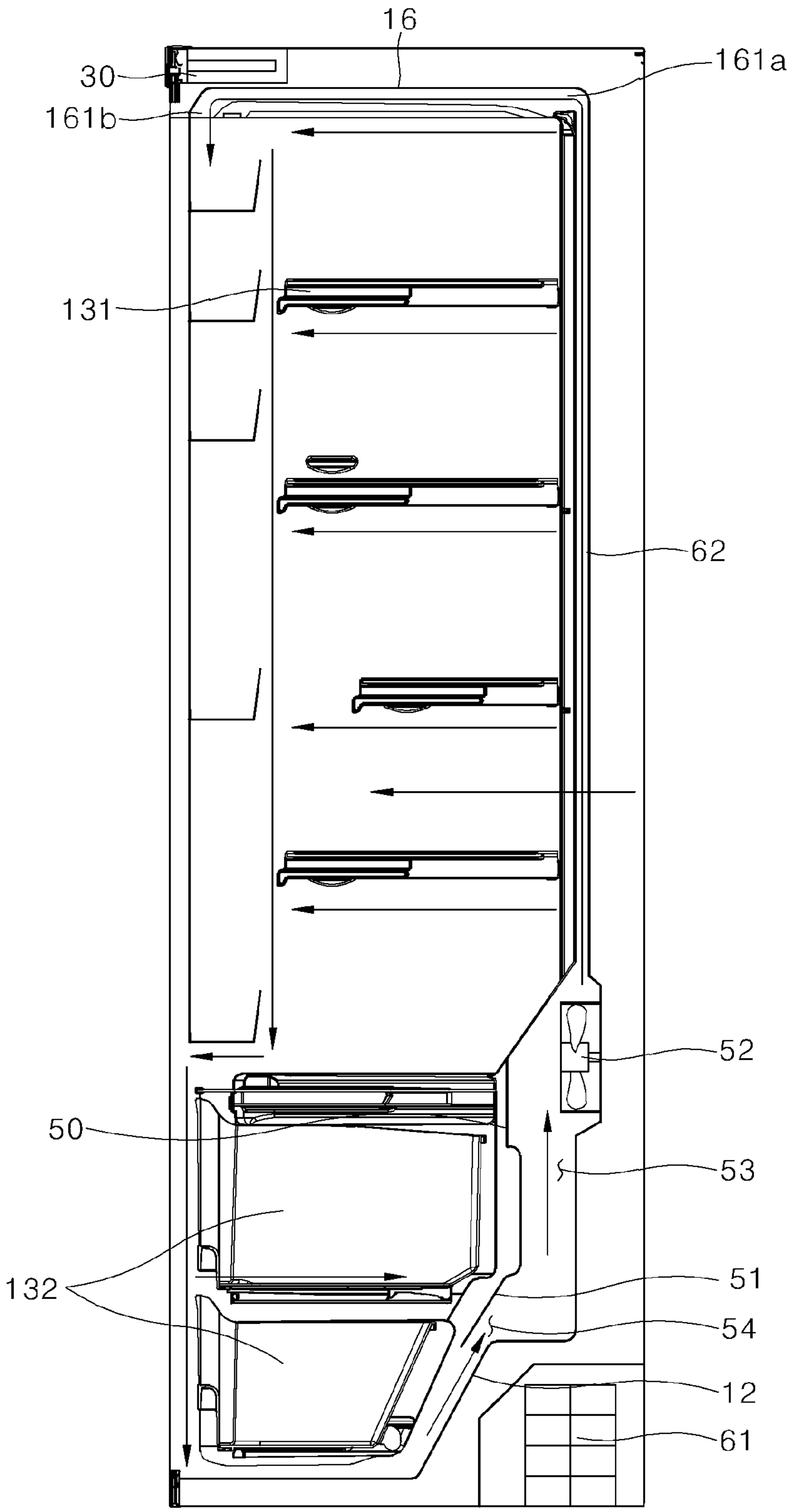
FIG. 59 is a cross-sectional view showing a cold air flow path in which cold air is supplied into and returned from a storage chamber.

Referring to FIG. 58, the ultraviolet irradiation part 5141 may be disposed at the upper end of the mounting part 512 onto which the filter part 513 is mounted, while being spaced a predetermined distance apart from the mounting part 512.

Both end portions of the ultraviolet irradiation part 514 may be fixed to a first fitting part 519*a* and a second fitting part 519*b* that are formed at the lower end of the inside of the grille panel 51, in a way that both the end portions are fit-coupled to the first fitting part 519*a* and the second fitting part 519*b*.

Figure 60:
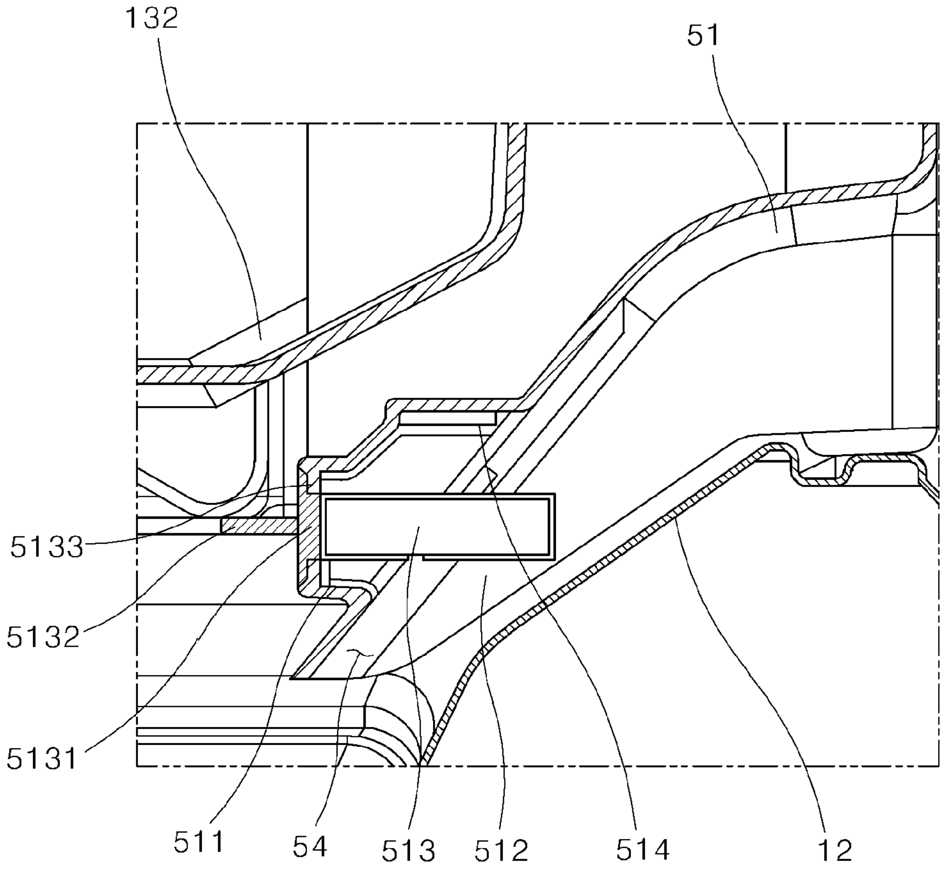
FIG. 60 is a lateral cross-sectional view showing a grille panel to which an ultraviolet irradiation part and a filter part are coupled.

Referring to FIG. 60, the filter part 513 is formed in a way that the filter part 513 is coupled to a filter part cover 5131 having a cover handle 5132 on the front end thereof, such that the user replaces the filter part 513 easily.

The mounting part 512 may be formed in a way that the front surface of the mounting part 512 is open to the cold air return guide part 511, such that the filter part 513 is inserted through the front surface of the cold air return guide part 511 in a sliding manner.

A cover holding part 5133 may be formed at the front end of the mounting part 512 such that the filter part cover 5131 of the filter part 513 is held by the cover holding part 5133. Thus, the user may insert the filter part 513 easily to a predetermined depth for use.

The embodiments are described above with reference to a number of illustrative embodiments thereof. However, embodiments are not limited to the embodiments and drawings set forth herein, and numerous other modifications and embodiments can be drawn by one skilled in the art within the technical scope of the disclosure. Further, the effects and predictable effects based on the configurations in the disclosure are to be included within the scope of the disclosure though not explicitly described in the description of the embodiments.

The invention claimed is:

1. A refrigerator, comprising:

a cabinet that defines a storage chamber having an open front surface;

a door assembly rotatably coupled to the cabinet and configured to open and close the open front surface of the cabinet, the door assembly being configured to open the open front surface of the cabinet based on rotating in a door opening direction relative to the cabinet, wherein the door opening direction comprises (i) a first direction based on the door assembly being coupled to a first side of the cabinet and (ii) a second direction opposite to the first direction based on the door assembly being coupled to a second side of the cabinet; and a door opening device disposed at an upper portion of the cabinet and configured to open the door assembly, the door opening device comprising a push member configured to push one side surface of the door assembly, wherein the door assembly comprises:

a touch assembly comprising a touch sensor, a body assembly configured to accommodate the touch assembly based on the door opening direction of the door assembly being either the first direction or the second direction, and a panel assembly comprising a front panel, the front panel being detachably coupled to a front surface of the body assembly, wherein the touch sensor faces a rear surface of the panel assembly and is configured to detect a touch input on a front surface of the panel assembly, and wherein the body assembly comprises a pair of accommodation parts comprising:

a first accommodation part configured to accommodate the touch assembly based on the door assembly being coupled to the first side of the cabinet, and a second accommodation part configured to accommodate the touch assembly based on the door assembly being coupled to the second side of the cabinet.

2. The refrigerator of claim 1, wherein the first accommodation part is disposed at a left side of the door assembly, and the second accommodation part is disposed at a right side of the door assembly, and wherein the touch assembly has a shape configured to be selectively accommodated in any one of the first accommodation part or the second accommodation part based on an opening direction of the door assembly from the cabinet.

3. The refrigerator of claim 1, wherein the first accommodation part is disposed at a first side of the body assembly, and the second accommodation part is disposed at a second side of the body assembly, and wherein the first accommodation part and the second accommodation part are arranged in a left-right direction of the body assembly.

4. The refrigerator of claim 1, wherein the first accommodation part comprises:

a harness passage part;

a wire harness that passes through the harness passage part; and a ring part that fixes the wire harness, and wherein the wire harness extends toward the ring part through the harness passage part, is covered around the ring part, and connects to the touch assembly.

5. The refrigerator of claim 1, wherein the body assembly further comprises a pair of side handles that are inserted into the body assembly, and wherein each of the first accommodation part and the second accommodation part comprises:

a harness passage part that is opened in a direction opposite to a corresponding one of the pair of side handles, and a wire harness that passes through the harness passage part and connects to the touch assembly.

6. The refrigerator of claim 1, wherein the touch assembly is installed in the first accommodation part in a first orientation or installed in the second accommodation part in a second orientation that is opposite to the first orientation in an up-down direction.

7. The refrigerator of claim 1, wherein the front panel comprises a touch display disposed at a position corresponding to the touch sensor, and wherein the touch sensor is disposed rearward relative to the front panel.

8. The refrigerator of claim 7, wherein the touch display is printed on a front surface of the front panel.

9. The refrigerator of claim 7, wherein the front panel is made of a non-conductive material.

10. The refrigerator of claim 1, wherein the touch assembly comprises:

a touch panel comprising the touch sensor; and a touch case coupled to a front surface of the touch panel, the touch case defining a touch hole that exposes the touch sensor, and wherein the touch case is fixed to the first accommodation part or the second accommodation part.

11. The refrigerator of claim 10, wherein the touch case comprises:

a rear surface rib that is disposed at a first surface of a rear portion of the touch case and extends along a left-right direction; and an elastic bend part that is disposed at a second surface of the rear portion of the touch case opposite to the first surface, the elastic bend part being curved in a front-rear direction, and wherein a distance from the second surface to the elastic bend part increases as the elastic bend part extends forward toward a front side of the touch case.

12. The refrigerator of claim 11, wherein the elastic bend part defines a through-hole, wherein the first accommodation part or the second accommodation part defines:

a storage space that accommodates the touch panel, and an insertion space that accommodates the elastic bend part, wherein the first accommodation part or the second accommodation part comprises:

a holding jaw that protrudes to the storage space and is coupled to the rear surface rib, the holding jaw having a back surface in contact with the rear surface rib, and a protruding part that protrudes to the insertion space and is inserted into the through-hole of the elastic bend part, and wherein the touch case is coupled to the first accommodation part or the second accommodation part by (i) the rear surface rib coupled to the holding jaw and (ii) the protruding part inserted into the through-hole of the elastic bend part.

13. The refrigerator of claim 12, wherein the holding jaw and the protruding part are disposed in the first accommodation part in a first orientation, or disposed in the second accommodation part in a second orientation opposite to the first orientation in an up-down direction.

14. The refrigerator of claim 1, wherein the body assembly comprises an upper cap deco that defines an upper portion of the body assembly, wherein the panel assembly comprises an upper bracket, the upper bracket being configured to fix an upper side of the panel assembly to the upper cap deco, wherein the upper cap deco comprises a limiting rib that defines an opening that is open toward the upper bracket, the limiting rib having a camber shape, wherein the upper bracket comprises an insertion projection that protrudes rearward toward the body assembly and configured to be inserted into the limiting rib, and wherein the panel assembly is configured to be fixed to the body assembly based on the insertion projection being inserted into the limiting rib.

15. The refrigerator of claim 14, further comprising a deco cover that defines an upper portion of the door assembly, the deco cover comprising a crimping rib that protrudes downward and is configured to press a side surface of the limiting rib.

16. The refrigerator of claim 1, wherein the body assembly comprises a lower cap deco that defines a lower portion of the body assembly, wherein the panel assembly comprises a lower bracket that fixes a lower side of the panel assembly to the lower cap deco, the lower bracket comprising a hook rib that is curved downward to thereby define a hook space, wherein the lower cap deco comprises a protruding rib that is disposed at a front of the lower cap deco, the protruding rib protruding upward and inserted into the hook space, and wherein the panel assembly is configured to be fixed to the body assembly based on the protruding rib being inserted into the hook space.

17. The refrigerator of claim 1, further comprising a main printed circuit board (PCB) configured to receive a touch signal from the touch assembly and to supply an operation signal to the door opening device, and wherein each of the first accommodation part and the second accommodation part comprises a pair of wire harnesses that are electrically connected to the touch assembly and the main PCB.

18. The refrigerator of claim 1, further comprising:

an accommodation case that is disposed at a central region of the upper portion of the cabinet and accommodates the door opening device; and an upper duct disposed at the upper portion of the cabinet and configured to supply cold air to an upper surface of the storage chamber, the upper duct having an outlet that is spaced apart from the central region of the cabinet.

19. The refrigerator of claim 1, further comprising:

a cold air duct disposed at a rear surface of the cabinet;

an evaporator configured to generate cold air;

a fan module configured to supply the cold air generated by the evaporator to the cold air duct; and a grille panel disposed at a front surface of the fan module, wherein the grille panel comprises:

a cold air return guide configured to guide the cold air from the storage chamber toward the cold air duct, a filter disposed at the cold air return guide, the filter comprising a photocatalytic reaction filter, and an ultraviolet irradiator configured to emit ultraviolet light to the filter.

20. The refrigerator of claim 19, wherein the filter is configured to interfere with the cold air flowing through the cold air return guide, and wherein the cold air duct is configured to carry the cold air having passed through the filter.

21. A refrigerator comprising:

a cabinet that defines a storage chamber having an open front surface;

a door assembly configured to open and close the open front surface of the cabinet; and a door opening device disposed at an upper portion of the cabinet and configured to open the door assembly, the door opening device comprising a push member configured to push one side surface of the door assembly, wherein the door assembly comprises:

a touch assembly comprising a touch sensor, a body assembly that accommodates the touch assembly, and a panel assembly comprising a front panel, the front panel being detachably coupled to a front surface of the body assembly, wherein the touch sensor faces a rear surface of the panel assembly and is configured to detect a touch input on a front surface of the panel assembly, wherein the body assembly further comprises a pair of side handles that are inserted into the body assembly and exposed to an outside of the door assembly through side surfaces of the door assembly, and wherein the pair of side handles are not exposed outward in a front-rear direction of the door assembly.

22. The refrigerator of claim 21, wherein the pair of side handles comprise a first side handle disposed at a first side of the door assembly and a second side handle disposed at a second side of the door assembly, and wherein the pair of side handles are arranged in a left-right direction of the body assembly.

23. The refrigerator of claim 21, wherein at least a portion of the pair of side handles overlaps with the touch assembly in the front-rear direction of the door assembly.

24. A refrigerator comprising:

a cabinet that defines a storage chamber having an open front surface;

a door assembly configured to open and close the open front surface of the cabinet; and a door opening device disposed at an upper portion of the cabinet and configured to open the door assembly, the door opening device comprising a push member configured to push one side surface of the door assembly, wherein the door assembly comprises:

a touch assembly comprising a touch sensor, a body assembly that accommodates the touch assembly, and a panel assembly comprising a front panel, the front panel being detachably coupled to a front surface of the body assembly, and wherein the touch sensor faces a rear surface of the panel assembly and is configured to detect a touch input on a front surface of the panel assembly, wherein the refrigerator further comprises a cover plate disposed between the touch assembly and the front panel, wherein the front panel defines a front surface hole, and wherein the cover plate comprises a button that is disposed at a position corresponding to the touch sensor and protrudes toward a front surface of the front panel, the button being exposed through the front surface hole of the front panel.

25. The refrigerator of claim 24, wherein the front panel is made of a conductive material.

26. The refrigerator of claim 25, further comprising a conductive sheet disposed between the cover plate and the touch sensor.

* * * * *